(12) United States Patent
Das et al.

(10) Patent No.: US 12,192,767 B2
(45) Date of Patent: Jan. 7, 2025

(54) COOPERATIVE EARLY THREAT DETECTION USING SENSOR SHARING

(71) Applicant: QUALCOMM Incorporated, San Diego, CA (US)

(72) Inventors: Soumya Das, San Diego, CA (US); Mohammad Nekoui, San Diego, CA (US); Dan Vassilovski, Del Mar, CA (US); Mohammed Ataur Rahman Shuman, San Diego, CA (US); Sean Vincent Maschue, Encinitas, CA (US)

(73) Assignee: QUALCOMM Incorporated, San Diego, CA (US)

( * ) Notice: Subject to any disclaimer, the term of this patent is extended or adjusted under 35 U.S.C. 154(b) by 717 days.

(21) Appl. No.: 17/327,429

(22) Filed: May 21, 2021

(65) Prior Publication Data
US 2022/0377559 A1 Nov. 24, 2022

(51) Int. Cl.
*H04W 12/06* (2021.01)
*B60W 30/09* (2012.01)
*B60W 30/095* (2012.01)
*B60W 50/04* (2006.01)
*B60W 60/00* (2020.01)
(Continued)

(52) U.S. Cl.
CPC .......... *H04W 12/122* (2021.01); *B60W 30/09* (2013.01); *B60W 30/0956* (2013.01); *B60W 50/04* (2013.01); *B60W 60/001* (2020.02); *H04W 4/40* (2018.02); *B60W 2556/45* (2020.02)

(58) Field of Classification Search
CPC ... H04W 12/122; H04W 4/40; B60W 60/001; B60W 30/09; B60W 30/0956; B60W 50/04; B60W 2556/45
See application file for complete search history.

(56) References Cited

U.S. PATENT DOCUMENTS

| | | | |
|---|---|---|---|
| 2013/0217353 A1* | 8/2013 | Snider | B60R 25/30 455/404.2 |
| 2018/0272993 A1* | 9/2018 | Johnson | H04K 3/255 |

(Continued)

OTHER PUBLICATIONS

Hasan M., et al., "Securing Vehicle-to-Everything (V2X) Communication Platforms", arxiv.org, Cornell University Library, 201 Olin Library Cornell University Ithaca, NY 14853, IEEE Transactions on Intelligent Vehicles, IEEE, vol. 5, No. 4, Apr. 15, 2020 (Apr. 15, 2020), pp. 693-713, XP011822383, ISSN: 2379-8858, DOI: 10.1109/TIV.2020.2987430, [retrieved on Nov. 20, 2020], Section I, II.A, III.B, V.B, figure 1, sections IV and V.

(Continued)

*Primary Examiner* — Moustapha Diaby
(74) *Attorney, Agent, or Firm* — Thien T. Nguyen

(57) ABSTRACT

Method and apparatus for cooperative early threat detection. In some aspects, the apparatus detects one or more object data signals having data that interferes with wireless resources utilized in automated driving decisions. The apparatus transmits, to at least a second wireless device, a message indicating the one or more object data signals having the data that interferes with wireless resources utilized in automated driving decisions. The one or more object data signals may correspond to a misbehaving wireless device. The data of the misbehaving wireless device may comprise implausible data related to at least one characteristic of the misbehaving wireless device.

30 Claims, 32 Drawing Sheets

(51) Int. Cl.
    *H04W 4/40*     (2018.01)
    *H04W 12/08*     (2021.01)
    *H04W 12/12*     (2021.01)
    *H04W 12/122*     (2021.01)
    *H04W 88/02*     (2009.01)

(56) References Cited

U.S. PATENT DOCUMENTS

| | | | |
|---|---|---|---|
| 2018/0275282 A1* | 9/2018 | Ozbilgin | G01S 19/215 |
| 2020/0128409 A1* | 4/2020 | Yang | H04W 4/44 |
| 2020/0280842 A1 | 9/2020 | Liu et al. | |
| 2020/0413264 A1* | 12/2020 | Han | H04W 12/122 |
| 2021/0067967 A1 | 3/2021 | Arzelier et al. | |

OTHER PUBLICATIONS

Heijden R., et al., "Survey on Misbehavior Defection in Cooperative Intelligent Transportation Systems", IEEE Communications Surveys & Tutorials, vol. 21, No. 1, Jan. 1, 2019 (Jan. 1, 2019), pp. 779-811, XP011711823, DOI: 10.1109/COMST.2018.2873088 [retrieved on Feb. 21, 2019], Sections I-VI.
International Search Report and Written Opinion—PCT/US2022/022624—ISA/EPO—Jul. 6, 2022.

\* cited by examiner

COOPERATIVE EARLY THREAT DETECTION USING SENSOR SHARING

BACKGROUND

Technical Field

The present disclosure relates generally to communication systems, and more particularly, to a configuration for cooperative early threat detection.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. Aspects of wireless communication may comprise direct communication between devices, such as in V2X, V2V, and/or D2D communication. There exists a need for further improvements in V2X, V2V, and/or D2D technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a device at a first wireless device. The device may be a processor and/or a modem at a first wireless device or the first wireless device itself. The apparatus detects a threat entity transmitting data that interferes with transmission of basic safety messages (BSMs). The apparatus transmits, to a second wireless device, a message indicating information related to a type of the threat entity.

In an aspect of the disclosure, a method, a computer-readable medium, and an apparatus are provided. The apparatus may be a device at a second wireless device. The device may be a processor and/or a modem at a second wireless device or the second wireless device itself. The apparatus receives, from a first wireless device, a message indicating a threat entity within a threat zone, wherein the threat entity transmits data that interferes with transmission of basic safety messages (BSMs). The apparatus determines a candidate resource of a set of candidate resources on which to transmit a BSM based at least in part on the message indicating information related to the threat entity from the first wireless device. The apparatus transmits, to at least a third wireless device, the BSM on a determined candidate resource.

In an aspect of the disclosure, a method, a computer-readable medium, and an apparatus are provided. The apparatus may be a device at a first wireless device. The device may be a processor and/or a modem at a first wireless device or the first wireless device itself. The apparatus detects a threat entity within a threat zone based on data signals received from the threat entity, wherein the threat entity obstructs wireless spectrum or resources utilized in cooperative or automated driving decisions. The apparatus transmits, to at least one second wireless device, a message indicating the threat entity within the threat zone.

In an aspect of the disclosure, a method, a computer-readable medium, and an apparatus are provided. The apparatus may be a device at a second wireless device. The device may be a processor and/or a modem at a second wireless device or the second wireless device itself. The apparatus receives a message indicating a threat entity within a threat zone, wherein the threat entity obstructs wireless spectrum or resources utilized in cooperative or automated driving decisions. The apparatus initiates a mitigation action in response to receiving the message to avoid or mitigate contact with the threat entity.

In an aspect of the disclosure, a method, a computer-readable medium, and an apparatus are provided. The apparatus may be a device at a first wireless device. The device may be a processor and/or a modem at a first wireless device or the first wireless device itself. The apparatus detects one or more object data signals having data that interferes with wireless resources utilized in automated driving decisions. The apparatus transmits, to at least a second wireless device, a message indicating the one or more object data signals having the data that interferes with wireless resources utilized in automated driving decisions.

In an aspect of the disclosure, a method, a computer-readable medium, and an apparatus are provided. The apparatus may be a device at a second wireless device. The device may be a processor and/or a modem at a second wireless device or the second wireless device itself. The apparatus receives, from a first wireless device, a message indicating one or more object data signals having data that interferes with wireless resources utilized in automated driving decisions. The apparatus initiates a mitigation action in response to receiving the message to avoid or mitigate contact with the one or more object data signals that interferes with wireless resources utilized in automated driving decisions.

To the accomplishment of the foregoing and related ends, the one or more aspects comprise the features hereinafter fully described and particularly pointed out in the claims.

The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
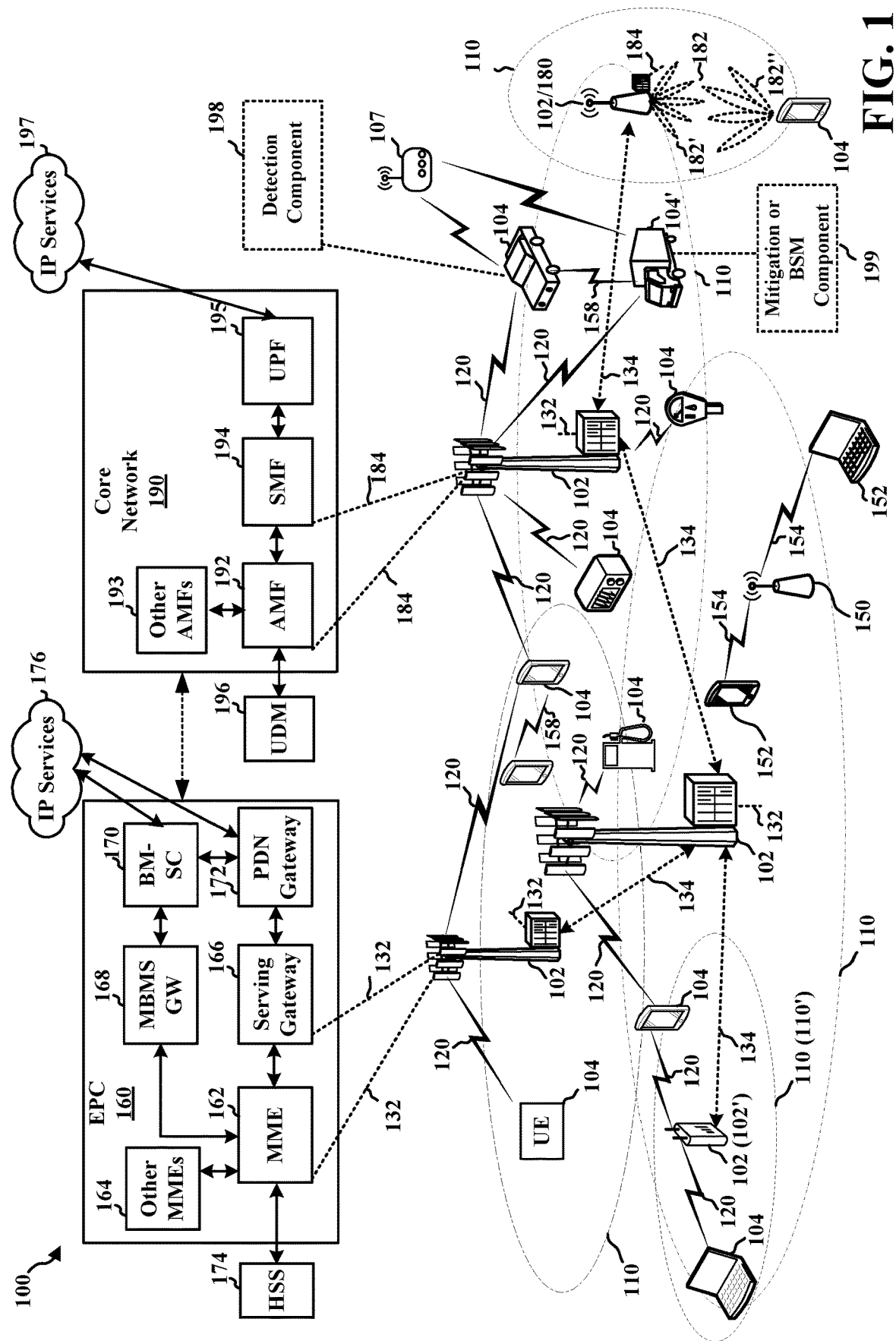
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and a Core Network (e.g., 5GC) 190. The base stations 102 may include macro cells (high power cellular base station) and/or small cells (low power cellular base station). The macro cells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for NR (collectively referred to as Next Generation RAN (NG-RAN)) may interface with Core Network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or Core Network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network. A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range.

Devices may use beamforming to transmit and receive communication. For example, FIG. 1 illustrates that a base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same. Although beamformed signals are illustrated between UE 104 and base station 102/180, aspects of beamforming may similarly be applied by UE 104 or RSU 107 to communicate with another UE 104 or RSU 107, such as based on sidelink communication such as V2X or D2D communication.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The Core Network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the Core Network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or Core Network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Some wireless communication networks may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), cellular-vehicle-to everything (C-V2X), enhanced V2X (e-V2X), and/or a combination thereof and/or with other devices, which can be collectively referred to as vehicle-to-anything (V2X) communications. Referring again to FIG. 1, in certain aspects, a UE 104, e.g., a transmitting Vehicle User Equipment (VUE) or other UE, may be configured to transmit messages directly to another UE 104. The communication may be based on V2X or other D2D communication, such as Proximity Services (ProSe), etc. Communication based on V2X and/or D2D communication may also be transmitted and received by other transmitting and receiving devices, such as Road Side Unit (RSU) 107, etc. Aspects of the communication may be based on PC5 or sidelink communication e.g., as described in connection with the example in FIG. 2. Although the following description may provide examples for V2X/D2D communication in connection with 5G NR, the concepts described herein may be applicable to other similar areas, such as LTE, LTE-A, CDMA, GSM, and other wireless technologies.

Referring again to FIG. 1, in certain aspects, the UE 104 may be configured to share information of a detected threat entity with other wireless devices that are beyond a zone of the threat entity, such that other wireless devices may virtually sense the threat entity. For example, the UE 104 may comprise a detection component 198 configured to share information of a detected threat entity with other wireless devices (e.g., 104') that are beyond a zone of the threat entity, such that other wireless devices may virtually sense the threat entity. In certain aspects, the UE 104 may be configured to share information related to a detected threat entity with other wireless devices beyond a threat zone of the threat entity such that the other wireless device may take preventative measures proactively. For example, the UE 104 may comprise a detection component 198 configured to share information related to a detected threat entity with other wireless devices (e.g., UE 104') beyond a threat zone of the threat entity such that the other wireless device may take preventative measures proactively. In certain aspects, the UE 104 may be configured to share information related to a detected threat entity with other wireless devices. For example, the UE 104 may comprise a detection component 198 configured to share information related to a detected threat entity with other wireless devices (e.g., UE 104').

Referring again to FIG. 1, in certain aspects, the UE 104' may be configured to determine a subchannel to transmit a BSM based on virtually sensing a threat entity. For example, the UE 104' may comprise a BSM component 199 configured to determine a subchannel to transmit a BSM based on virtually sensing a threat entity. In certain aspects, the UE 104' may be configured to initiate a mitigation action based on virtually sensing a threat entity detected by a first wireless device. For example, the UE 104' may comprise a mitigation component 199 configured to initiate a mitigation action based on virtually sensing a threat entity detected by a first wireless device (e.g., 104). In certain aspects, the UE 104' may be configured to initiate a mitigation action in response to receiving a notification of a threat obstacle detected by a first wireless device while beyond a threat zone of the threat obstacle. For example, the UE 104' may comprise a mitigation component 199 configured to initiate a mitigation action in response to receiving a notification of a threat obstacle detected by a first wireless device (e.g., 104) while beyond a threat zone of the threat obstacle.

Figure 2:
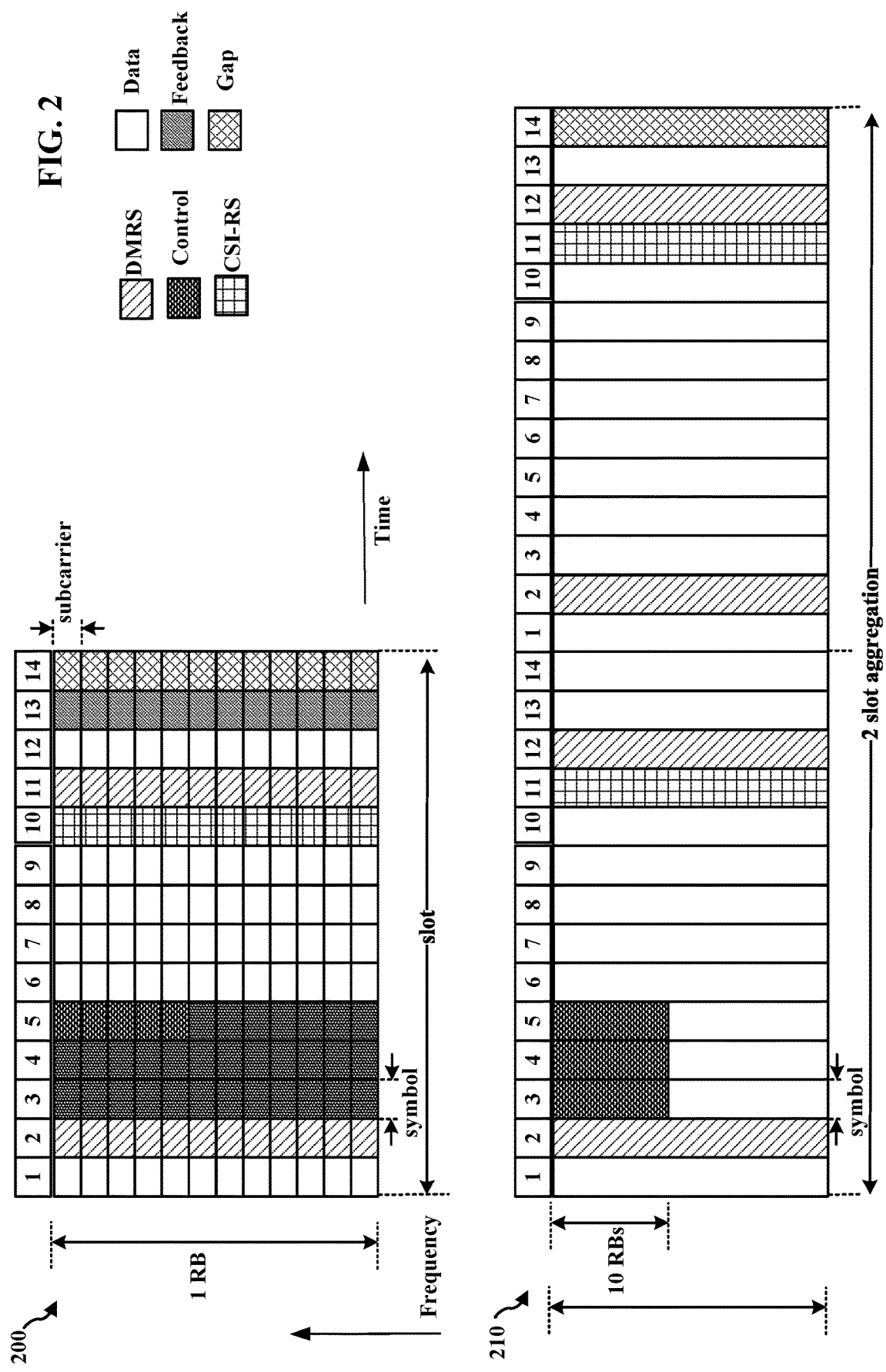
FIG. 2 illustrate example aspects of a sidelink slot structure.

FIG. 2 illustrates an example diagram 200 illustrating a sidelink subframe within a frame structure that may be used for sidelink communication, e.g., between UEs 104, between a UE and infrastructure, between a UE and an RSU, etc. The frame structure may be within an LTE frame structure. Although the following description may be focused on LTE, the concepts described herein may be applicable to other similar areas, such as 5G NR, LTE-A, CDMA, GSM, and other wireless technologies. This is merely one example, and other wireless communication technologies may have a different frame structure and/or different channels. A frame (10 ms) may be divided into 10 equally sized subframes (1 ms). Each subframe may include two slots. Each slot may include 7 SC-FDMA symbols. For slot configuration 0, each slot may include 14 symbols, and for slot configuration 1, each slot may include 7 symbols. Although the diagram 200 illustrates a single RB subframe, the sidelink communication may include multiple RBs.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may include a reference signal, such as a demodulation RS (DMRS). At least one symbol may be used for feedback, as described herein. A symbol prior to and/or after the feedback may be used for turnaround between reception of data and transmission of the feedback. Another symbol, e.g., at the end of the subframe may be used as a guard symbol without transmission/reception. The guard enables a device to switch from operating as a transmitting device to prepare to operate as a receiving device, e.g., in the following subframe. Data or control may be transmitted in the remaining REs, as illustrated. For example, data may be carried in a PSSCH, and the control information may be carried in a PSCCH. The control information may comprise Sidelink Control Information (SCI). The position of any of the reference signals, control, and data may be different than the example illustrated in FIG. 2.

FIG. 2 merely illustrates one, non-limiting example of a frame structure that may be used. Aspects described herein may be applied to communication using other, different frame formats.

Figure 3:
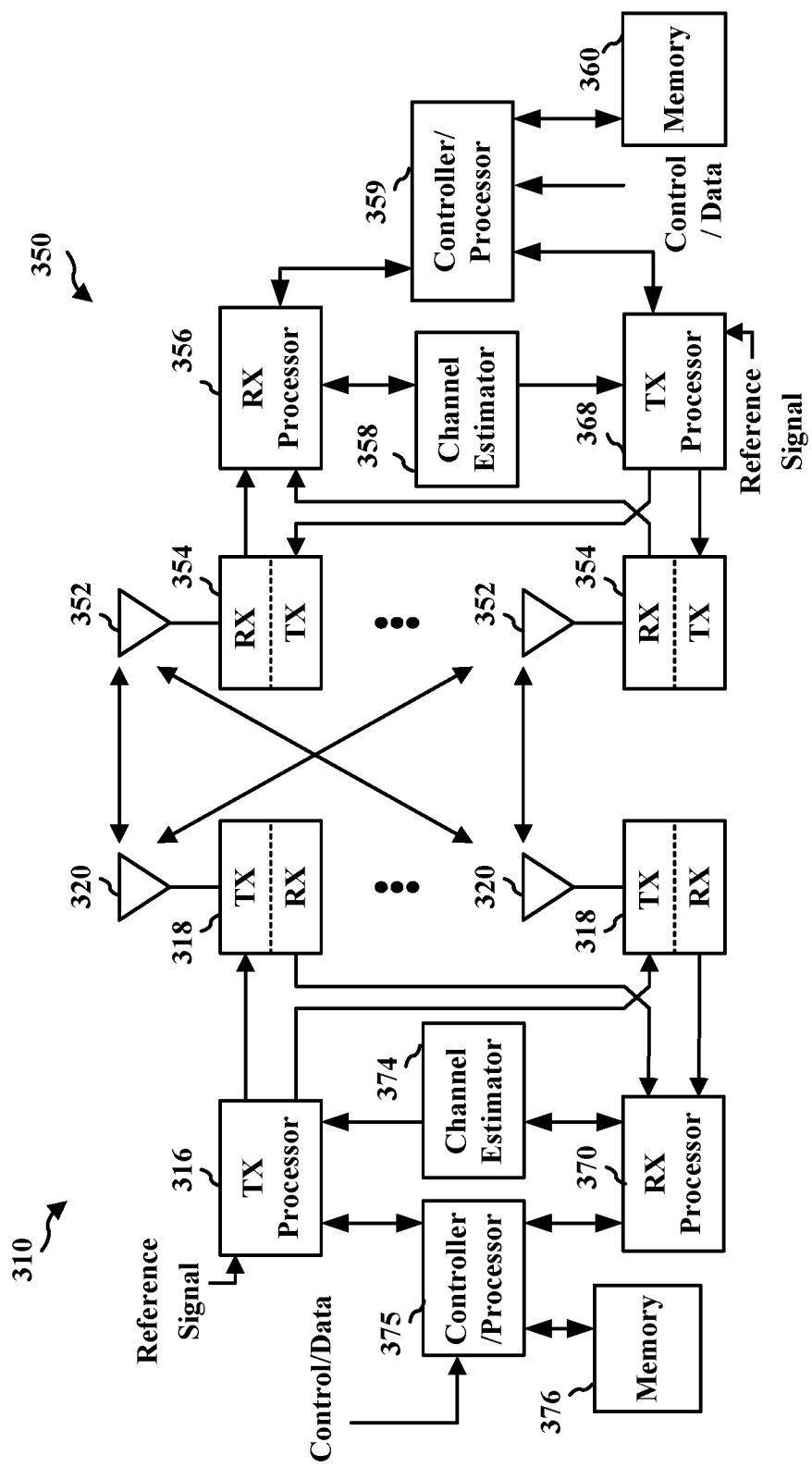
FIG. 3 is a diagram illustrating an example of a first device and a second device involved in wireless communication based, e.g., on V2V, V2X, and/or device-to-device communication.

FIG. 3 is a block diagram 300 of a first wireless communication device 310 in communication with a second wireless communication device 350, e.g., via V2V/V2X/other communication. The device 310 may comprise a transmitting device communicating with a receiving device, e.g., device 350. The communication may be based, e.g., on sidelink. The transmitting device 310 may comprise a UE, an RSU, etc. The receiving device may comprise a UE, an RSU, etc. Packets may be provided to a controller/processor 375 that implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318TX. Each transmitter 318TX may modulate an RF carrier with a respective spatial stream for transmission.

At the device 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by device 310. These soft decisions may be based on channel estimates computed by the channel estimator 358. The soft decisions are then decoded and deinterleaved to recover the data and control signals that were originally transmitted by device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The transmission is processed at the device 310 in a manner similar to that described in connection with the receiver function at the device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations.

At least one of the TX processor 368, the RX processor 356, or the controller/processor 359 of device 350 or the TX 316, the RX processor 370, or the controller/processor 375 may be configured to perform aspects described in connection with 198 or 199 of FIG. 1.

Figure 4:
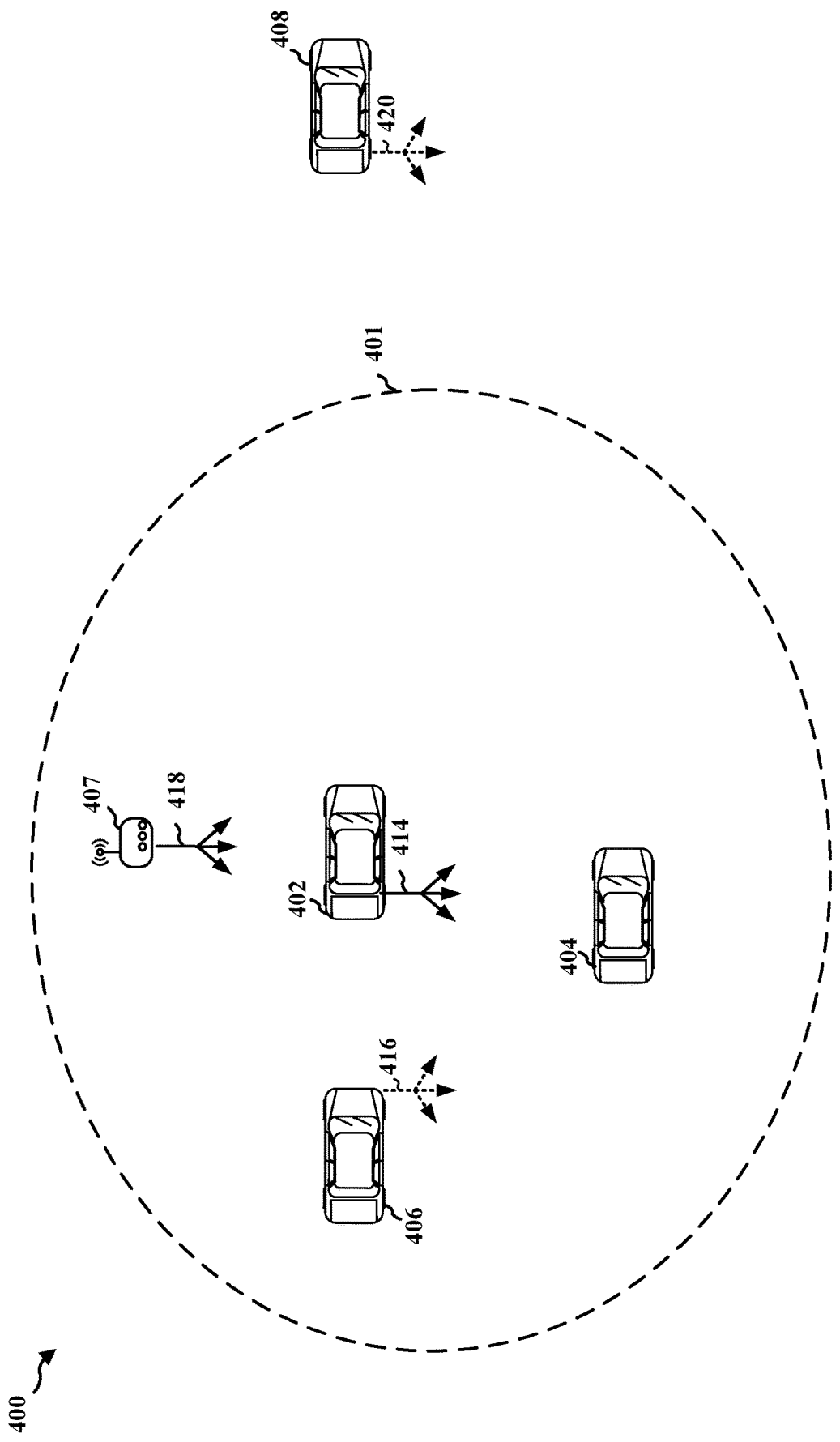
FIG. 4 is a diagram illustrating an example of devices involved in wireless communication based, e.g., on sidelink communication.

FIG. 4 illustrates an example 400 of wireless communication between devices based on sidelink communication, such as V2X or other D2D communication. The communication may be based on a slot structure comprising aspects described in connection with FIG. 2. For example, transmitting UE 402 may transmit a transmission 414, e.g., comprising a control channel and/or a corresponding data channel, that may be received by receiving UEs 404, 406, 408. At least one UE may comprise an autonomous vehicle or an unmanned aerial vehicle. A control channel may include information for decoding a data channel and may also be used by receiving device to avoid interference by refraining from transmitting on the occupied resources during a data transmission. The number of TTIs, as well as the RBs that will be occupied by the data transmission, may be indicated in a control message from the transmitting device. The UEs 402, 404, 406, 408 may each be capable of operating as a transmitting device in addition to operating as a receiving device. Thus, UEs 406, 408 are illustrated as transmitting transmissions 416, 420. The transmissions 414, 416, 420 may be broadcast or multicast to nearby devices. For example, UE 414 may transmit communication intended for receipt by other UEs within a range 401 of UE 414. Additionally/alternatively, RSU 407 may receive communication from and/or transmit communication to UEs 402, 404, 406, 408.

UE 402, 404, 406, 408 or RSU 407 may comprise a detection component, similar to 198 described in connection with FIG. 1. UE 402, 404, 406, 408 or RSU 407 may also comprise a BSM or mitigation component, similar to 199 described in connection with FIG. 1.

Figure 5A:
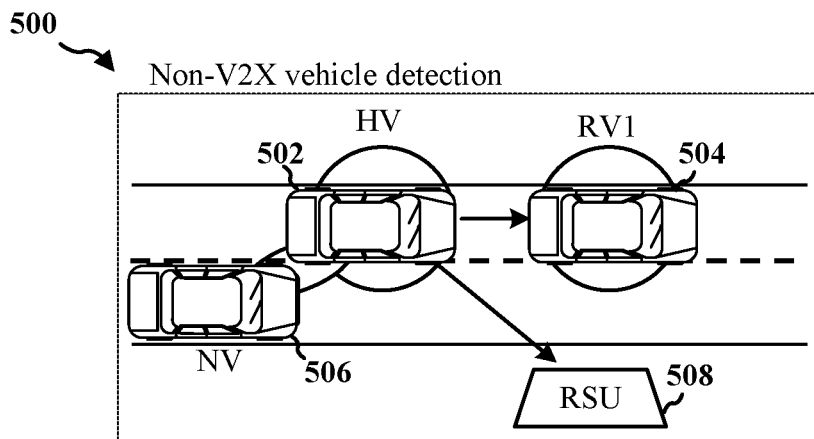
FIGS. 5A-5D are diagrams illustrating examples of sensor-sharing for cooperative and automated driving systems.
Figure 5B:
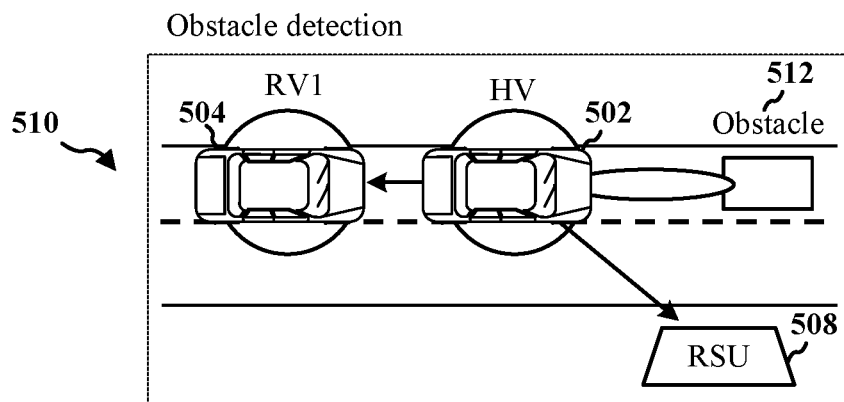
Figure 5C:
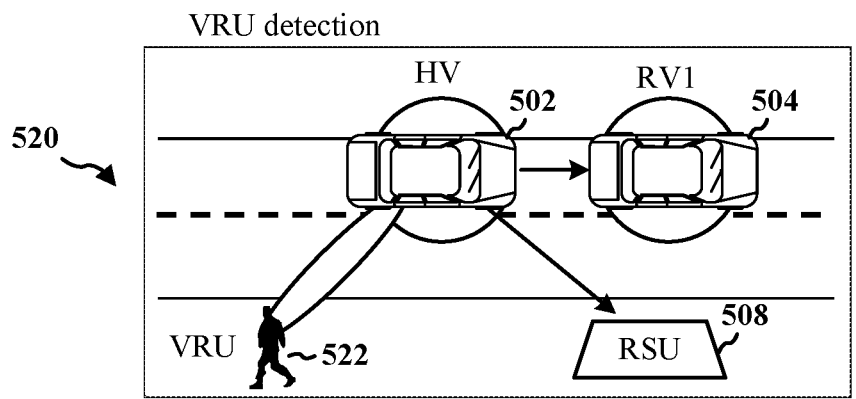
Figure 5D:
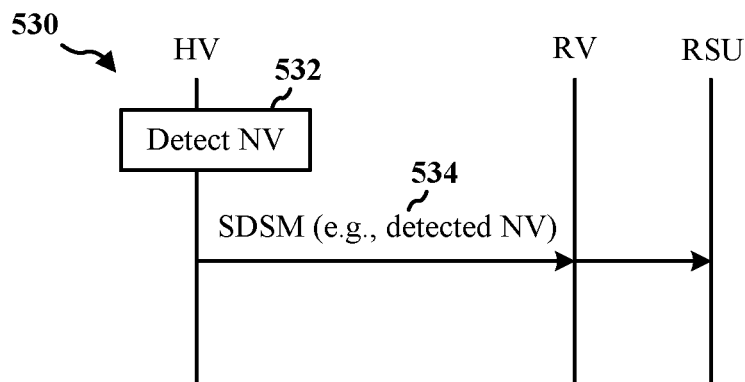
Figure 6:
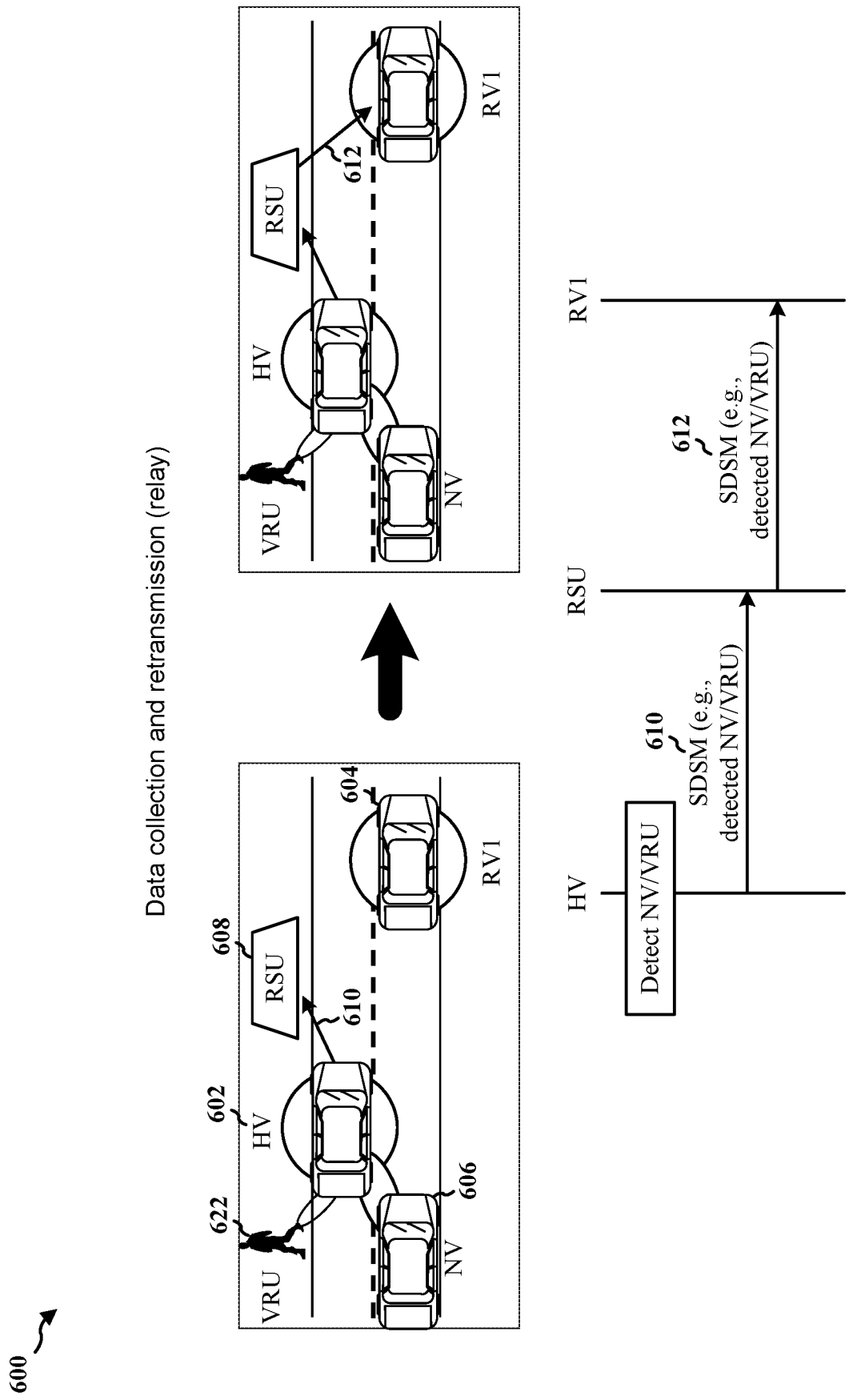
FIG. 6 is a diagram illustrating an example of sensor-sharing for cooperative and automated driving systems.
Figure 7:
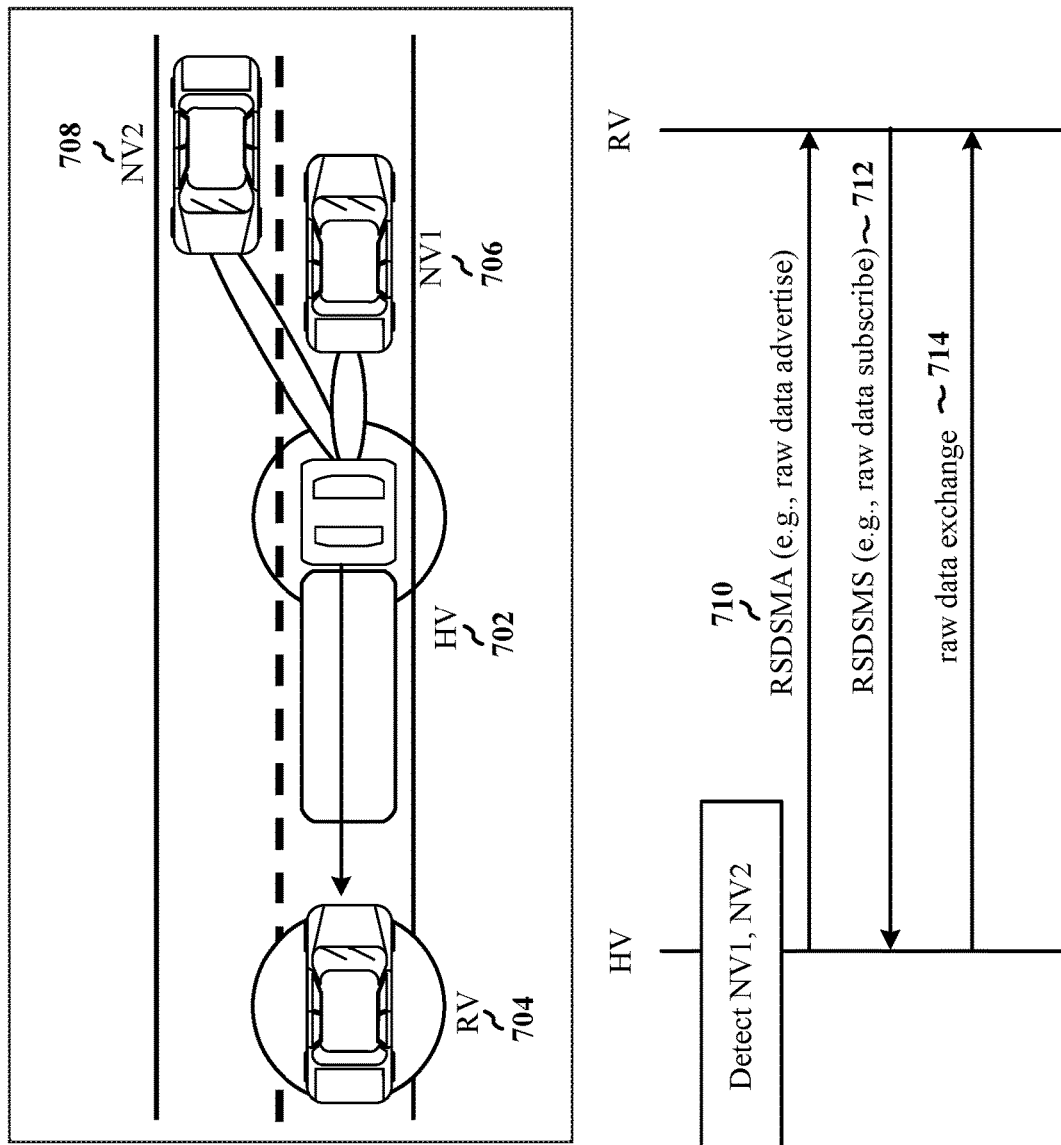
FIG. 7 is a diagram illustrating an example of sensor-sharing for cooperative and automated driving systems.

In wireless communications, such as V2X communications, V2X entities may perform sensor sharing with other V2X entities for cooperative and automated driving. For example, with reference to diagram 500 of FIG. 5A, the host vehicle (HV) 502 may detect a number of items within its environment. For example, the HV 502 may detect the presence of the non-V2X entity (NV) 506. The HV 502 may inform other entities, such as a first remote vehicle (RV1) 504 or a road side unit (RSU) 508, about the presence of the NV 506, if the RV1 504 and/or the RSU 508, by themselves, are unable to detect the NV 506. The HV 502 informing the RV1 504 and/or the RSU 508 about the NV 506 is a sharing of sensor information. With reference to diagram 510 of FIG. 5B, the HV 502 may detect a physical obstacle 512, such as a pothole, debris, or an object that may be an obstruction in the path of the HV 502 and/or RV1 504 that has not yet been detected by RV1 504 and/or RSU 508. The HV 502 may inform the RV1 and/or the RSU 508 of the obstacle 512, such that the obstacle 512 may be avoided. With reference to diagram 520 of FIG. 5C, the HV 502 may detect the presence of a vulnerable road user (VRU) 522 and may share the detection of the VRU 522 with the RV1 504 and the RSU 508, in instances where the RSU 508 and/or RV1 504 may not be able to detect the VRU 522. With reference to diagram 530 of FIG. 5D, the HV, upon detection of a nearby entity (e.g., NV, VRU, obstacle) may transmit a sensor data sharing message (SDSM) 532 to the RV and/or the RSU to share the detection of the entity. The SDSM 532 may be a broadcast message such that any receiving device within the vicinity of the HV may receive the message. In some instances, the shared information may be relayed to other entities, such as RVs. For example, with reference to diagram 600 of FIG. 6, the HV 602 may detect the presence of the NV 606 and/or the VRU 622. The HV 602 may broadcast the SDSM 610 to the RSU 608 to report the detection of NV 606 and/or VRU 622. The RSU 608 may relay the SDSM 610 received from the HV 602 to remote vehicles such that the remote vehicles are aware of the presence of the NV 606 and/or VRU 622. For example, the RSU 608 may transmit an SDSM 612 to the RV1 604, where the SDSM 612 includes information related to the detection of NV 606 and/or VRU 622. In some instances, remote vehicles may be updated repeatedly. For example, with reference to diagram 700 of FIG. 7, the HV 702 may detect the NV1 706 and/or NV2 708 and may share the presence of NV1 706 and/or NV2 708 with the RV 704. The HV 702 may transmit an SDSM 710 that advertises the raw data collected by the HV 702. The RV 704 may transmit an SDSM 712 which may comprise a request to subscribe to the raw data advertised by the HV 702. In response, the HV may transmit a raw data exchange 714 to the RV 704. Information related to certain objects may be included in an SDSM. For example, the SDSM may include information related to non-V2X vehicles, obstacles, or VRUs. These are objects that may be physically detected and may pose a physical obstruction or barrier to the pathway of a V2X vehicle. However, some objects may pose a risk to the cooperative and automated driving decisions of V2X vehicles.

In wireless communications, such as C-V2X communications, C-V2X distributed scheduling schemes (e.g., mode 4 for LTE-V2X or mode 2 for NR-V2X) utilize physical sensing for subchannel exclusion and may not account for resources occupied by hidden nodes while making reservations. Persistent hidden jammers or Wi-Fi out of band (OOB) interferers may decrease successful packet reception, especially at the edge of the broadcast range, which may reduce the effective range of C-V2X communications. This may be exacerbated by the presence of close-range hidden nodes in urban vehicular ad hoc networks (VANETs) which may go unseen due to the presence of obstructions and/or buildings. The hidden nodes may obstruct or cause interference to resources utilized in automated driving decisions. The hidden nodes may not be malicious entities that are intentionally trying to attack C-V2X safety applications. However, some hidden nodes may be malicious or threat entities and may pose attacks in the form of a denial of service (DoS) attack, jamming, or even OOB interference that is unintentional and is a known threat to C-V2X. These attacks from these entities, either malicious or not, may substantially hinder the utility of C-V2X enabled safety applications. If the attacks from these entities are not detected in time and appropriately mitigated or avoided, such attacks may pose immediate danger to road users.

Aspects provided herein provide a configuration for cooperative early threat detection using sensor sharing. For example, a first wireless device may share information related to a detected threat entity with other wireless devices. In some aspects, a first wireless device may share information of a detected threat entity with other wireless devices that are beyond a zone of the threat entity, such that the other wireless devices virtually sense the threat entity. In some aspects, a first wireless device may share information related to a detected threat entity with other wireless devices beyond a threat zone of the threat entity such that the other wireless devices may take preventive measures proactively.

Figure 8:
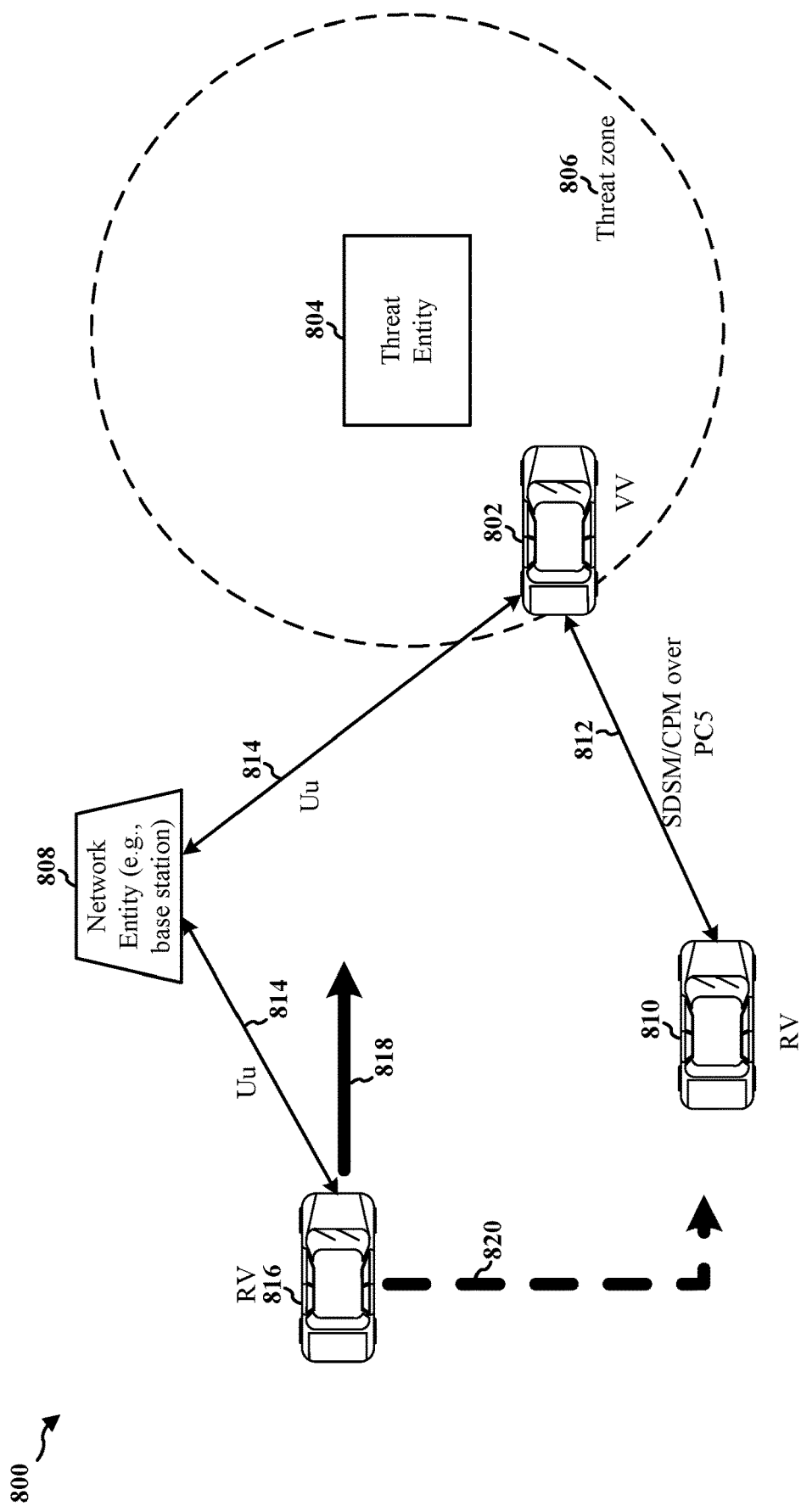
FIG. 8 is a diagram illustrating an example of detection of a threat entity.

FIG. 8 is a diagram 800 illustrating an example of detection of a threat entity. In some instances, a victim vehicle (VV) 802 may be a V2X entity and may encounter a threat entity 804. The VV 802 may encounter the threat entity 804 while being within the threat zone 806 of the threat entity 804. The VV 802 may detect the presence of the threat entity 804, as well as detect characteristics of the threat entity 804. In some instances, the threat entity 804 may be in the form of a DoS attack, a jammer, a misbehaving vehicle, an out of band (OOB) interferer, a wide area network (WAN) jammer, or a global navigation satellite systems (GNSS) jammer. The diagram 800 of FIG. 8 discloses one threat entity 804 that may pose a threat to VV 802. However, in some aspects, the threat to VV 802 may be posed by one or more threat entities. The one or more threat entities may be stationary or mobile. For example, a stationary threat entity may be located at a nearby building or outside a building near a street or intersection, while a mobile threat entity may comprise a vehicle.

Once the VV 802 detects the threat entity 804, the driver of the VV 802 may receive a notification and normal C-V2X operation may be halted. C-V2X operation may be halted upon detection of the threat entity 804 due to the threat entity 804 obstructing or interfering with the wireless resources or spectrum used in cooperative and automated driving decisions. For example, safety features of C-V2X operation may be obstructed that may pose a danger to other road users. As such, transmission of basic safety messages (BSMs) may be halted upon detection of the threat entity 804.

The threat entity 804 may be a cyber threat and may be considered as a new class of detected objects, in a manner similar to detected NVs, VRUs, or physical obstacles in FIGS. 5A-7. As such, the detection of the threat entity 804 may be encoded as an SDSM or cooperative perception message (CPM) due to it being a spectrum and/or security obstacle, as opposed to a physical obstacle. The SDSM or CPM may be broadcasted by the VV 802 to reach remote vehicles (RVs) 810 that are outside the threat zone 806 of the threat entity 804. In some aspects, the VV 802 may broadcast the SDSM or CPM over a PC5 link 812 to a RV 810. The RV 810 may be within the range of sidelink transmission of the VV 802 in order to receive the SDSM or CPM over the PC5 link 812. In some aspects, an RV 816 may be beyond the sidelink transmission range of the VV 802. In such instances, the VV 802 may broadcast the SDSM or CPM to a network entity (e.g., RSU 808) over a PC5 interface 814, such that the RSU 808 may relay the SDSM or CPM to the RV 816 and other RVs that are outside the threat zone 806 and/or beyond the sidelink transmission range of VV 802.

After detection of the threat entity 804, the VV 802 may be configured to classify the type of threat entity 804, as being at least one of a DoS attacker, a misbehaving vehicle, a jammer, an OOB interferer, a WAN jammer, or a GNSS jammer. The VV 802 may classify the type of threat entity 804 based on the data received from the threat entity 804. The data received from the threat entity 804 may include data that is inconsistent with projected data for wireless devices. For example, the data may include erroneous or implausible location data or may include values for a speed or heading of the threat entity 804 that are well beyond the actual speed or head. The VV 802 may include a confidence value associated with the classification of the threat entity 804. In some aspects, the classification of the threat entity 804 may be based on a measured RSSI of the threat entity 804, such as over the entire bandwidth (e.g., wideband) of the VV 802 or over each subchannel (e.g., narrowband).

Figure 11:
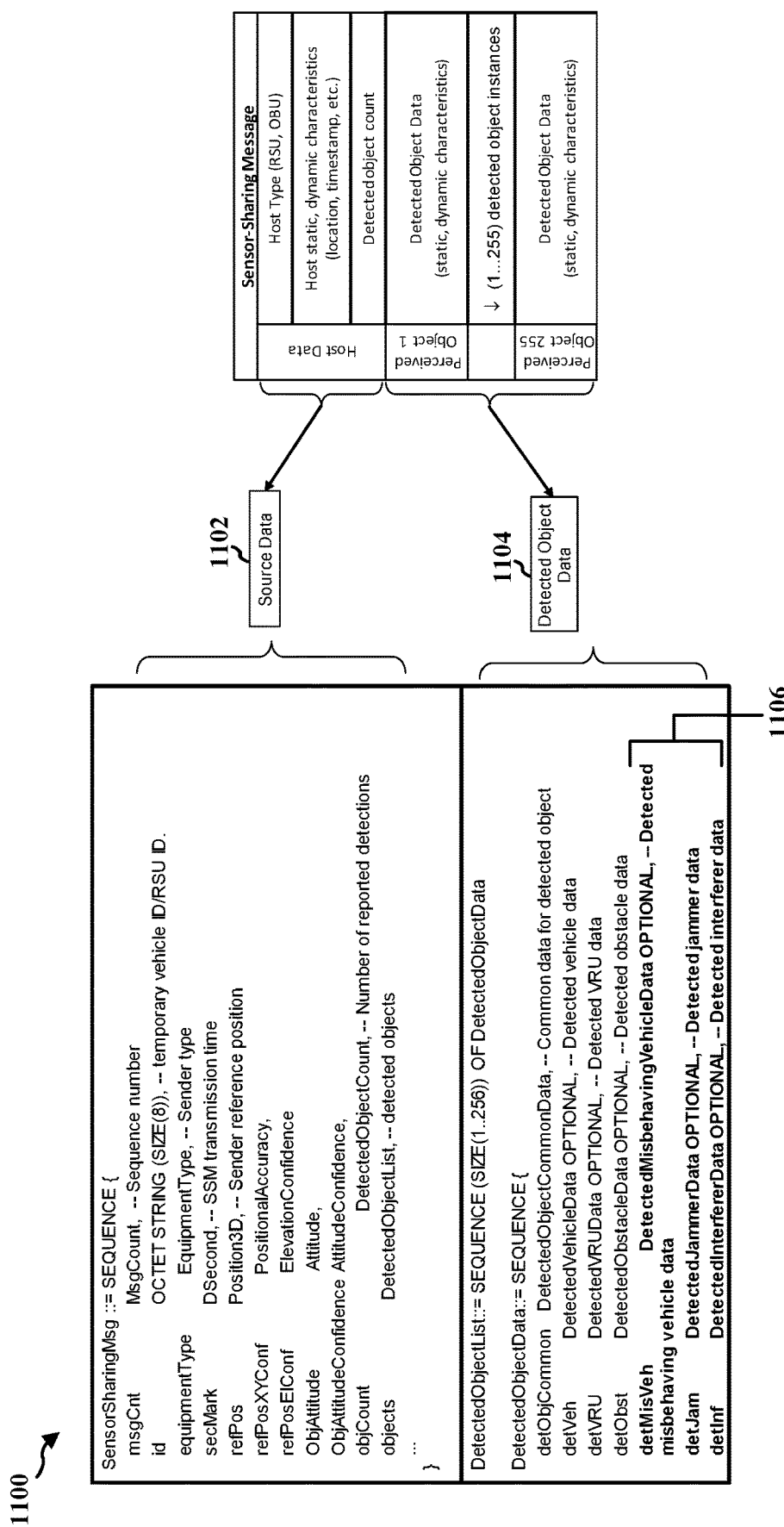
FIG. 11 is a diagram illustrating an example of sensor data sharing message structure.
Figure 12:
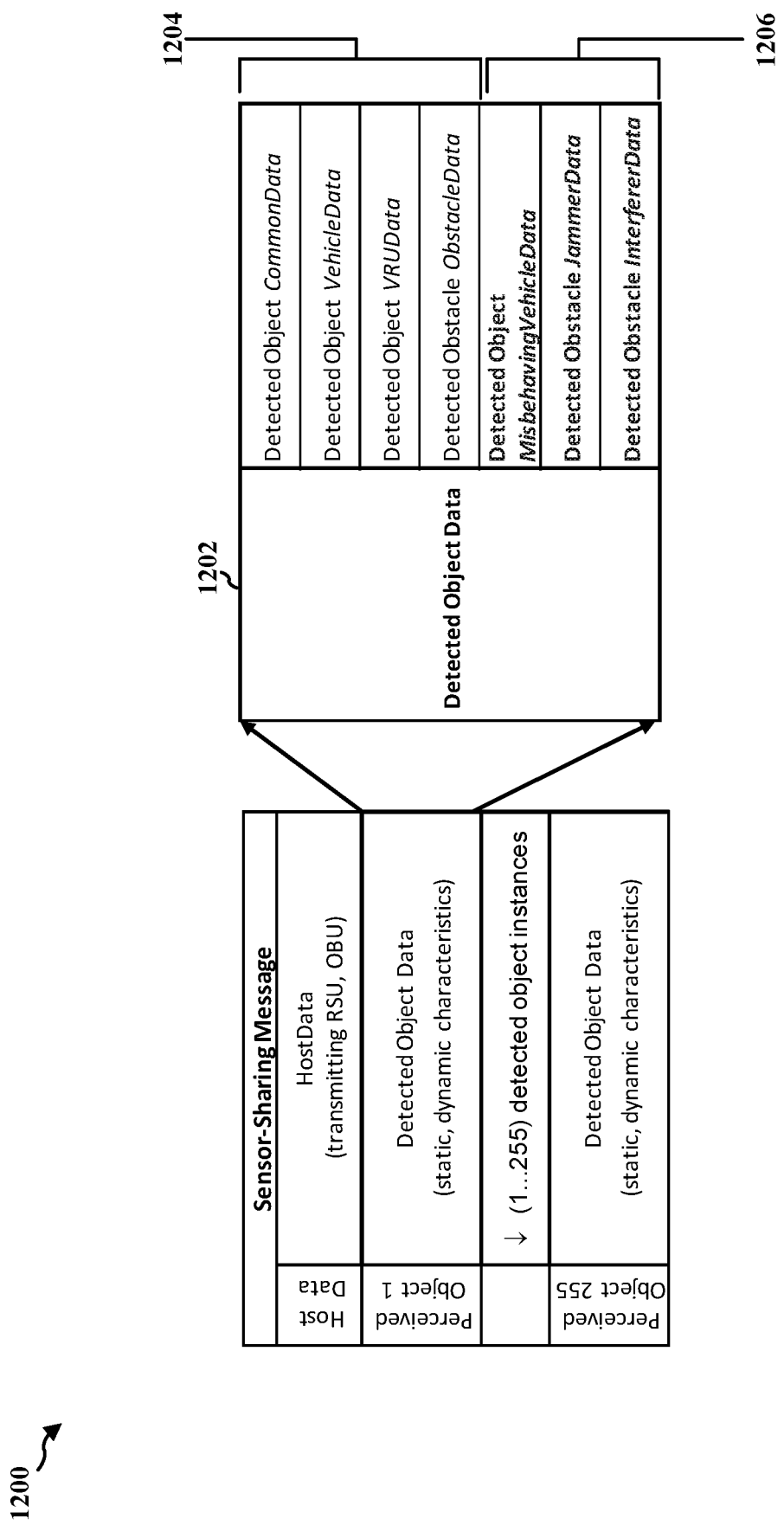
FIG. 12 is a diagram illustrating an example of sensor data sharing message structure.
Figure 13:
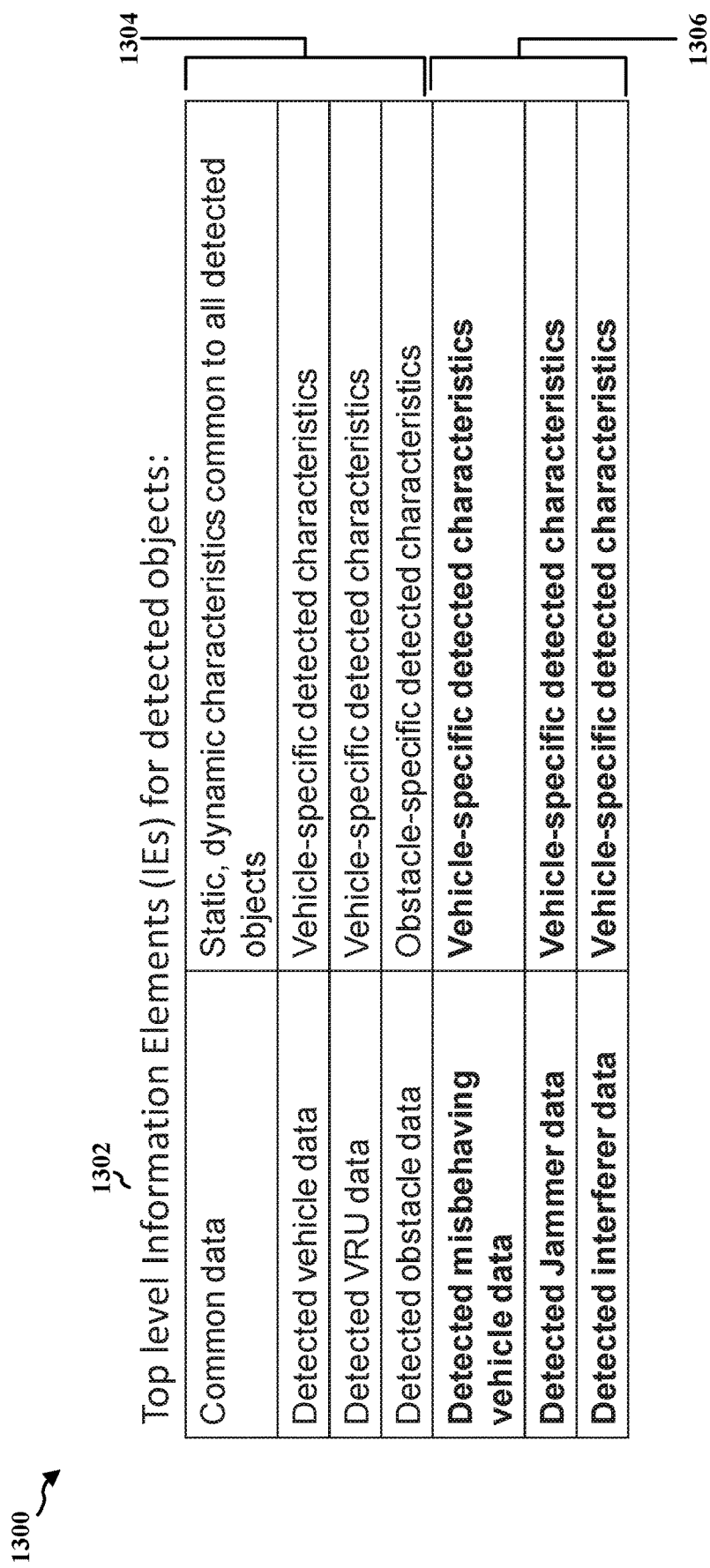
FIG. 13 is a diagram illustrating an example of information elements for detected objects in sensor data sharing message.
Figure 14:
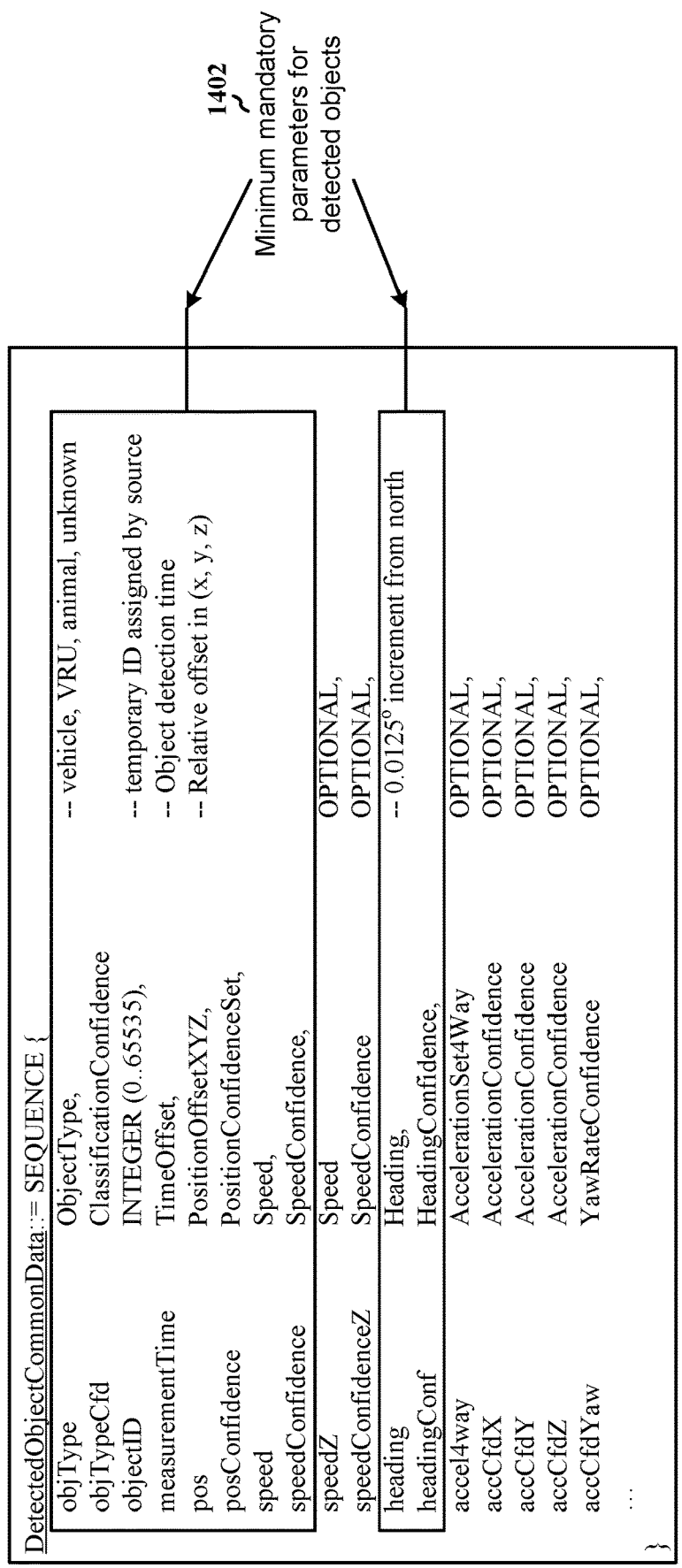
FIG. 14 is a diagram illustrating an example of parameters for detected objects in sensor data sharing messages.

In some aspects, to report the characteristics of the threat entity 804, a hierarchical data structure may be used that comprises the report of the characteristics of the threat entity 804. In some instances, the report may include information related to the location, speed, heading, or timestamp of the VV 802. Information related to the measured RSSI of the threat entity 804 at the VV 802 may be included in the report. For example, with reference to diagram 1100 of FIG. 11, the source data 1102 may include information related to the VV 802, while detected object data 1104 may include information related to the detected threat entity 804. The detected object data 1104 may comprise common data related to the threat and may further comprise dedicated information 1106 related to the specific threat, depending on whether the threat is a misbehaving vehicle, a jammer, or an interferer. With reference to diagram 1200 of FIG. 12, the detected object data 1202 may include physical obstacles 1204 (e.g., potholes, VRU, non-V2X vehicles), and may also include detected objects 1206 that interfere with wireless resources or spectrum used in cooperative and automated driving decisions. For example, 1206 may include misbehaving vehicle data, jammer data, or interferer data. With reference to diagram 1300 of FIG. 13, top level information elements (IE) 1302 for detected objects may include specific detected characteristics of the detected object. For example, data elements 1304 may include non- V2X vehicle data, VRU data, physical obstacle data, while data elements 1306 may include misbehaving vehicle data, detected jammer data, and detected interferer data that are vehicle specific detected characteristics. With reference to diagram 1400 of FIG. 14, provides an example of parameters 1402 of detected objects. For example, the parameters 1402 may include the position, speed, and heading of the threat. For detected jammer or interferer, the parameters 1402 may include the RSSI values. For a DoS attack, the parameters 1402 may include the position, speed, or heading. In some aspects, for example for detected jammer or interferer, the parameters 1402 may further include a radius around the position where the threat may potentially reside.

In some aspects, an average measured RSSI over the entire C-V2X and/or NR bandwidth may be reported, since jamming is usually wideband. In some aspects, for example to classify an OOB emission and/or narrowband jamming, the RSSI for each subchannel averaged over a window may be included in the report for instances where the RSSI for a particular subchannel exceeds a threshold. In some aspects, for example to classify DoS attack and/or a misbehaving vehicle, the measured RSSI of the threat entity 804 at the VV 802 may not be relevant, such that a layer 2 (L2) address of the threat entity 804 may be included, such that RVs (e.g., 810, 816) may pre-filter any received DoS packets at the modem layer. In some aspects, the VV 802 may report the detection of the threat entity 804 in instances where the threat entity 804 is detected over a preconfigured time interval. In some aspects, the VV 802 may combine the measured RSSI of the threat entity 804 with readings from other sensors (e.g., camera, radar, LIDAR) of the VV 802 to determine a measurement of the location of the threat entity 804. In some aspects, the VV 802 may combine the measured RSSI of the threat entity 804 with V2I messages (e.g., MAP information) to determine the measurement of the location of the threat entity 804. The VV 802 may include an associated confidence value of the measurement of the location of the threat entity 804 and the measurement of the location of the threat entity 804 in the report.

In some aspects, the RV 816 may initiate a mitigation action in response to receiving the SDSM or CPM. The RV 816 may initiate the mitigation action in response to receiving the SDSM or CPM to avoid or mitigate contact with the threat entity 804. The threat entity 804 may obstruct wireless spectrum or resources utilized in cooperative or automated driving decisions. In some aspects, the mitigation action may comprise selecting an alternate path 820 to avoid the threat entity 804. For example, the RV 816 may have a scheduled or planned path 818 and may select the alternate path 820 to avoid the threat entity 804 in response to receiving the SDSM reporting the presence of the threat entity 804. The threat entity 804 may substantially degrade the wireless spectrum or resources utilized in cooperative or automated driving decisions. Cooperative or automated driving decisions may require a high reliability for safety purposes. In some aspects, the RV 816 may determine to alter its scheduled route or path 818 of travel to one that is least affected by the detected threat entity or any threat entity. The RV 816 may avoid or mitigate contact with the threat entity 804 in instances where the RV 816 receives the SDSM, indicating the threat entity 804, from the network entity 808 (e.g., base station). The RV 816 being distanced from the VV 802 may not be within range to receive the SDSM directly from the VV 802 via PC5, such that the RV 816 receives the SDSM relayed from network entity 808 (e.g., base station) via a Uu link 814. The RV 816 being distanced from the VV 802 may provide the RV 816 with sufficient time to prepare the mitigation action, such as but not limited to taking an alternate path 820 to avoid the threat entity 804, utilizing a more robust MCS, or virtual sensing the threat entity. In some aspects, the network entity 808 may comprise a cellular access point, such as but not limited to a base station, or a multi-access edge computing (MEC) system which may be configured to provide a detailed RF fingerprint of known threats (e.g., stationary) such as Wi-Fi Access Points at street intersections and transmit to a cloud endpoint via Uu which may be transmitted to the second wireless device. In some instances, the RSU or MEC may obtain an improved localization of the threat entity 804 than the VV 802 due, in part, to the RSU or MEC having higher computational resources and/or sensory inputs. In addition, the RSU or MEC may transmit the message reporting the threat entity 804 to the RV 816 via PC5 and/or Uu interfaces.

Figure 9:
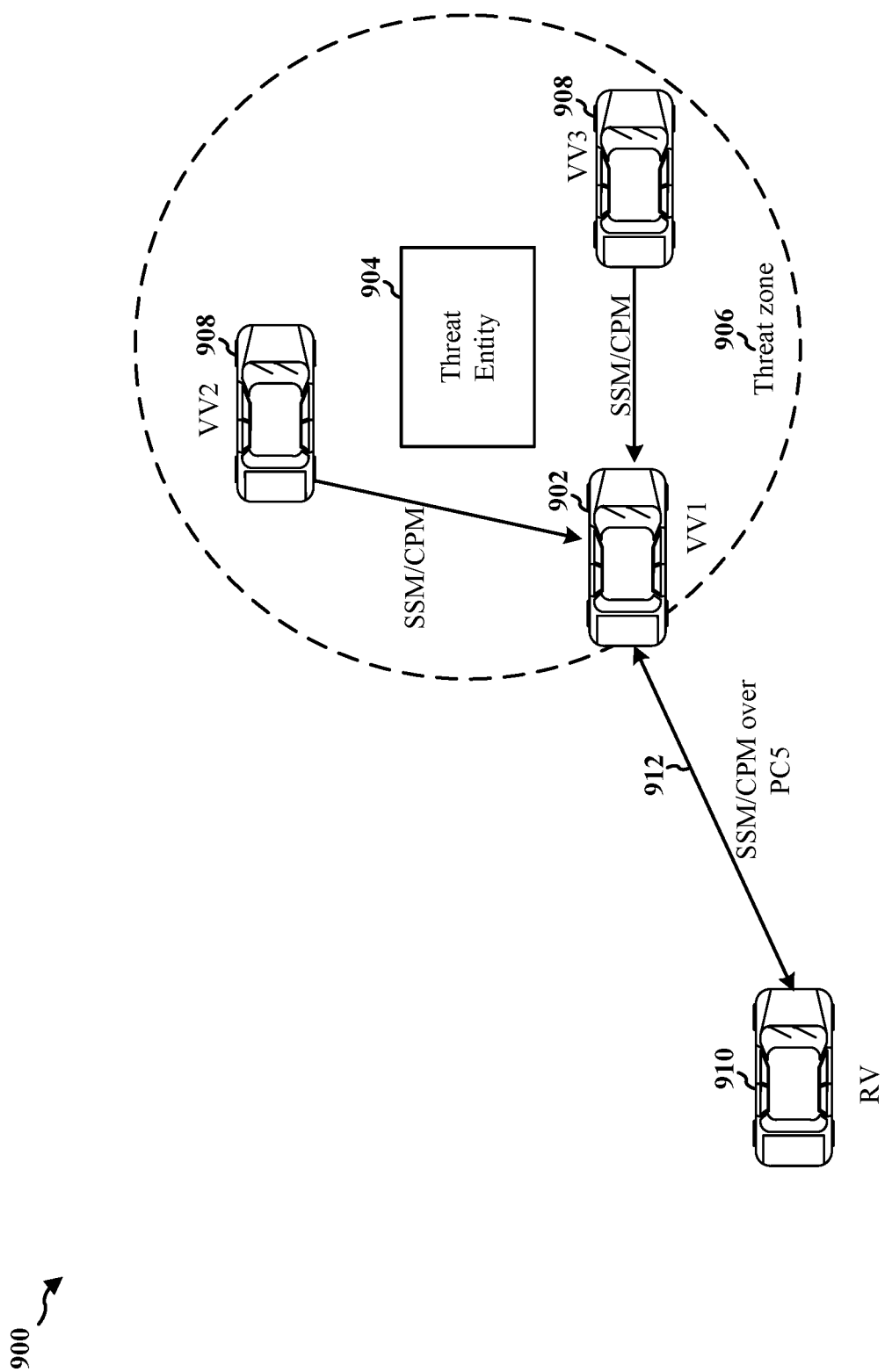
FIG. 9 is a diagram illustrating an example of detection of a threat entity.

In some aspects, as shown for example in the diagram 900 of FIG. 9, the VV1 902 may receive reports from other VVs (e.g., VV2 908 and/or VV3 908) reporting the same threat entity 904 to determine the measurement of the location of the threat entity 904. The VV1 902 may include the measurement of the location of the threat entity 904 along with a confidence value associated with the measurement of the location of the threat entity 904 in the report transmitted to RV 910. The VV2 908 and VV3 908 may also be within the threat zone 906 of the threat entity 904, such that VV2 908 and VV3 908 report the same threat entity to VV1 902. In some aspects, the VV1 902 may combine the report from VV2 908 and VV3 908 along with readings from other sensors of VV1 902 and the measured RSSI of the threat entity 904 to determine the estimated location of the threat entity 904.

Figure 10A:
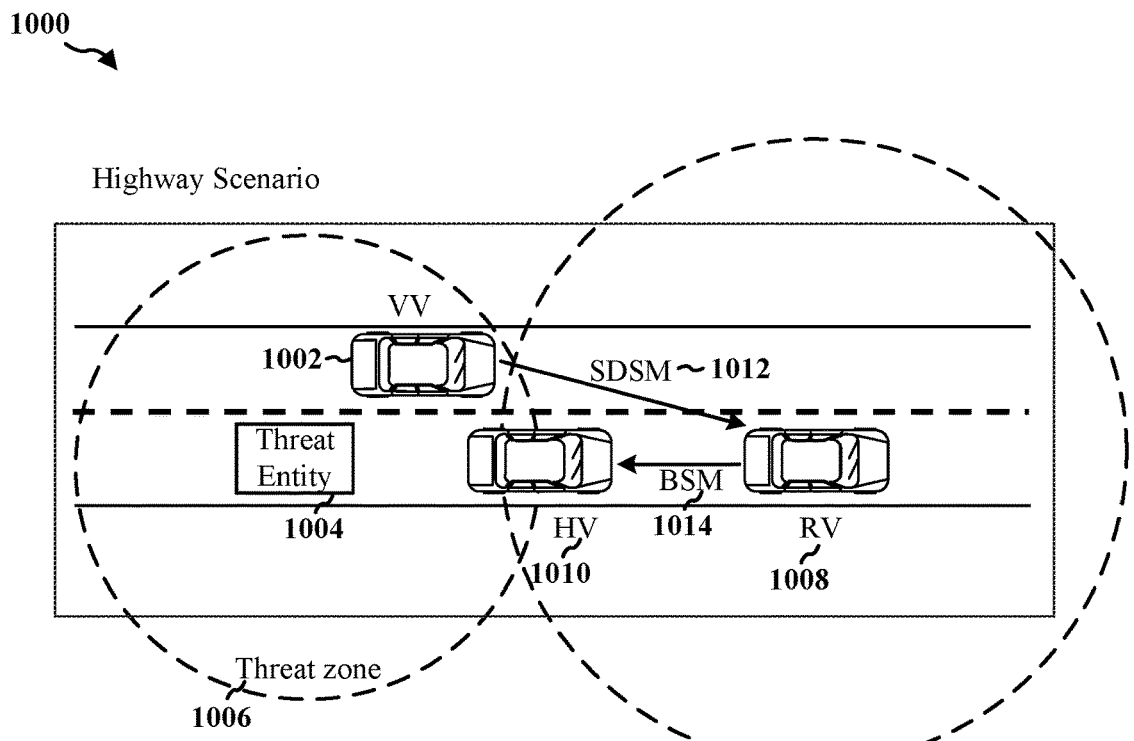
FIGS. 10A-10B are diagrams illustrating an example of detection and reporting of a threat entity.
Figure 10B:
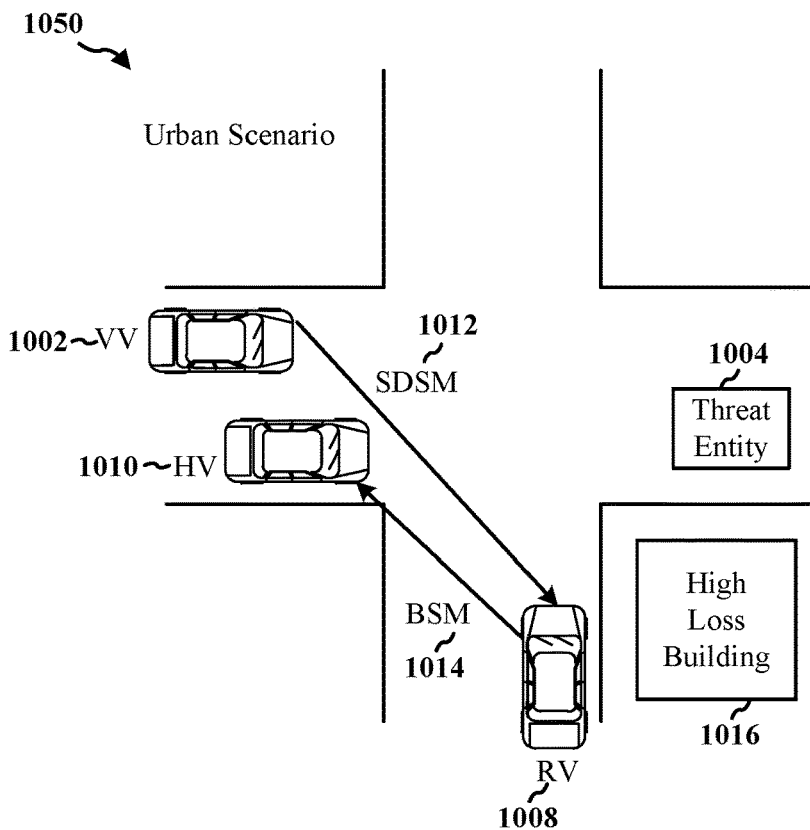

FIGS. 10A-10B are diagrams 1000, 1050 illustrating an example of detection and reporting of a threat entity. For example, the diagram 1000 is an example of a highway scenario, while diagram 1050 is an example of an urban scenario. In some aspects, the VV 1002 may report the detected threat entity 1004 to the RV 1008 that may be beyond the threat zone 1006 of the threat entity 1004, such that the RV 1008 may virtually sense the threat entity 1004. In some instances, such as the highway scenario of diagram 1000 of FIG. 10A, the RV 1008 may be beyond the threat zone 1006 of the threat entity 1004 based on distance. In some instances, such as the urban scenario of diagram 1050 of FIG. 10B, the RV 1008 may be beyond the threat zone of threat entity 1004 due to a high loss building 1016 being in between the RV 1008 and the threat entity 1004, such that the high loss building 1016 blocks the signal of the threat entity 1004 from reaching the location of the RV 1008.

The RV 1008 may virtually sense the threat entity 1004 based on the report (e.g., SDSM 1012) received from the VV 1002 and determine one or more subchannels to transmit a BSM based on virtually sensing the threat entity 1004. In some aspects, the VV 1002 may detect subchannels on which the BSMs are communicated having an RSSI greater than an RSSI threshold due to the threat entity 1004. The VV 1002 may detect the presence of the threat entity 1004 and extract relevant information. The relevant information may vary based on the threat entity 1004. In some aspects, a first subset of subchannels having an RSSI greater than the RSSI threshold may be detected based on an average of the RSSI for the subset of subchannels. In such aspects, the relevant information may correspond to a jammer device, such that the threat entity 1004 is the jammer device. In some aspects, the subset of subchannels having the RSSI greater than the RSSI threshold may be detected for each subchannel in the subset of subchannels being greater than the RSSI threshold for at least an RSSI window time length. In such aspects, the relevant information may correspond to an OOB interferer, such that the threat entity 1004 is the OOB interferer. The relevant information may be shared with the RV 1008 in the SDSM 1012.

In some aspects, the RV 1008 may determine one or more subchannels of a set of subchannels on which to transmit the BSM 1014. The RV 1008 may determine the one or more subchannels of the set of subchannels on which to transmit the BSM 1014 based at least in part of the SDSM 1012 indicating the first subset of subchannels. In some aspects, the determination of the subchannel of the set of subchannels based at least in part of the SDSM 1012 indicating the first subset of subchannels may be further based on whether additional messages are received from other wireless devices indicating the first subset of subchannels. For example, the RV 1008 may determine which subchannels are excluded to transmit the BSM based on the additional messages the RV 1008 receives from one or more other VVs reporting the threat entity. In instances where multiple VVs are within the threat zone 1006 affected by the threat entity 1004 and the RV 1008 receives multiple messages from the VVs reporting the presence of the threat entity 1004, the receipt of the multiple messages may be indicative of a reliable report of the presence of the threat entity 1004. In instances where multiple VVs are within the threat zone 1006 affected by the threat entity 1004 and the RV 1008 receives one SDSM 1012 (or a minimal amount of messages that is much less than the number of multiple VVs) reporting the presence of the threat entity 1004, the receipt of the one SDSM 1012 (or the minimal amount of messages that is much less than the number of multiple first wireless devices) may be indicative of an unreliable report. In such instances, the RV 1008 may transmit the BSM 1014, but the mitigation undertaken to allow for the scheduling of the BSM 1014 to avoid the threat entity may not be invoked if the source of the report (e.g., SDSM) is not reliable. The RV 1008 may transmit the BSM 1014 on the determined at least one subchannel to at least an HV 1010. The transmitted BSM 1014 may be a broadcast message such that the transmitted BSM 1014 may be transmitted to and received by any wireless device within a vicinity of the RV 1008. In some aspects, the BSM 1014 may be transmitted over more than one subchannel.

Figure 15:
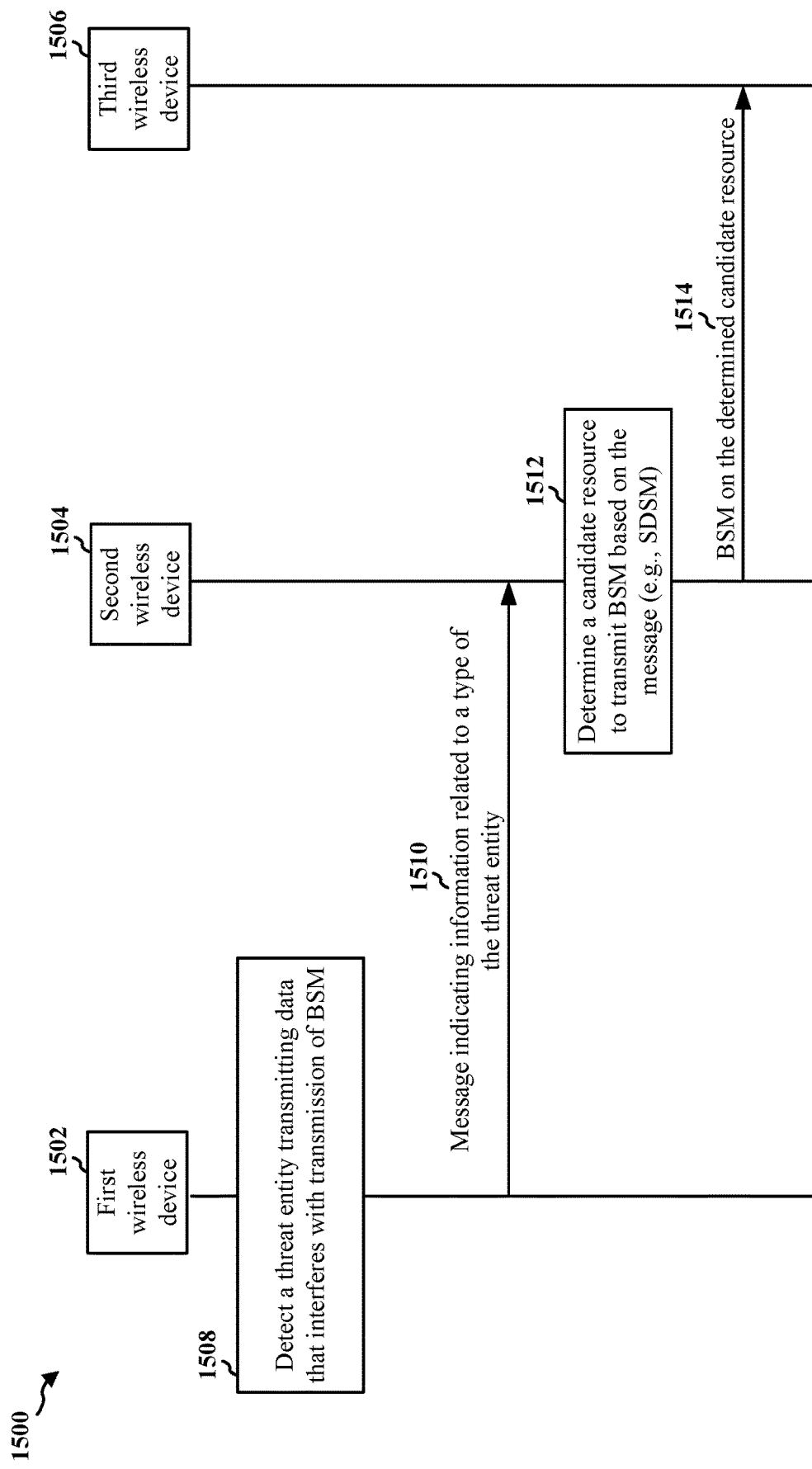
FIG. 15 is a call flow diagram of signaling between a first wireless device, a second wireless device, and a third wireless device.

FIG. 15 illustrates an example communication flow 1500 between a first wireless device 1502, a second wireless device 1504, and a third wireless device 1506. The communication may be based on V2X, V2V, or D2D based communication directly from a transmitting device to a receiving device. The communication transmitting from device 1502, 1504 may be broadcast and received by multiple receiving devices within range of a particular transmitting device, as described in connection with FIG. 4. The first wireless device 1502 may correspond to a first UE, and the second wireless device 1504 may correspond to a second UE. The first wireless device 1502, the second wireless device 1504, and/or the third wireless device 1506 may correspond to a C-V2X entity. For example, in the context of FIG. 1, the first wireless device 1502 may correspond to at least UE 104, and the second wireless device 1504 may correspond to at least 104'. In another example, in the context of FIG. 3, the first wireless device 1502 may correspond to the device 350, and the second wireless device 1504 may correspond to the device 310.

As illustrated at 1508, the first wireless device 1502 may detect a threat entity transmitting data that interferes with transmission of BSMs. The first wireless device may detect the presence of the threat entity and extract relevant information related to the threat entity. The relevant information may vary based on the threat entity. In some aspects, the threat entity may comprise a DoS attacker, a jammer, a misbehaving vehicle, an OOB interferer, a WAN jammer, or a GNSS jammer. The relevant information may be shared, by the first wireless device, with other wireless devices beyond a threat zone of the threat entity.

As illustrated at 1510, the first wireless device 1502 may transmit a message indicating information related to a type of the threat entity. The first wireless device may transmit the message indicating the information related to the type of the threat entity to at least a second wireless device. The second wireless device 1504 may receive the message from the first wireless device 1502. In some aspects, the information in the message may comprise a subset of subchannels having a reference RSSI greater than an RSSI threshold. In some aspects, the subset of subchannels having the reference RSSI greater than the RSSI threshold may be based on an average of the RSSI for the subset of subchannels being greater than the RSSI threshold for at least an RSSI window time length. In some aspects, the subset of subchannels having the reference RSSI greater than the RSSI threshold may be based on an average of the RSSI for each subchannel in the subset of subchannels being greater than the RSSI threshold for at least an RSSI window time length. The information in the message may further indicate at least one of the average RSSI on the subset of subchannels, the average RSSI for each subchannel in the subset of subchannels, the RSSI threshold, the RSSI window time length, a location of the threat entity influencing the RSSI in at least one of the subset of subchannels, or a location confidence radius in association with the threat entity influencing the RSSI in at least one of the subset of subchannels, or a combination thereof. In some aspects, the transmitted message may be an SDSM, an I2V message, or a CPM. The transmitted message may be a broadcast message such that the transmitted message may be received by any wireless device within a vicinity of the first wireless device.

As illustrated at 1512, the second wireless device 1504 may determine a candidate resource of a set of candidate resources on which to transmit a BSM. The second wireless device 1504 may determine the candidate resource of the set of candidate resources on which to transmit the BSM based at least in part on the message indicating the information related to the threat entity from the first wireless device. In some aspects, the information in the message may comprise a subset of subchannels having an RSSI greater than an RSSI threshold. In some aspects, the subset of subchannels having the RSSI greater than the RSSI threshold may be based on an average of the RSSI for the subset of subchannels being greater than the RSSI threshold for at least an RSSI window time length. In some aspects, the subset of subchannels having the RSSI greater than the RSSI threshold may be based on an average of the RSSI for each subchannel in the subset of subchannels being greater than the RSSI threshold for at least an RSSI window time length. The information in the message may further indicate at least one of the average RSSI of the subset of subchannels, the average RSSI for each subchannel in the subset of subchannels, the RSSI threshold, the RSSI window time length, a location of the threat entity influencing the RSSI in at least one of the subset of subchannels, or a location confidence radius in association with the threat entity influencing the RSSI in at least one of the subset of subchannels, or a combination thereof. In some aspects, the candidate resources may comprise a candidate single-subframe resource (CSR), and the set of candidate resources may comprise a set of CSRs. The CSR may comprise one or more subchannels of the set of candidate resources. In some aspects, the determination of the candidate resource of the set of candidate resources may be further based on whether additional messages are received from other wireless devices indicating the threat entity with the threat zone, as indicated in the message from the first wireless device. For example, the second wireless device may determine which candidate resources may be excluded to transmit the BSM based on the additional messages the second wireless device receives from one or more other wireless devices reporting the threat entity. In instances where multiple wireless devices (e.g., victim vehicles) are within a zone affected by the threat entity and the second wireless device receives multiple messages from the multiple wireless devices (e.g., victim vehicles) reporting the presence of the threat entity, the receipt of the multiple messages may be indicative of a reliable report of the presence of the threat entity. In instances where multiple wireless devices (e.g., victim vehicles) are within the zone affected by the threat entity and the second wireless device receives one message (or a minimal amount of messages that is much less than the number of multiple first wireless devices) reporting the presence of the threat entity, the receipt of the one message (or the minimal amount of messages that is much less than the number of multiple wireless devices) may be indicative of an unreliable report. In such instances, the second wireless device may transmit the BSM, but a mitigation undertaken to allow for the scheduling of the BSM to avoid the threat entity may not be invoked if the source of the report (e.g., SDSM) is not reliable.

In some aspects, to determine the candidate resource of the set of candidate resources to transmit the BSM, the second wireless device 1504 may determine if the set of candidate resources are LTE-V2X or NR-V2X. In instances where the candidate resources are LTE-V2X, the second wireless device 1504 may exclude one or more candidate resources in the set of candidate resources based on a projected reference signal received power (RSRP) for each candidate resource in the set of candidate resources exceeding an RSRP threshold. The second wireless device 1504 may exclude the one or more candidate resources based on the projected RSRP that exceeds the RSRP threshold to determine a first subset of candidate resources. In some aspects, candidate resources may be excluded based on the RSRP until a certain amount of candidate resources remain in a selection pool (e.g., set of candidate resources). In some aspects, the certain amount may comprise twenty percent (20%) of the set of candidate resources. In some aspects, the certain amount may be greater than twenty percent (20%) of the set of candidate resources. In some aspects, the second wireless device may also exclude some of the CSRs based on its half-duplex operation.

In some aspects, the second wireless device 1504 may rank the first subset of candidate resources based on a weighted RSSI ranking to obtain a second subset of candidate resources. The second subset of candidate resources may have a lowest weighted RSSI. The second subset of candidate resources may be a portion of the first subset of candidate resources. In some aspects, the weighted RSSI may be comprised of physically sensed candidate resources and virtually sensed candidate resources. The physically sensed candidate resources may comprise candidate resources measured by the second wireless device within the sensing window. The virtually sensed candidate resources may comprise subchannels measured by the first wireless device and indicated within the message received by the second wireless device from the first wireless device. In some aspects, the virtually sensed candidate resources may be based on at least one of a location of the threat entity influencing an RSSI of candidate resources, a location confidence radius in association with the threat entity, a timestamp associated with the message received from the first wireless device, a velocity of the second wireless device, an acceleration of the second wireless device, a direction of travel of the second wireless device in relation to the location of the threat entity, information related to roadway geometry, or transmission requirements associated with the BSM, or a combination thereof. In some aspects, the weighted RSSI ranking may be based on the candidate resources remaining after the exclusion of candidate resources that have an RSRP above a threshold and the candidate resources remaining after the exclusion of candidate resources due to the half-duplex operation.

The second wireless device 1504 may rank the first subset of candidate resources based on the weighted RSSI ranking to obtain the second subset of candidate resources having the lowest weighted RSSI, such that the candidate resources from the first subset having the highest weighted RSSI are excluded from the selection pool. The candidate resources of the first subset having the highest weighted RSSI may be excluded until the certain amount (e.g., 20%) of the resources remain in the selection pool. The candidate resource on which to transmit the BSM may be determined from the second subset of candidate resources. The ranking of the first subset of candidate resources may be based on the weighted RSSI which may be based on the measured RSSI for the first subset of subchannels indicated in the message from the first wireless device (e.g., virtually sensed) and may be based on the projected RSSI of candidate resources based on measurements by the second wireless device in the sensing window (e.g., physically sensed). The second wireless device may perform physical sensing by obtaining RSSI measurements of candidate resources during a sensing window and excludes the corresponding candidate resources from the selection pool if values exceed a threshold. The second wireless device may perform virtual sensing and exclude jammed or interfered resources (e.g. subchannels) based on RSSI measurements reported within the message (e.g., SDSM message) received from the first wireless device (e.g., victim vehicle). The second wireless device may not detect the jammed or interfered resources (e.g., subchannels) reported by the first wireless device, and may utilize the information in the message shared by the first wireless device (e.g., victim vehicle) to exclude such jammed or interfered subchannels. Candidate resources of the first subset of candidate resources with the highest weighted RSSI may be excluded until a certain amount of resources are remaining in a selection pool. The weighted RSSI of candidate resource x may be determined based on the following equation:

$$RSSI_x = \alpha RSSI_{x,phy} + \beta RSSI_{x,virt}$$

where $RSSI_{x,phy}$ is the RSSI of the candidate resource x physically sensed, and $RSSI_{x,virt}$ is the RSSI of candidate resource x virtually sensed, the value of $\alpha=1$, and $0 \leq \beta \leq 1$. The value of $\beta$ may be set based on the level of protection against hidden threat nodes. The value of $\gamma$ may be based on at least one of a location of the threat entity influencing the RSSI in at least one of the subset of subchannels, a location confidence radius in association with the threat entity influencing the RSSI in at least one of the subset of subchannels, a timestamp associated with the received message from the first wireless device, a velocity of the second wireless device, an acceleration of the second wireless device, a direction of travel of the second wireless device in relation to the location of the threat entity, information related to roadway geometry (e.g., MAP information), or transmission requirements associated with the BSM, or a combination thereof. For example, the value of β may be closer to 0 in instances where the second wireless device is traveling away from the threat entity, such that the average RSSI may rely more on the physically sensed candidate resources. In some aspects, the value of β may be closer to 1 in instances where the second wireless device may be close to the threat entity and may increase protection against the threat entity, such that the virtually sensed resources are accounted for in the average RSSI.

In some aspects, the second wireless device may select a candidate resource from the second subset of candidate resources for transmission of the BSM.

In instances where the candidate resources are NR-V2X, the second wireless device 1504 may exclude one or more virtually sensed candidate resources in the set of candidate resources. The second wireless device 1504 may exclude one or more virtually sensed candidate resources in the set of candidate resources having an RSSI that exceeds a pre-filter threshold. The second wireless device may exclude the one or more virtually sensed candidate resources having an RSSI that exceeds the pre-filter threshold to obtain a filtered subset of candidate resources that do not exceed the pre-filter threshold. In some aspects, the one or more virtually sensed candidate resources may be measured by the first wireless device and indicated within the message received by the second wireless device from the first wireless device. For example, the first wireless device may physically sense one or more subchannels that may be impacted by the threat entity, and may include such information in the message transmitted to the second wireless device, such that the second wireless device virtually senses the one or more subchannels. In some aspects, the virtually sensed candidate resources may be based on at least one of a location of the threat entity influencing an RSSI of subchannels, a location confidence radius in association with the threat entity, a timestamp associated with the message received from the first wireless device, a velocity of the second wireless device, an acceleration of the second wireless device, a direction of travel of the second wireless device in relation to the location of the threat entity, information related to roadway geometry, or transmission requirements associated with the BSM, or a combination thereof. The second wireless device may pre-filter the virtually sensed resources having an RSSI that is above a threshold (e.g., $\text{Thresh}_{virt}$). The virtually sensed resources having an RSSI that is above the threshold may be omitted from the pool of candidate resources prior to an RSRP-based exclusion being performed. In some aspects, the second wireless device may pre-filter the virtually sensed candidate resources based on the virtually sensed RSSI measurements of the one or more subchannels provided by the first wireless device until a certain amount of candidate resources remain available in a selection pool of candidate resources. In some aspects, the second wireless device may pre-filter the virtually sensed candidate resources until the certain amount of twenty percent (20%) of resources remain available in the selection pool (e.g., filtered subset). The certain amount being twenty percent is merely an example, and is not intended to be limited to the example provided herein. In some aspects, the certain amount may be greater than twenty percent (20%).

In some aspects, the second wireless device 1504 may exclude candidate resources within the filtered subset of candidate resources that do not exceed the pre-filter threshold that exceed an RSRP threshold to obtain a second subset of candidate resources that do not exceed the RSRP threshold. In some aspects, the second subset of candidate resources may comprise a preconfigured proportion of total candidate resources in the selection pool that do not exceed the pre-filter threshold. In some aspects, the pre-filter threshold may be adjusted if the second subset of candidate resources comprises an amount of candidate resources less than the preconfigured proportion of the total candidate resources in the selection pool. The pre-filter threshold may be further adjusted until the second subset of candidate resources comprises the preconfigured proportion of the total candidate resources in the selection pool. In some aspects, the preconfigured proportion of the total candidate resources in the selection pool may comprise twenty percent (20%). In some aspects, the preconfigured proportion of the total candidate resources in the selection pool may comprise greater than twenty percent (20%). In some aspects, the RSRP threshold may be adjusted in order for the second subset of candidate resources to comprise the preconfigured proportion of the total candidate resources in the selection pool. The RSRP threshold may be adjusted in addition to or in the alternative to adjusting the pre-filter threshold.

The candidate resource comprising at least one subchannel on which to transmit the BSM may be determined from the second subset of candidate resources. In some aspects, the second wireless device may exclude some of the candidate resources based on its half duplex operation, prior to selecting a candidate resource to transmit the BSM. The pre-filter threshold (e.g., $\text{Thresh}_{virt}$) may function in a manner similar to the β parameter discussed above. For example, the pre-filter threshold (e.g., $\text{Thresh}_{virt}$) may be adjusted based on the level of protection against virtually sensed resources. For example, if more protection against the virtually sensed resources is desired, then a value of the pre-filter threshold may be reduced. Reducing the pre-filter threshold may exclude more of the virtually sensed resources. In some aspects, the pre-filter threshold may be based on at least one of a location of the threat entity influencing the RSSI in at least one of the subset of subchannels, a location confidence radius in association with the threat entity influencing the RSSI in at least one of the subset of subchannels, a timestamp associated with the received message from the first wireless device, a velocity of the second wireless device, an acceleration of the second wireless device, a direction of travel of the second wireless device in relation to the location of the threat entity, information related to roadway geometry, or transmission requirements associated with the BSM, or a combination thereof.

In some aspects, the pre-filtering of the virtually sensed resources based on the pre-filter threshold (e.g., $\text{Thresh}_{virt}$) may work hand-in-hand with the RSRP-based exclusion. For example, if after the RSRP-based exclusion less than the certain amount (e.g., 20%) of resources are available in the selection pool (e.g., second subset of candidate resources), then the second wireless device may adjust the value of the threshold (e.g., $\text{Thresh}_{virt}$) such that less resources are excluded and the certain amount (e.g., 20%) of resources are available in the selection pool (e.g., second subset of candidate resources). This scheme may also be used to avoid persistent non-hidden (e.g., physically sensed) threat entities in the case of NR-V2X.

In some aspects, the second wireless device 1504 may select a candidate resource from the second subset of candidate resources for transmission of the BSM.

As illustrated at 1514, the second wireless device 1504 may transmit the BSM on a determined candidate resource to at least a third wireless device 1506. The third wireless device 1506 may receive the BSM from the second wireless device 1504. The transmitted BSM may be a broadcast message such that the transmitted BSM may be transmitted to and received by any wireless device within a vicinity of the second wireless device 1504. In some aspects, the BSM may be transmitted on the candidate resource, where the candidate resource may comprise one or more subchannels.

Figure 16:
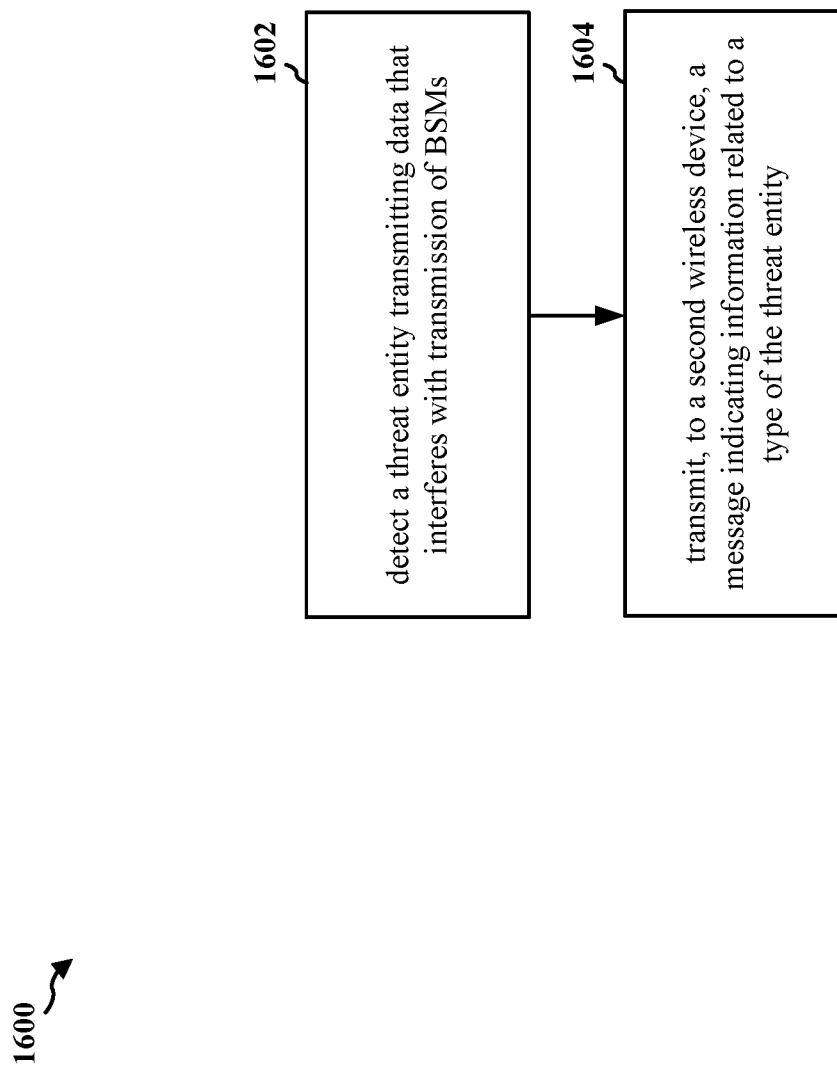
FIG. 16 is a flowchart of a method of wireless communication.

FIG. 16 is a flowchart 1600 of a method of wireless communication. The method may be performed by a UE or a component of a UE (e.g., the UE 104; the apparatus 1702; the cellular baseband processor 1704, which may include the memory 360 and which may be the entire UE 350 or a component of the UE 350, such as the TX processor 368, the RX processor 356, and/or the controller/processor 359). One or more of the illustrated operations may be optional, omitted, transposed, or contemporaneous. The method may allow a first wireless device to share information of a detected threat entity with other wireless devices that are beyond a threat zone of the threat entity, such that the other wireless devices virtually sense the threat entity.

At 1602, the first wireless device may detect a threat entity transmitting data that interferes with transmission of BSMs. For example, 1602 may be performed by detection component 1740 of apparatus 1702. The first wireless device may detect the presence of the threat entity and extract relevant information related to the threat entity. The relevant information may vary based on the threat entity. In some aspects, the threat entity may comprise a DoS attacker, a jammer, a misbehaving vehicle, an OOB interferer, a WAN jammer, or a GNSS jammer. The relevant information may be shared, by the first wireless device, with other wireless devices beyond a threat zone of the threat entity.

At 1604, the first wireless device may transmit a message indicating information related to a type of the threat entity. For example, 1604 may be performed by message component 1742 of apparatus 1702. The first wireless device may transmit the message indicating the information related to the type of the threat entity to at least a second wireless device. In some aspects, the information in the message may comprise a subset of subchannels having a reference RSSI greater than an RSSI threshold. In some aspects, the subset of subchannels having the reference RSSI greater than the RSSI threshold may be based on an average of the RSSI for the subset of subchannels being greater than the RSSI threshold for at least an RSSI window time length. In some aspects, the subset of subchannels having the reference RSSI greater than the RSSI threshold may be based on an average of the RSSI for each subchannel in the subset of subchannels being greater than the RSSI threshold for at least an RSSI window time length. The information in the message may further indicate at least one of the average RSSI on the subset of subchannels, the average RSSI for each subchannel in the subset of subchannels, the RSSI threshold, the RSSI window time length, a location of the threat entity influencing the RSSI in at least one of the subset of subchannels, or a location confidence radius in association with the threat entity influencing the RSSI in at least one of the subset of subchannels, or a combination thereof. In some aspects, the transmitted message may be an SDSM, an I2V message, or a CPM. The transmitted message may be a broadcast message such that the transmitted message may be received by any wireless device within a vicinity of the first wireless device.

Figure 17:
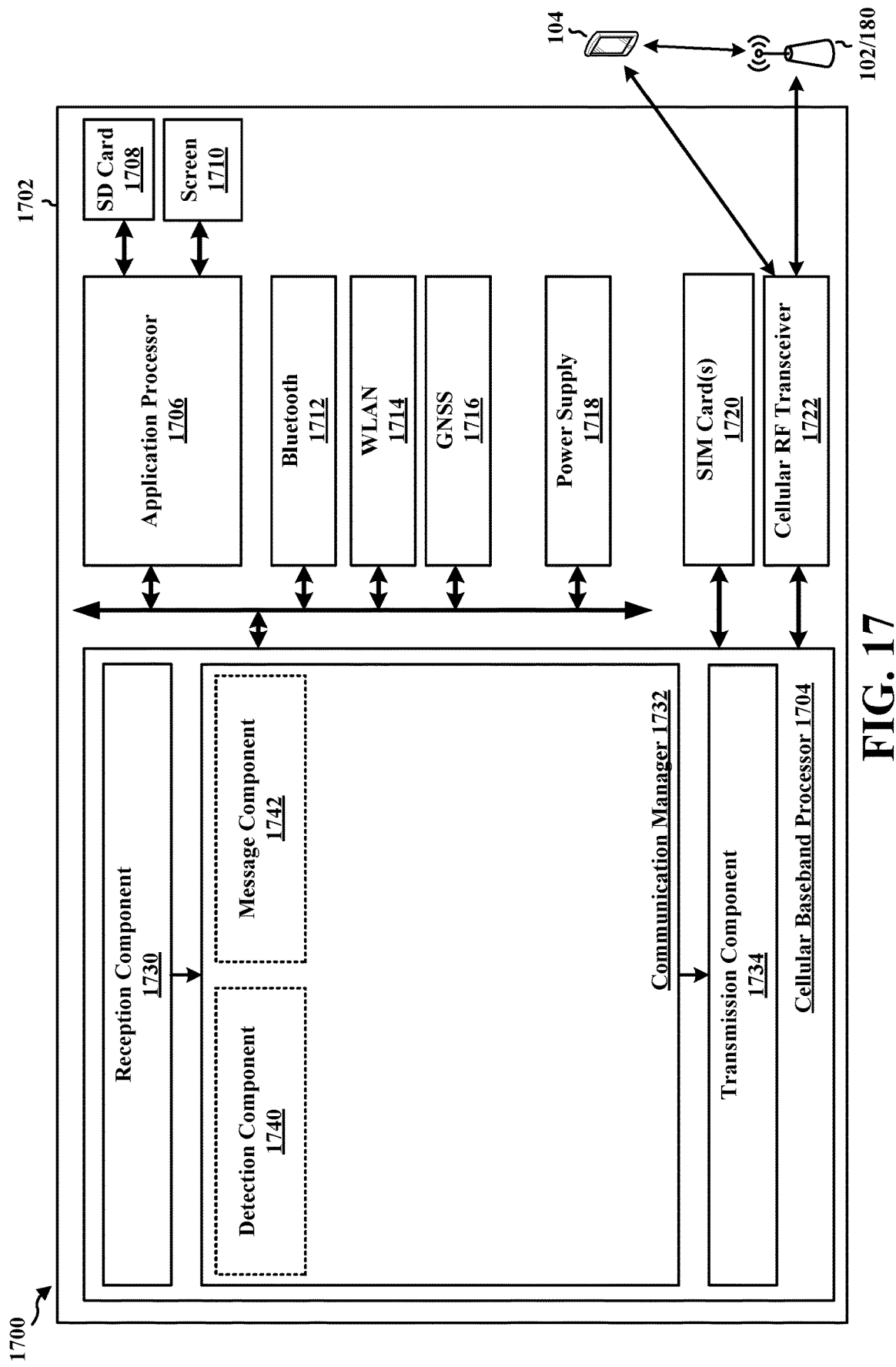
FIG. 17 is a diagram illustrating an example of a hardware implementation for an example apparatus.

FIG. 17 is a diagram 1700 illustrating an example of a hardware implementation for an apparatus 1702. The apparatus 1702 is a UE and includes a cellular baseband processor 1704 (also referred to as a modem) coupled to a cellular RF transceiver 1722 and one or more subscriber identity modules (SIM) cards 1720, an application processor 1706 coupled to a secure digital (SD) card 1708 and a screen 1710, a Bluetooth module 1712, a wireless local area network (WLAN) module 1714, a GNSS module 1716, and a power supply 1718. The GNSS module 1716 may comprise a variety of satellite positioning systems. For example, the GNSS module may correspond to Global Positioning System (GPS), Global Navigation Satellite System (GLONASS), Galileo, BeiDou Navigation Satellite System (BDS), Wide Area Augmentation System (WAAS), European Geostationary Navigation Overlay Service (EGNOS), GPS Aided GEO Augmented Navigation (GAGAN), Multifunctional Transport Satellites (MTSAT) Satellite Augmentation System (MSAS), Quasi-Zenith Satellite System (QZSS), or Navigation with Indian Constellation (NavIC). The cellular baseband processor 1704 communicates through the cellular RF transceiver 1722 with the UE 104 and/or BS 102/180. The cellular baseband processor 1704 may include a computer-readable medium/memory. The computer-readable medium/memory may be non-transitory. The cellular baseband processor 1704 is responsible for general processing, including the execution of software stored on the computer-readable medium/memory. The software, when executed by the cellular baseband processor 1704, causes the cellular baseband processor 1704 to perform the various functions described supra. The computer-readable medium/memory may also be used for storing data that is manipulated by the cellular baseband processor 1704 when executing software. The cellular baseband processor 1704 further includes a reception component 1730, a communication manager 1732, and a transmission component 1734. The communication manager 1732 includes the one or more illustrated components. The components within the communication manager 1732 may be stored in the computer-readable medium/memory and/or configured as hardware within the cellular baseband processor 1704. The cellular baseband processor 1704 may be a component of the UE 350 and may include the memory 360 and/or at least one of the TX processor 368, the RX processor 356, and the controller/processor 359. In one configuration, the apparatus 1702 may be a modem chip and include just the baseband processor 1704, and in another configuration, the apparatus 1702 may be the entire UE (e.g., see 350 of FIG. 3) and include the aforediscussed additional modules of the apparatus 1702.

The communication manager 1732 includes a detection component 1740 that is configured to detect a threat entity transmitting data that interferes with transmission of BSMs e.g., as described in connection with 1602 of FIG. 16. The communication manager 1732 further includes a message component 1742 that is configured to transmit a message indicating information related to a type of the threat entity, e.g., as described in connection with 1604 of FIG. 16.

The apparatus may include additional components that perform each of the blocks of the algorithm in the aforementioned flowchart of FIG. 16. As such, each block in the aforementioned flowchart of FIG. 16 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1702, and in particular the cellular baseband processor 1704, includes means for detecting a threat entity transmitting data that interferes with transmission of BSMs. The apparatus includes means for transmitting, to a second wireless device, a message indicating information related to a type of the threat entity. The aforementioned means may be one or more of the aforementioned components of the apparatus 1702 configured to perform the functions recited by the aforementioned means. As described supra, the apparatus 1702 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 18:
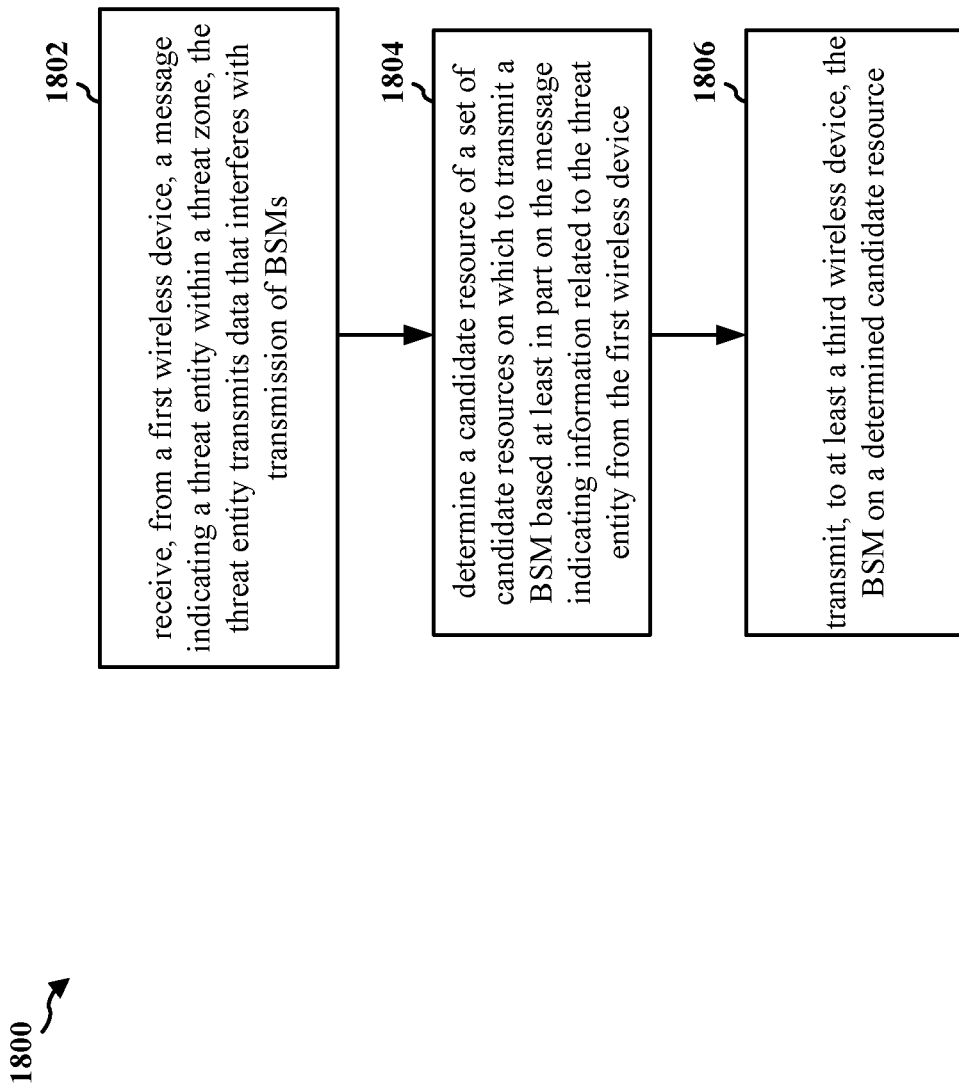
FIG. 18 is a flowchart of a method of wireless communication.

FIG. 18 is a flowchart 1800 of a method of wireless communication. The method may be performed by a UE or a component of a UE (e.g., the UE 104; the apparatus 2002; the cellular baseband processor 2004, which may include the memory 360 and which may be the entire UE 350 or a component of the UE 350, such as the TX processor 368, the RX processor 356, and/or the controller/processor 359). One or more of the illustrated operations may be optional, omitted, transposed, or contemporaneous. The method may allow a second wireless device to determine a candidate resource to transmit a BSM based on virtually sensing a threat entity.

At 1802, the second wireless device may receive a message indicating a threat entity within a threat zone. For example, 1802 may be performed by message component 2040 of apparatus 2002. The threat entity may transmit data that interferes with transmission of BSMs. The second wireless device may receive the message from a first wireless device. In some aspects, the message received from the first wireless device may comprise an SDSM, an I2V message, or a CPM. In some aspects, the threat entity may comprise a DoS attacker, a jammer, a misbehaving vehicle, an OOB interferer, a WAN jammer, or a GNSS jammer.

At 1804, the second wireless device may determine a candidate resource of a set of candidate resources on which to transmit a BSM. For example, 1804 may be performed by determination component 2042 of apparatus 2002. The second wireless device may determine the candidate resource of the set of candidate resources on which to transmit the BSM based at least in part on the message indicating the information related to the threat entity from the first wireless device. In some aspects, the information in the message may comprise a subset of subchannels having an RSSI greater than an RSSI threshold. In some aspects, the subset of subchannels having the RSSI greater than the RSSI threshold may be based on an average of the RSSI for the subset of subchannels being greater than the RSSI threshold for at least an RSSI window time length. In some aspects, the subset of subchannels having the RSSI greater than the RSSI threshold may be based on an average of the RSSI for each subchannel in the subset of subchannels being greater than the RSSI threshold for at least an RSSI window time length. The information in the message may further indicate at least one of the average RSSI of the subset of subchannels, the average RSSI for each subchannel in the subset of subchannels, the RSSI threshold, the RSSI window time length, a location of the threat entity influencing the RSSI in at least one of the subset of subchannels, or a location confidence radius in association with the threat entity influencing the RSSI in at least one of the subset of subchannels, or a combination thereof. In some aspects, the candidate resources may comprise a CSR, and the set of candidate resources may comprise a set of CSRs. The CSR may comprise one or more subchannels of the set of candidate resources. In some aspects, the determination of the candidate resource of the set of candidate resources may be further based on whether additional messages are received from other wireless devices indicating the threat entity with the threat zone, as indicated in the message from the first wireless device. For example, the second wireless device may determine which candidate resources may be excluded to transmit the BSM based on the additional messages the second wireless device receives from one or more other wireless devices reporting the threat entity. In instances where multiple wireless devices (e.g., victim vehicles) are within a zone affected by the threat entity and the second wireless device receives multiple messages from the multiple wireless devices (e.g., victim vehicles) reporting the presence of the threat entity, the receipt of the multiple messages may be indicative of a reliable report of the presence of the threat entity. In instances where multiple wireless devices (e.g., victim vehicles) are within the zone affected by the threat entity and the second wireless device receives one message (or a minimal amount of messages that is much less than the number of multiple wireless devices) reporting the presence of the threat entity, the receipt of the one message (or the minimal amount of messages that is much less than the number of multiple wireless devices) may be indicative of an unreliable report. In such instances, the second wireless device may transmit the BSM, but a mitigation undertaken to allow for the scheduling of the BSM to avoid the threat entity may not be invoked if the source of the report (e.g., SDSM) is not reliable.

At 1806, the second wireless device may transmit the BSM on the determined candidate resource. For example, 1806 may be performed by BSM component 2044 of apparatus 2002. The second wireless device may transmit the BSM on the determined candidate resource to at least a third wireless device. The transmitted BSM may be a broadcast message such that the transmitted BSM may be transmitted to and received by any wireless device within a vicinity of the second wireless device. In some aspects, the BSM may be transmitted on the candidate resource, where the candidate resource may comprise one or more subchannels.

Figure 19:
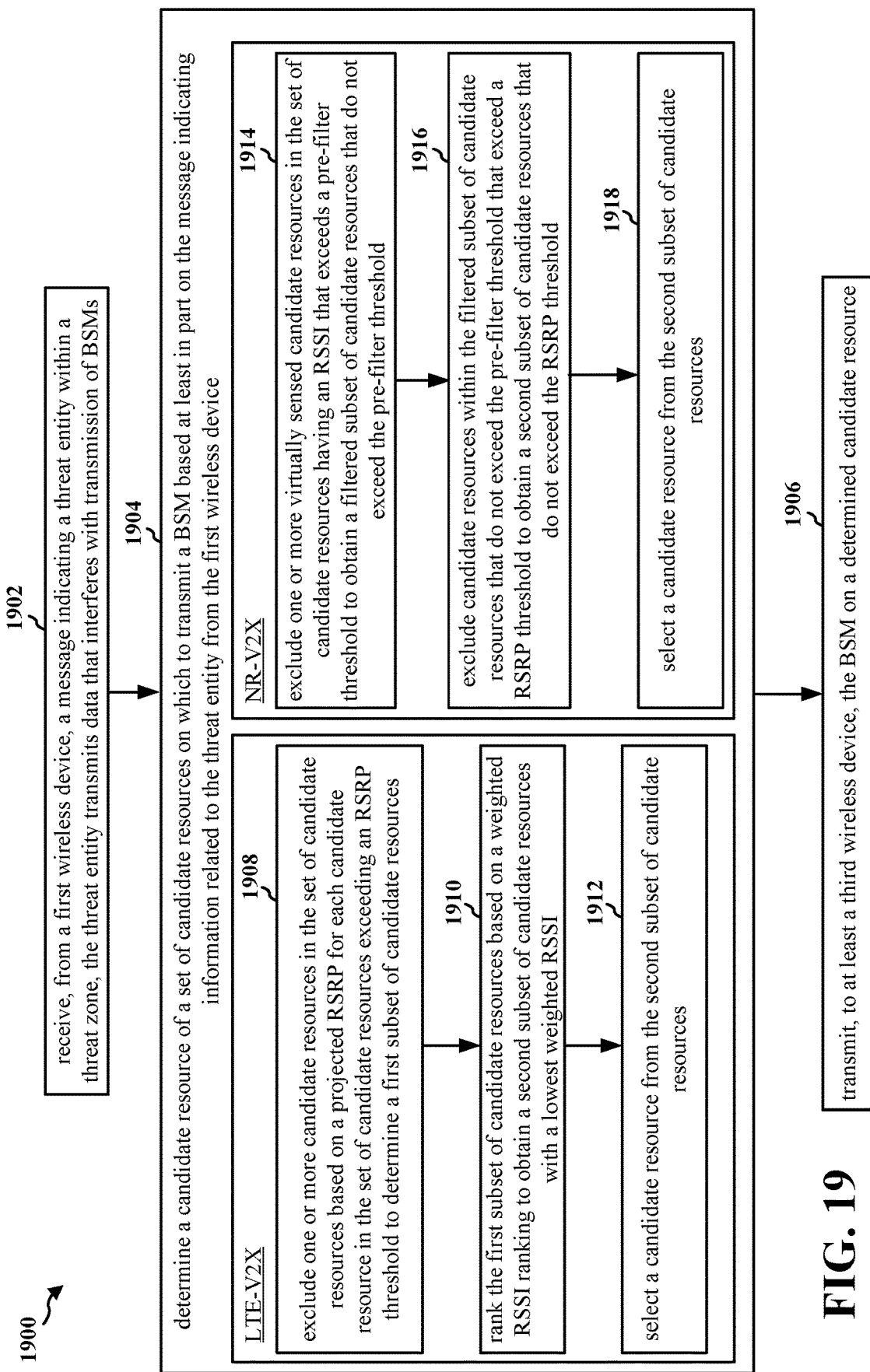
FIG. 19 is a flowchart of a method of wireless communication.

FIG. 19 is a flowchart 1900 of a method of wireless communication. The method may be performed by a UE or a component of a UE (e.g., the UE 104; the apparatus 2002; the cellular baseband processor 2004, which may include the memory 360 and which may be the entire UE 350 or a component of the UE 350, such as the TX processor 368, the RX processor 356, and/or the controller/processor 359). One or more of the illustrated operations may be optional, omitted, transposed, or contemporaneous. The method may allow a second wireless device to determine a candidate resource to transmit a BSM based on virtually sensing a threat entity.

At 1902, the second wireless device may receive a message indicating a threat entity within a threat zone. For example, 1902 may be performed by message component 2040 of apparatus 2002. The threat entity may transmit data that interferes with transmission of BSMs. The second wireless device may receive the message from a first wireless device. In some aspects, the message received from the first wireless device may comprise an SDSM, an I2V message, or a CPM. In some aspects, the threat entity may comprise a DoS attacker, a jammer, a misbehaving vehicle, an OOB interferer, a WAN jammer, or a GNSS jammer.

At 1904, the second wireless device may determine a candidate resource of a set of candidate resources on which to transmit a BSM. For example, 1904 may be performed by determination component 2042 of apparatus 2002. The second wireless device may determine the candidate resource of the set of candidate resources on which to transmit the BSM based at least in part on the message indicating information related to the threat entity from the first wireless device. In some aspects, the information in the message may comprise a subset of subchannels having an RSSI greater than an RSSI threshold. In some aspects, the subset of subchannels having the RSSI greater than the RSSI threshold may be based on an average of the RSSI for the subset of subchannels being greater than the RSSI threshold for at least an RSSI window time length. In some aspects, the subset of subchannels having the RSSI greater than the RSSI threshold may be based on an average of the RSSI for each subchannel in the subset of subchannels being greater than the RSSI threshold for at least an RSSI window time length. The information in the message may further indicate at least one of the average RSSI on the subset of subchannels, the average RSSI for each subchannel in the subset of subchannels, the RSSI threshold, the RSSI window time length, a location of the threat entity influencing the RSSI in at least one of the subset of subchannels, or a location confidence radius in association with the threat entity influencing the RSSI in at least one of the subset of subchannels, or a combination thereof. In some aspects, the candidate resources may comprise a CSR, and the set of candidate resources may comprise a set of CSRs. The CSR may comprise one or more subchannels of the set of candidate resources. In some aspects, the determination of the candidate resource of the set of candidate resources may be further based on whether additional messages are received from other wireless devices indicating the threat entity with the threat zone, as indicated in the message from the first wireless device. For example, the second wireless device may determine which candidate resources may be excluded to transmit the BSM based on the additional messages the second wireless device receives from one or more other wireless devices reporting the threat entity. In instances where multiple wireless devices (e.g., victim vehicles) are within a zone affected by the threat entity and the second wireless device receives multiple messages from the multiple wireless devices (e.g., victim vehicles) reporting the presence of the threat entity, the receipt of the multiple messages may be indicative of a reliable report of the presence of the threat entity. In instances where multiple wireless devices (e.g., victim vehicles) are within the zone affected by the threat entity and the second wireless device receives one message (or a minimal amount of messages that is much less than the number of multiple wireless devices) reporting the presence of the threat entity, the receipt of the one message (or the minimal amount of messages that is much less than the number of multiple wireless devices) may be indicative of an unreliable report. In such instances, the second wireless device may transmit the BSM, but a mitigation undertaken to allow for the scheduling of the BSM to avoid the threat entity may not be invoked if the source of the report (e.g., SDSM) is not reliable.

In some aspects, to determine the candidate resource of the set of candidate resources to transmit the BSM, the second wireless device may determine if the set of candidate resources are LTE-V2X or NR-V2X. In instances where the candidate resources are LTE-V2X, the second wireless device may, at 1908, exclude one or more candidate resources in the set of candidate resources. For example, 1908 may be performed by determination component 2042 of apparatus 2002. The second wireless device may exclude the one or more candidate resources in the set of candidate resources based on a projected RSRP for each candidate resource in the set of candidate resources exceeding an RSRP threshold. The second wireless device may exclude the one or more candidate resources based on the projected RSRP that exceeds the RSRP threshold to determine a first subset of candidate resources. In some aspects, candidate resources may be excluded based on the RSRP until a certain amount of candidate resources remain in a selection pool (e.g., set of candidate resources). In some aspects, the certain amount may comprise twenty percent (20%) of the set of candidate resources. In some aspects, the certain amount may be greater than twenty percent (20%) of the set of candidate resources. In some aspects, the second wireless device may also exclude some of the CSRs based on its half-duplex operation.

At 1910, the second wireless device may rank the first subset of candidate resources based on a weighted RSSI ranking. For example, 1910 may be performed by determination component 2042 of apparatus 2002. The second wireless device may rank the first ranked subset of candidate resources based on the weighted RSSI ranking to obtain a second subset of candidate resources. The second subset of candidate resources may have a lowest weighted RSSI. The second subset of candidate resources may be a portion of the first subset of candidate resources. In some aspects, the weighted RSSI may be comprised of physically sensed candidate resources and virtually sensed candidate resources. The physically sensed candidate resources may comprise candidate resources measured by the second wireless device within the sensing window. The virtually sensed candidate resources may comprise subchannels measured by the first wireless device and indicated within the message received by the second wireless device from the first wireless device. In some aspects, the virtually sensed candidate resources may be based on at least one of a location of the threat entity influencing an RSSI of candidate resources, a location confidence radius in association with the threat entity, a timestamp associated with the message received from the first wireless device, a velocity of the second wireless device, an acceleration of the second wireless device, a direction of travel of the second wireless device in relation to the location of the threat entity, information related to roadway geometry, or transmission requirements associated with the BSM, or a combination thereof. In some aspects, the weighted RSSI ranking may be based on the candidate resources remaining after the exclusion of candidate resources that have an RSRP above a threshold and the candidate resources remaining after the exclusion of candidate resources due to the half-duplex operation.

The second wireless device may rank the first ranked subset of candidate resources based on the weighted RSSI ranking to obtain the second subset of candidate resources having the lowest weighted RSSI, such that the candidate resources from the first subset having the highest weighted RSSI are excluded from the selection pool. The candidate resources of the first subset having the highest weighted RSSI may be excluded until the certain amount (e.g., 20%) of the resources remain in the selection pool. The candidate resource on which to transmit the BSM may be determined from the second subset of candidate resources. The ranking of the first subset of candidate resources may be based on the weighted RSSI which may be based on the measured RSSI for the first subset of subchannels indicated in the message from the first wireless device (e.g., virtually sensed) and may be based on the projected RSSI of candidate resources based on measurements by the second wireless device in the sensing window (e.g., physically sensed). The second wireless device may perform physical sensing by obtaining RSSI measurements of candidate resources during the sensing window and excludes the corresponding candidate resources from the selection pool if values exceed a threshold. The second wireless device may perform virtual sensing and exclude jammed or interfered resources (e.g., subchannels) based on RSSI measurements reported within the message (e.g., SDSM message) received from the first wireless device (e.g., victim vehicle). The second wireless device may not detect the jammed or interfered resources (e.g., subchannels) reported by the first wireless device, and may utilize the information in the message shared by the first wireless device (e.g., victim vehicle) to exclude such jammed or interfered subchannels. Candidate resources of the first subset of candidate resources with the highest weighted RSSI may be excluded until a certain amount of resources are remaining in a selection pool. The weighted RSSI of candidate resource x may be determined based on the following equation:

$$RSSI_x = \alpha RSSI_{x,phy} + \beta RSSI_{x,virt}$$

where $RSSI_{x,phy}$ is the RSSI of the candidate resource x physically sensed, and $RSSI_{x,virt}$ is the RSSI of the candidate resource x virtually sensed, the value of $\alpha=1$, and $0 \leq \beta \leq 1$. The value of $\beta$ may be set based on the level of protection against hidden threat nodes. The value of $\beta$ may be based on at least one of a location of the threat entity influencing the RSSI in at least one of the subset of subchannels, a location confidence radius in association with the threat entity influencing the RSSI in at least one of the subset of subchannels, a timestamp associated with the received message from the first wireless device, a velocity of the second wireless device, an acceleration of the second wireless device, a direction of travel of the second wireless device in relation to the location of the threat entity, information related to roadway geometry (e.g., MAP information), or transmission requirements associated with the BSM, or a combination thereof. For example, the value of $\beta$ may be closer to 0 in instances where the second wireless device is traveling away from the threat entity, such that the average RSSI may rely more on the physically sensed candidate resources. In some aspects, the value of $\beta$ may be closer to 1 in instances where the second wireless device may be close to the threat entity and may increase protection against the threat entity, such that the virtually sensed resources are accounted for in the average RSSI.

At 1912, the second wireless device may select a candidate resource. For example, 1912 may be performed by determination component 2042 of apparatus 2002. The second wireless device may select the candidate resource from the second subset of candidate resources for transmission of the BSM.

In instances where the candidate resources are NR-V2X, the second wireless device may, at 1914, exclude one or more virtually sensed candidate resources in the set of candidate resources. For example, 1914 may be performed by determination component 2042 of apparatus 2002. The second wireless device may exclude one or more virtually sensed candidate resources in the set of candidate resources having an RSSI that exceed a pre-filter threshold. The second wireless device may exclude the one or more virtually sensed candidate resources having an RSSI that exceeds the pre-filter threshold to obtain a filtered subset of candidate resources that do not exceed the pre-filter threshold. In some aspects, the one or more virtually sensed candidate resources may be measured by the first wireless device and indicated within the message received by the second wireless device from the first wireless device. For example, the first wireless device may physically sense one or more subchannels that may be impacted by the threat entity, and may include such information in the message transmitted to the second wireless device, such that the second wireless device virtually senses the one or more subchannels. In some aspects, the virtually sensed candidate resources may be based on at least one of a location of the threat entity influencing an RSSI of subchannels, a location confidence radius in association with the threat entity, a timestamp associated with the message received from the first wireless device, a velocity of the second wireless device, an acceleration of the second wireless device, a direction of travel of the second wireless device in relation to the location of the threat entity, information related to roadway geometry, or transmission requirements associated with the BSM, or a combination thereof. The second wireless device may pre-filter the virtually sensed resources having an RSSI that is above a threshold (e.g., $Thresh_{virt}$). The virtually sensed resources having an RSSI that is above the threshold may be omitted from the pool of candidate resources prior to an RSRP-based exclusion being performed. In some aspects, the second wireless device may pre-filter the virtually sensed candidate resources based on the virtually sensed RSSI measurements of the one or more subchannels provided by the first wireless device until a certain amount of candidate resources remain available in a selection pool of candidate resources. In some aspects, the second wireless device may pre-filter the virtually sensed candidate resources until the certain amount of twenty percent (20%) of resources remain available in the selection pool (e.g., filtered subset). The certain amount being twenty percent is merely an example, and is not intended to be limited to the example provided herein. In some aspects, the certain amount may be greater than twenty percent (20%).

At 1916, the second wireless device may exclude candidate resources within the filtered subset of candidate resources. For example, 1916 may be performed by determination component 2042 of apparatus 2002. The second wireless device may exclude the candidate resources within the filtered subset of candidate resources that do not exceed the pre-filter threshold that exceed an RSRP threshold. The second wireless device may exclude the candidate resources within the filtered subset of candidate resources that do not exceed the pre-filter threshold but exceed the RSRP threshold to obtain a second subset of candidate resources that do not exceed the RSRP threshold. In some aspects, the second subset of candidate resources may comprise a preconfigured proportion of total candidate resources in a selection pool that do not exceed the pre-filter threshold. In some aspects, the pre-filter threshold may be adjusted if the second subset of candidate resources comprises an amount of candidate resources less than the preconfigured proportion of the total candidate resources in the selection pool. The pre-filter threshold may be further adjusted until the second subset of candidate resources comprises the preconfigured proportion of the total candidate resources in the selection pool. In some aspects, the preconfigured proportion of the total candidate resources in the selection pool may comprise twenty percent (20%). In some aspects, the preconfigured proportion of the total candidate resources in the selection pool may comprise greater than twenty percent (20%). In some aspects, the RSRP threshold may be adjusted in order for the second subset of candidate resources to comprise the preconfigured proportion of the total candidate resources in the selection pool. The RSRP threshold may be adjusted in addition to or in the alternative to adjusting the pre-filter threshold.

The candidate resource comprising at least one subchannel on which to transmit the BSM may be determined from the second subset of candidate resources. In some aspects, the second wireless device may exclude some of the candidate resources based on its half duplex operation, prior to selecting a candidate resource to transmit the BSM. The pre-filter threshold (e.g., $Thresh_{virt}$) may function in a manner similar to the β parameter discussed above. For example, the pre-filter threshold (e.g., $Thresh_{virt}$) may be adjusted based on the level of protection against virtually sensed resources. For example, if more protection against the virtually sensed resources is desired, then a value of the pre-filter threshold may be reduced. Reducing the pre-filter threshold may exclude more of the virtually sensed resources. In some aspects, the pre-filter threshold may be based on at least one of a location of the threat entity influencing the RSSI in at least one of the subset of subchannels, a location confidence radius in association with the threat entity influencing the RSSI in at least one of the subset of subchannels, a timestamp associated with the received message from the first wireless device, a velocity of the second wireless device, an acceleration of the second wireless device, a direction of travel of the second wireless device in relation to the location of the threat entity, information related to roadway geometry, or transmission requirements associated with the BSM, or a combination thereof.

In some aspects, the pre-filtering of the virtually sensed resources based on the threshold (e.g., $Thresh_{virt}$) may work hand-in-hand with the RSRP-based exclusion. For example, if after the RSRP-based exclusion less than the certain amount (e.g., 20%) of resources are available in the selection pool (e.g., second subset of candidate resources), then the second wireless device may adjust the value of the threshold (e.g., $Thresh_{virt}$) such that less resources are excluded and the certain amount (e.g., 20%) of resources are available in the selection pool (e.g., second subset of candidate resources). This scheme may also be used to avoid persistent non-hidden (e.g., physically sensed) threat entities in the case of NR-V2X.

At 1918, the second wireless device may select a candidate resource. For example, 1918 may be performed by determination component 2042 of apparatus 2002. The second wireless device may select the candidate resource from the second subset of candidate resources for transmission of the BSM.

At 1906, the second wireless device may transmit the BSM on a determined candidate resource. For example, 1906 may be performed by BSM component 2044 of apparatus 2002. The second wireless device may transmit the BSM on the determined candidate resource to at least a third wireless device. The transmitted BSM may be a broadcast message such that the transmitted BSM may be transmitted to and received by any wireless device within a vicinity of the second wireless device. In some aspects, the BSM may be transmitted on the candidate resource, where the candidate resource may comprise one or more subchannels.

Figure 20:
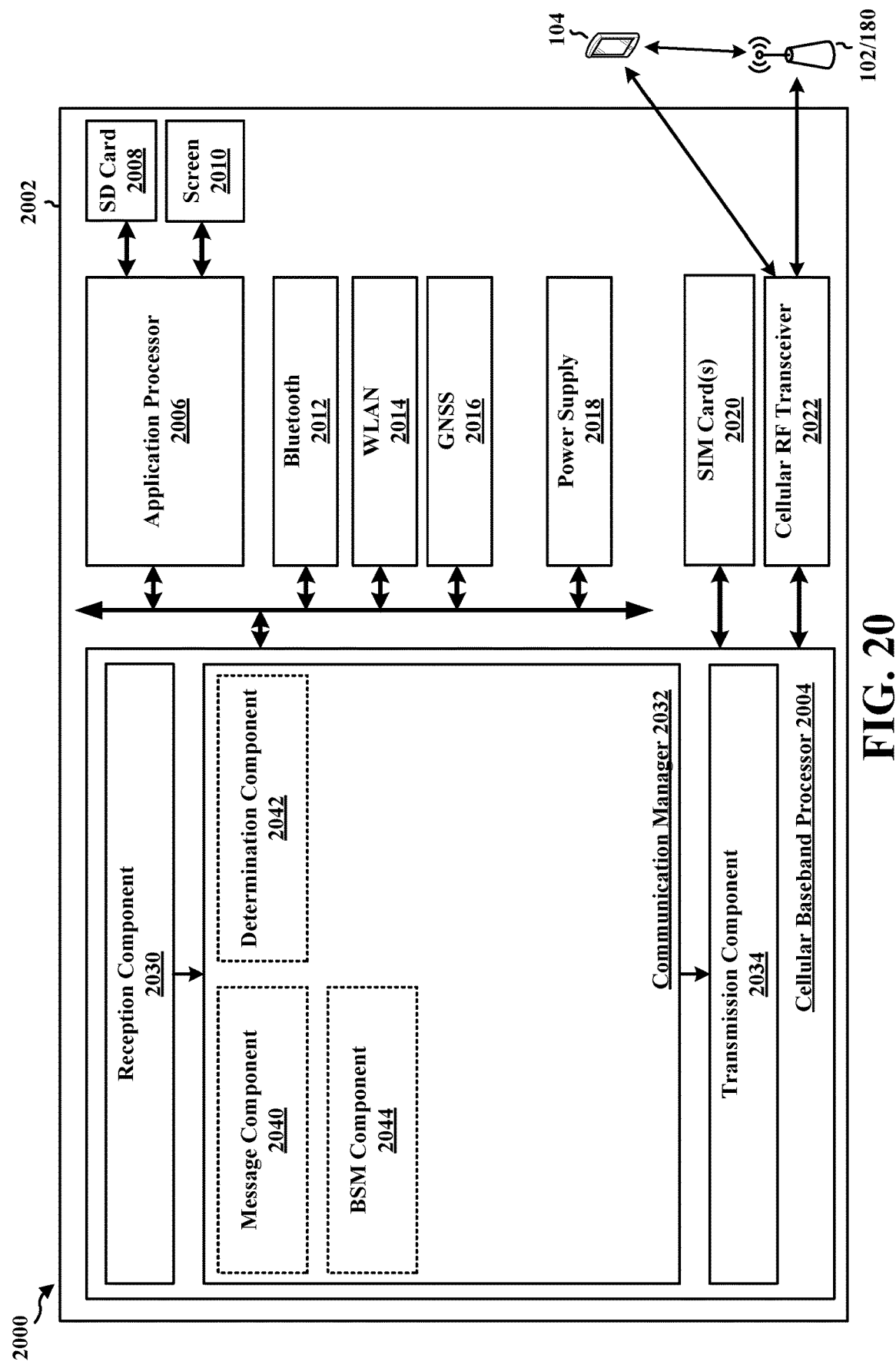
FIG. 20 is a diagram illustrating an example of a hardware implementation for an example apparatus.

FIG. 20 is a diagram 2000 illustrating an example of a hardware implementation for an apparatus 2002. The apparatus 2002 is a UE and includes a cellular baseband processor 2004 (also referred to as a modem) coupled to a cellular RF transceiver 2022 and one or more subscriber identity modules (SIM) cards 2020, an application processor 2006 coupled to a secure digital (SD) card 2008 and a screen 2010, a Bluetooth module 2012, a wireless local area network (WLAN) module 2014, a GNSS module 2016, and a power supply 2018. The GNSS module 2016 may comprise a variety of satellite positioning systems. For example, the GNSS module may correspond to Global Positioning System (GPS), Global Navigation Satellite System (GLONASS), Galileo, BeiDou Navigation Satellite System (BDS), Wide Area Augmentation System (WAAS), European Geostationary Navigation Overlay Service (EGNOS), GPS Aided GEO Augmented Navigation (GAGAN), Multifunctional Transport Satellites (MTSAT) Satellite Augmentation System (MSAS), Quasi-Zenith Satellite System (QZSS), or Navigation with Indian Constellation (NavIC). The cellular baseband processor 2004 communicates through the cellular RF transceiver 2022 with the UE 104 and/or BS 102/180. The cellular baseband processor 2004 may include a computer-readable medium/memory. The computer-readable medium/memory may be non-transitory. The cellular baseband processor 2004 is responsible for general processing, including the execution of software stored on the computer-readable medium/memory. The software, when executed by the cellular baseband processor 2004, causes the cellular baseband processor 2004 to perform the various functions described supra. The computer-readable medium/memory may also be used for storing data that is manipulated by the cellular baseband processor 2004 when executing software. The cellular baseband processor 2004 further includes a reception component 2030, a communication manager 2032, and a transmission component 2034. The communication manager 2032 includes the one or more illustrated components. The components within the communication manager 2032 may be stored in the computer-readable medium/memory and/or configured as hardware within the cellular baseband processor 2004. The cellular baseband processor 2004 may be a component of the UE 350 and may include the memory 360 and/or at least one of the TX processor 368, the RX processor 356, and the controller/processor 359. In one configuration, the apparatus 2002 may be a modem chip and include just the baseband processor 2004, and in another configuration, the apparatus 2002 may be the entire UE (e.g., see 350 of FIG. 3) and include the aforediscussed additional modules of the apparatus 2002.

The communication manager 2032 includes a message component 2040 that is configured to receive a message indicating a threat entity within a threat zone, e.g., as described in connection with 1802 of FIG. 18 or 1902 of FIG. 19. The communication manager 2032 further includes a determination component 2042 that is configured to determine a candidate resource of a set of candidate resources on which to transmit a BSM, e.g., as described in connection with 1804 of FIG. 18 or 1904 of FIG. 19. The determination component 2042 may be configured to exclude one or more candidate resources in the set of candidate resources, e.g., as described in connection with 1908 of FIG. 19. The determination component 2042 may be configured to rank the first subset of candidate resources based on a weighted RSSI ranking, e.g., as described in connection with 1910 of FIG. 19. The determination component 2042 may be configured to select a candidate resource, e.g., as described in connection with 1912 of FIG. 19. The determination component 2042 may be configured to exclude one or more virtually sensed candidate resources in the set of candidate resources, e.g., as described in connection with 1914 of FIG. 19. The determination component 2042 may be configured to exclude candidate resources within the filtered subset of candidate resources, e.g., as described in connection with 1916 of FIG. 19. The determination component 2042 may be configured to select a candidate resource, e.g., as described in connection with 1918 of FIG. 19. The communication manager 2032 further includes a BSM component 2044 that is configured to transmit the BSM on a determined candidate resource, e.g., as described in connection with 1806 of FIG. 18 or 1906 of FIG. 19.

The apparatus may include additional components that perform each of the blocks of the algorithm in the aforementioned flowcharts of FIG. 18 or 19. As such, each block in the aforementioned flowcharts of FIG. 18 or 19 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 2002, and in particular the cellular baseband processor 2004, includes means for receiving, from a first wireless device, a message indicating a threat entity within a threat zone. The threat entity transmits data that interferes with transmission of BSMs. The apparatus includes means for determining a candidate resource of a set of candidate resources on which to transmit a BSM based at least in part on the message indicating information related to the threat entity from the first wireless device. The apparatus includes means for transmitting, to at least a third wireless device, the BSM on a determined candidate resource. The apparatus further includes means for excluding one or more candidate resources in the set of candidate resources based on a projected RSRP for each candidate resource in the set of candidate resources exceeding an RSRP threshold to determine a first subset of candidate resources. The apparatus further includes means for ranking the first subset of candidate resources based on a weighted RSSI ranking to obtain a second subset of candidate resources with a lowest weighted RSSI. The second subset of candidate resources is a portion of the first subset of candidate resources. The apparatus further includes means for selecting a candidate resource from the second subset of candidate resources. The apparatus further includes means for excluding one or more virtually sensed candidate resources in the set of candidate resources having an RSSI that exceeds a pre-filter threshold to obtain a filtered subset of candidate resources that do not exceed the pre-filter threshold. The apparatus further includes means for excluding candidate resources within the filtered subset of candidate resources that do not exceed the pre-filter threshold that exceed an RSRP threshold to obtain a second subset of candidate resources that do not exceed the RSRP threshold. The apparatus further includes means for selecting the candidate resource from the second subset of candidate resources. The aforementioned means may be one or more of the aforementioned components of the apparatus 2002 configured to perform the functions recited by the aforementioned means. As described supra, the apparatus 2002 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 21:
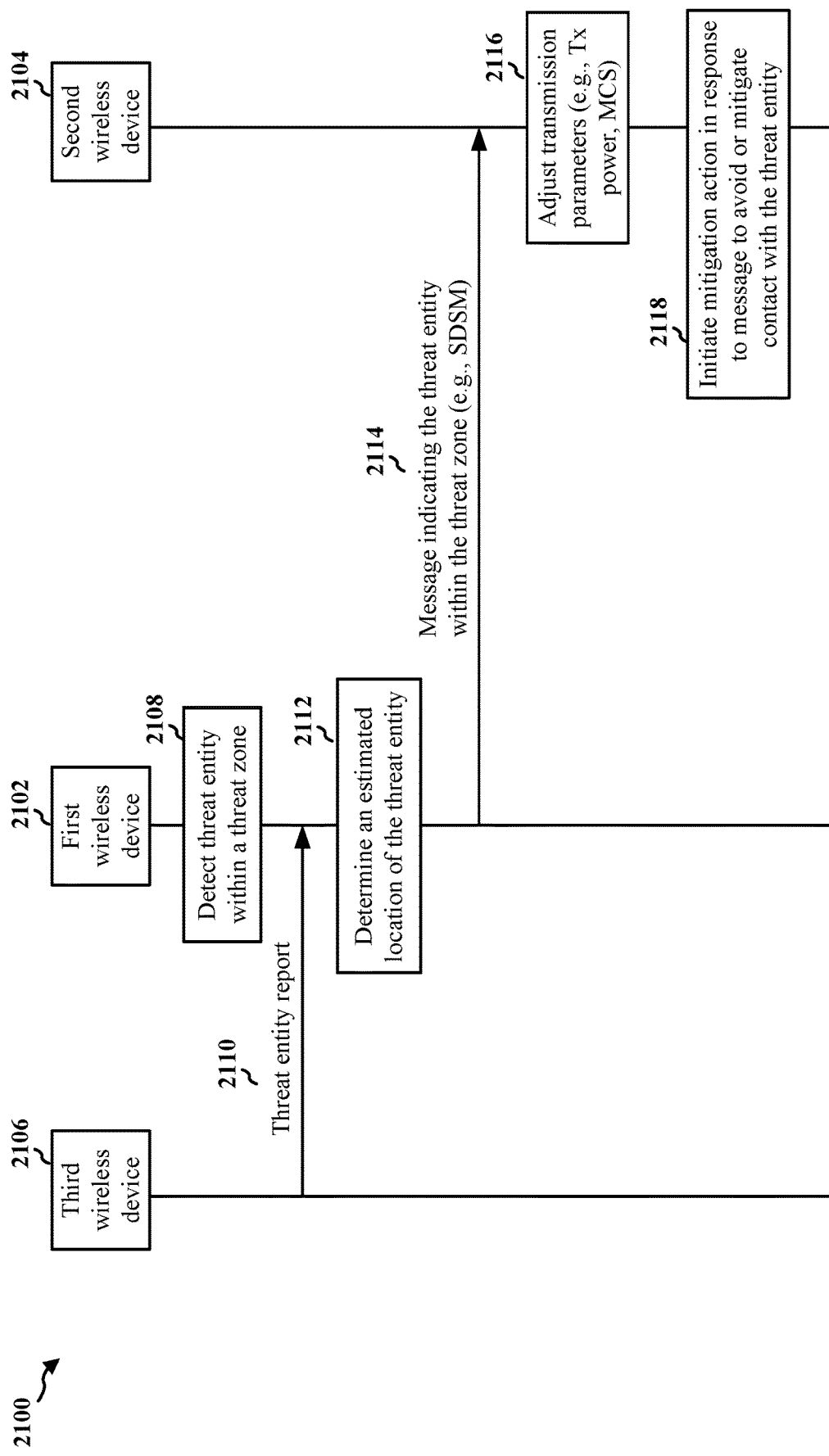
FIG. 21 is a call flow diagram of signaling between a first wireless device, a second wireless device, and a third wireless device.

FIG. 21 illustrates an example communication flow 2100 between a first wireless device 2102, a second wireless device 2104, and a third wireless device 2106. The communication may be based on V2X, V2V, or D2D based communication directly from a transmitting device to a receiving device. The communication transmitting from device 2102, 2104, 2106 may be broadcast and received by multiple receiving devices within range of a particular transmitting device, as described in connection with FIG. 4. The first wireless device 2102 may correspond to a first UE, and the second wireless device 2104 may correspond to a second UE. The first wireless device 2102, the second wireless device 2104, and/or the third wireless device 2106 may correspond to a C-V2X entity. For example, in the context of FIG. 1, the first wireless device 2102 may correspond to at least UE 104, and the second wireless device 2104 may correspond to at least 104'. In another example, in the context of FIG. 3, the first wireless device 2102 may correspond to the device 350, and the second wireless device 2104 may correspond to the device 310.

As illustrated at 2108, the first wireless device 2102 may detect a threat entity within a threat zone. The first wireless device 2102 may detect the threat entity within the threat zone based on data signals received from the threat entity. The threat entity may obstruct wireless spectrum or resources utilized in cooperative or automated driving decisions. In some aspects, the data signals received from the threat entity may comprise data that is inconsistent with projected data for wireless devices. For example, the data signals may include data that is not realistic or anticipated for wireless devices. The data signals may indicate a value of speed that is much higher than expected, position information that is nonsensical or not within the vicinity of the first wireless device, or may include high amounts of data that overloads the first wireless device. The data signals may include other types of inconsistent or incorrect data such that the disclosure is not intended to be limited to the examples provided herein. In some aspects, the data signals may comprise data of a misbehaving wireless device. The data of the misbehaving wireless device comprises erroneous or implausible data related to at least one characteristic of the misbehaving wireless device. In some aspects, a type of the threat entity may be determined, by the first wireless device, based on data signals received from the threat entity. The type of the threat entity may comprise a DoS attacker, a jammer, a misbehaving vehicle, an OOB interferer, a WAN jammer, or a GNSS jammer.

As illustrated at 2114, the first wireless device 2102 may transmit a message indicating the threat entity within the threat zone. The first wireless device 2102 may transmit the message indicating the threat entity within the threat zone to at least one second wireless device 2104. The second wireless device 2104 may receive the message indicating the threat entity within the threat zone from the first wireless device 2102. The detected threat entity may be considered as a new class of detected object, such that the message indicating the threat entity may be encoded as a sensor data sharing message (SDSM) or collective perception message (CPM) due to the threat entity being a spectrum or security issue as opposed to a physical obstacle. The message may be broadcasted to the at least one second wireless device 2104 outside of the threat zone, as well as any other wireless device within the vicinity of the first wireless device. The message may be broadcast to the at least one second wireless device via sidelink communication (e.g., PC5). The second wireless device receiving the message from the first wireless device indicating the threat entity allows the second wireless device to virtually sense the threat entity that the second wireless device is not able to detect due to the second wireless device being beyond the threat zone of the threat entity. In some aspects, for example in semi-persistent scheduling (SPS), the second wireless device may measure RSRP and/or RSSI of subchannels carrying data during a sensing window in order to make reservations. The second wireless device may exclude CSRs from a list of candidate CSRs if the measured RSRP/RSSI exceed a threshold. The CSRs may comprise one or more subchannels. In addition, the second wireless device using the message indicating a threat entity from the first wireless device may exclude jammed or interfered subchannels based on the RSSI measurements reported in the message indicating the threat entity from the first wireless device. This virtual sensing may improve the reception probability of messages transmitted by the second wireless device, especially if the second wireless device is likely to hang on to SPS reservations for an extended period of time.

In some aspects, the first wireless device 2102 may transmit the message (e.g., SDSM) to a network entity (e.g., base station) over a Uu link. In such instances, the network entity may relay the message, from the first wireless device, to other wireless devices outside of the threat zone, such that the other wireless devices may take preventative measures proactively. In some aspects, the second wireless device may receive the message indicating the threat entity from the network entity. In such instances, the first wireless device physically detected the threat entity while being within the threat zone of the threat entity. The first wireless device may transmit the message reporting the detected threat entity to the network entity to allow the network entity to relay the message to at least the second wireless device and other devices that are outside of the threat zone and beyond the range of transmission from the first wireless device that detected the threat entity. The message may be transmitted based on at least one of a number of reports of the threat entity received from at least one other wireless device, a severity of the threat entity, a distance separating the threat entity and the first wireless device, or a time for the at least one second wireless device to approach the threat zone, or a combination thereof. The message may comprise a duty cycle of the data signals of the threat entity. The information of the duty cycle of the data signal of the threat entity may allow the second wireless device to account for the duty cycle of the threat entity when making its transmission reservations/configurations. In some aspects, the message may include peak RSSI detection among antenna elements of the first wireless device that detected the threat entity. The first wireless device may be configured with directional reception antenna arrays that may be configured to detect an angle of arrival of transmissions of the threat entity, which may enhance the determination of the location of the threat entity and may assist to constrain the threat zone included in the message.

The message may trigger a mitigation action in the second wireless device to avoid or mitigate contact with the threat entity. The message allows the second wireless device to virtually sense the threat entity, even though the at least one second wireless device may not be within the threat zone of the threat entity to physically sense the threat entity.

The message may comprise information related to characteristics of the threat entity. In some aspects, the message may comprise a confidence value associated with the type of the threat entity. The message may comprise an average of the RSSI measured over a bandwidth of at least the first wireless device. Jamming is usually wideband and the average of the RSSI measured over the entire bandwidth of the first wireless device may indicate the threat entity as being a jamming device. In some aspects, the message may comprise an average of the RSSI measured for each subchannel that exceed an RSSI threshold. The average of the RSSI for each subchannel may be measured over a time window. The average of the RSSI measured for each subchannel may indicate the threat entity as an OOB entity or narrowband jammer. The message may comprise a duty cycle of the data signals received from the threat entity. The information of the duty cycle of the data signal from the threat entity may allow wireless devices to disregard data received during the duty cycle. In some aspects, the message may comprise a layer 2 (L2) address of the threat entity. In some instances, for example, a DoS attack or a misbehaving wireless device (e.g., misbehaving vehicle), the RSSI report may not be relevant. As such, the message may include the L2 address of the threat entity to allow the at least one second wireless device to pre-filter received DoS packets at the modem layer. The message may further indicate at least one information element (IE) corresponding to the threat entity. The at least one IE may comprise detected characteristics of threat entity. In some aspects, the detected characteristics of the threat entity may comprise at least one of a position, a speed, or a heading, or a combination thereof. For example, the position, the speed, and/or the heading of the threat entity may be included for a DoS attack. In some aspects, the detected characteristics of the threat entity may comprise a radius around the position of the threat entity. For example, for a jammer or interferer, information related to the radius around the position may be provided. In some aspects, the first wireless device may combine information from its other sensors (e.g., camera, radar, LIDAR) and/or messages (e.g., SDSM or MAP) received from other wireless devices detecting the same threat entity to determine characteristics of the threat entity. In some aspects, the detected characteristics of the threat entity may comprise information related to a measured RSSI of the threat entity. In some aspects, the detected characteristics of the threat entity may comprise information related to one or more layers associated with the threat entity, a cert digest, a cell identifier, or a public land mobile network (PLMN). The message may identify the threat entity as an object transmitting the data signals of the threat entity. In some aspects, the object may comprise one of a vulnerable road user (VRU), a detected vehicle, or a wireless obstacle.

In instances that the detected threat type is a C-V2X jammer the IE (e.g., DetectedJammerData) may include information related to the average of the RSSI across the entire bandwidth of the first wireless device and the RSSI averaging window size. In some aspects, the IE (e.g., DetectedObjectCommonData) may include information related to the radius of the threat zone of the threat entity, as well as combined information for other sensors (e.g., camera, radar, LIDAR) of the first wireless device. In instances that the detected threat type is an OOB interferer, the IE (e.g., DetectedInterfererData) may include the measured RSSI for each subchannel or band, the RSSI report threshold, the RSSI averaging window size, or the duty cycle of the threat entity. In instances that the detected threat type is a misbehaving vehicle, the IE (e.g., MisbehavingVehicleData) may include the L2 address or certificate digest. In instances that the detected threat type is a WAN jammer, the IE (e.g., DetectedJammerData) may include information related to E-UTRA absolute radio frequency channel number (EARFCN), cell identifiers, or PLMN. In instances that the detected threat type is a GNSS jammer, the IE (e.g., DetectedJammerData) may include information related to the GNSS band, layer 1 (L1), L2, or layer 5 (L5).

As illustrated at 2118, the second wireless device 2104 may initiate a mitigation action in response to receiving the message (e.g., SDSM). The second wireless device 2104 may initiate the mitigation action in response to receiving the message to avoid or mitigate contact with the threat entity. The threat entity may obstruct wireless spectrum or resources utilized in cooperative or automated driving decisions. In some aspects, the mitigation action may comprise selecting an alternate path to avoid the threat entity, utilizing a more robust MCS, or virtual sensing of the threat entity. The threat entity may substantially degrade the wireless spectrum or resources utilized in cooperative or automated driving decisions. Cooperative or automated driving decisions may require a high reliability for safety purposes. In some aspects, the second wireless device may determine to alter its scheduled route or path of travel to one that is least affected by the detected threat entity or any threat entity. The second wireless device may be able to avoid or mitigate contact with the threat entity in instances where the second wireless device receives the message, indicating the threat entity, from the network entity (e.g., RSU). The second wireless device being distanced from the first wireless device may not be within range to receive the message directly from the first wireless device via PC5, such that the second wireless device receives the message relayed from network entity (e.g., base station) via a Uu link. The second wireless device being distanced from the first wireless device may provide the second wireless device with sufficient time to prepare the mitigation action, such as taking an alternate path to avoid the threat entity, utilizing a more robust MCS, or virtual sensing of the threat entity. In some aspects, the network entity may comprise an RSU or a multi-access edge computing (MEC) system which may be configured to provide a detailed RF fingerprint of known threats (e.g., stationary) such as access points at street intersections and transmit to a cloud endpoint via Uu which may be transmitted to the second wireless device. The RSU or MEC may obtain an improved localization of the threat entity than the first wireless device due, in part, to the RSU or MEC having higher computational resources and/or sensory inputs. In addition, the RSU or MEC may transit the message reporting the threat entity to the second wireless device via PC5 and/or Uu interfaces.

In some aspects, for example at 2112, the first wireless device may determine an estimated measure of a location of the threat entity based on the data signals received from the threat entity in combination with other data obtained by the first wireless device. In some aspects, the data signals received from the threat entity may be combined with data received from one or more sensors of the first wireless device. For example, the first wireless device may combine RSSI measurements of the threat entity with readings from sensors of the first wireless device (e.g., camera, radar, LIDAR) and/or V2I messages (e.g., MAP) to determine the estimated location of the threat entity. The message may comprise the estimated location of the threat entity and a confidence value associated with the estimated location of the threat entity.

In some aspects, for example at 2110, the first wireless device 2102 may receive, from a third wireless device 2106, a report indicating the threat entity. The first wireless device may determine the estimated location of the threat entity in response to receipt of the report. In some aspects, the first wireless device 2102 may be triggered to determine the estimated location of the threat entity in response to receipt of the report. In some aspects, the first wireless device 2102 may utilize information provided in the report from the third wireless 2106 device along with the data signals that the first wireless device has received from the threat entity to determine the estimated location of the threat entity. In some aspects, the report from the third wireless device may comprise an estimated location of the threat entity determined by the third wireless device, signal strength measurements of the threat entity measured by the third wireless device, or other characteristics of the threat entity. In some aspects, the report from the third wireless device may comprise characteristics of the third wireless device, such as but not limited to, location, speed, heading, and timestamp. The first wireless device may receive a report related to the detected threat entity from more than one third wireless device, and combine such information to determine the estimated location of the threat entity.

In some aspects, for example at 2116, the second wireless device 2104 may adjust transmission parameters in response to the receiving of the message. The second wireless device may adjust transmission parameters in response to the receiving of the message in order to transmit BSM. In some aspects, the adjusted transmission parameters may comprise at least one of an increase in transmission power or using a more robust MCS, or a combination thereof. Using a more robust MCS may comprise switching to a lower MCS. In some aspects, adjusting the transmission parameters may mitigate the effect of the threat entity, but may increase packet collision probability with other wireless devices due to an extended range and/or increased over-the-air transmission time. In such instances, the MCS index and the transmission power may be adjusted based on wireless device density and threat signal strength.

Figure 22:
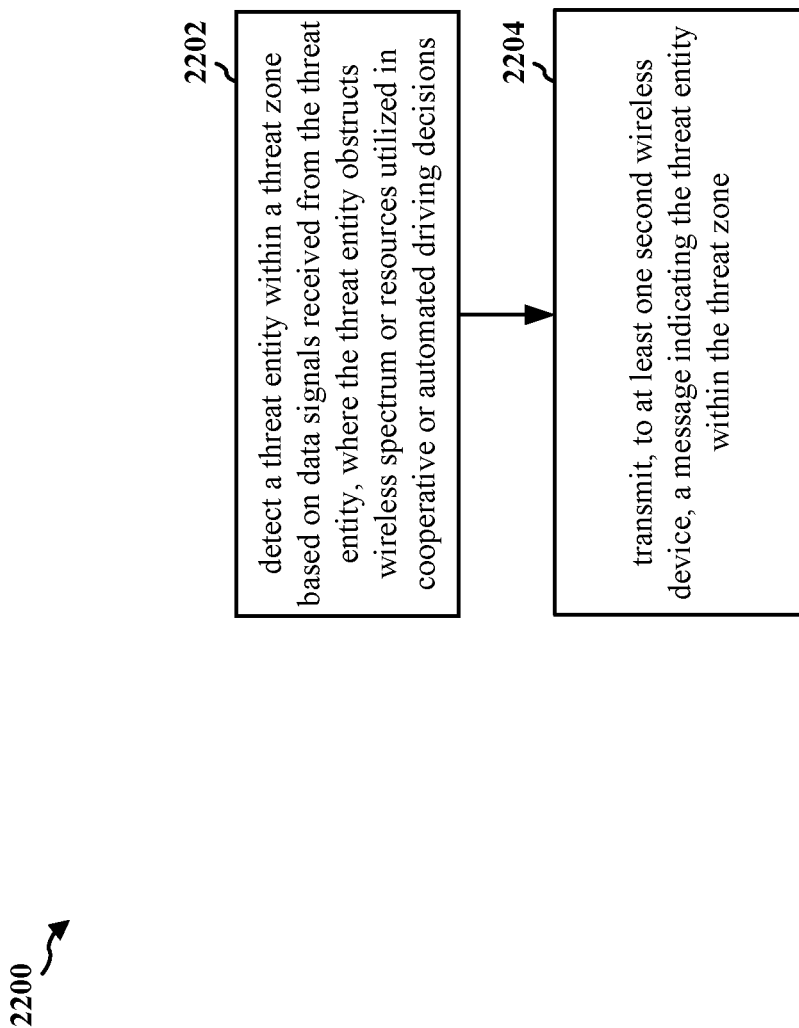
FIG. 22 is a flowchart of a method of wireless communication.

FIG. 22 is a flowchart 2200 of a method of wireless communication. The method may be performed by a UE or a component of a UE (e.g., the UE 104; the apparatus 2402; the cellular baseband processor 2404, which may include the memory 360 and which may be the entire UE 350 or a component of the UE 350, such as the TX processor 368, the RX processor 356, and/or the controller/processor 359). One or more of the illustrated operations may be optional, omitted, transposed, or contemporaneous. The method may allow a first wireless device to share information related to a detected threat entity with other wireless devices beyond a threat zone of the threat entity such that the other wireless device may take preventive measures proactively.

At 2202, the first wireless device may detect a threat entity within a threat zone. For example, 2202 may be performed by detection component 2440 of apparatus 2402. The first wireless device may detect the threat entity within the threat zone based on data signals received from the threat entity. The threat entity may obstruct wireless spectrum or resources utilized in cooperative or automated driving decisions. In some aspects, the data signals received from the threat entity may comprise data that is inconsistent with projected data for wireless devices. For example, the data signals may include data that is not realistic or anticipated for wireless devices. The data signals may indicate a value of speed that is much higher than expected, position information that is nonsensical or not within the vicinity of the first wireless device, or may include high amounts of data that overloads the first wireless device. The data signals may include other types of inconsistent or incorrect data such that the disclosure is not intended to be limited to the examples provided herein. In some aspects, the data signals may comprise data of a misbehaving wireless device. The data of the misbehaving wireless device comprises erroneous or implausible data related to at least one characteristic of the misbehaving wireless device. In some aspects, a type of the threat entity may be determined, by the first wireless device, based on data signals received from the threat entity. The type of the threat entity may comprise a DoS attacker, a jammer, a misbehaving vehicle, an OOB interferer, a WAN jammer, or a GNSS jammer.

At 2204, the first wireless device may transmit a message indicating the threat entity within the threat zone. For example, 2204 may be performed by message component 2446 of apparatus 2402. The first wireless device may transmit the message indicating the threat entity within the threat zone to at least one second wireless device. The detected threat entity may be considered as a new class of detected object, such that the message indicating the threat entity may be encoded as an SDSM or CPM due to the threat entity being a spectrum or security issue as opposed to a physical obstacle. The message may be broadcasted to the at least one second wireless device outside of the threat zone, as well as any other wireless device within the vicinity of the first wireless device. The message may be broadcast to the at least one second wireless device via sidelink communication (e.g., PC5). In some aspects, the message may be transmitted to a network entity (e.g., base station) over a Uu interface. In such instances, the network entity (e.g., base station) may relay the message to other wireless devices outside of the threat zone, such that the other wireless devices may take preventative measures proactively. The message may be transmitted based on at least one of a number of reports of the threat entity received from at least one third wireless device, a severity of the threat entity, a distance separating the threat entity and the first wireless device, or a time for the at least one second wireless device to approach the threat zone, or a combination thereof. The message (e.g., SDSM) may trigger a mitigation action in the at least one second wireless device to avoid or mitigate contact with the threat entity. The message allows the at least one second wireless device to virtually sense the threat entity, even though the at least one second wireless device may not be within the threat zone of the threat entity to physically sense the threat entity.

The message may comprise information related to characteristics of the threat entity. In some aspects, the message may comprise a confidence value associated with the type of the threat entity. The message may comprise an average of the RSSI measured over a bandwidth of at least the first wireless device. Jamming is usually wideband and the average of the RSSI measured over the entire bandwidth of the first wireless device may indicate the threat entity as being a jamming device. In some aspects, the message may comprise an average of the RSSI measured for each subchannel that exceed an RSSI threshold. The average of the RSSI for each subchannel may be measured over a time window. The average of the RSSI measured for each subchannel may indicate the threat entity as an OOB entity or narrowband jammer. The message may comprise a duty cycle of the data signals received from the threat entity. The information of the duty cycle of the data signal from the threat entity may allow wireless devices to disregard data received during the duty cycle. In some aspects, the message may comprise an L2 address of the threat entity. In some instances, for example, a DoS attack or a misbehaving wireless device (e.g., misbehaving vehicle), the RSSI report may not be relevant. As such, the message may include the L2 address of the threat entity to allow the at least one second wireless device to pre-filter received DoS packets at the modem layer. The message may further indicate at least one IE corresponding to the threat entity. The at least one IE may comprise detected characteristics of threat entity. In some aspects, the detected characteristics of the threat entity may comprise at least one of a position, a speed, or a heading, or a combination thereof. For example, the position, the speed, and/or the heading of the threat entity may be included for a DoS attack. In some aspects, the detected characteristics of the threat entity may comprise a radius around the position of the threat entity. For example, for a jammer or interferer, information related to the radius around the position may be provided. In some aspects, the first wireless device may combine information from its other sensors (e.g., camera, radar, LIDAR) and/or messages (e.g., SDSM or MAP) received from other wireless devices detecting the same threat entity to determine characteristics of the threat entity. In some aspects, the detected characteristics of the threat entity may comprise information related to a measured RSSI of the threat entity. In some aspects, the detected characteristics of the threat entity may comprise information related to one or more layers associated with the threat entity, a cert digest, a cell identifier, or a PLMN. The message may identify the threat entity as an object transmitting the data signals of the threat entity. In some aspects, the object may comprise one of a VRU, a detected vehicle, or a wireless obstacle.

In instances that the detected threat type is a C-V2X jammer the IE (e.g., DetectedJammerData) may include information related to the average of the RSSI across the entire bandwidth of the first wireless device and the RSSI averaging window size. In some aspects, the IE (e.g., DetectedObjectCommonData) may include information related to the radius of the threat zone of the threat entity, as well as combined information for other sensors (e.g., camera, radar, LIDAR) of the first wireless device. In instances that the detected threat type is an OOB interferer, the IE (e.g., DetectedInterfererData) may include the measured RSSI for each subchannel or band, the RSSI report threshold, the RSSI averaging window size, or the duty cycle of the threat entity. In instances that the detected threat type is a misbehaving vehicle, the IE (e.g., MisbehavingVehicleData) may include the L2 address or cert digest. In instances that the detected threat type is a WAN jammer, the IE (e.g., DetectedJammerData) may include information related to (EARFCN, cell identifiers, or PLMN. In instances that the detected threat type is a GNSS jammer, the IE (e.g., DetectedJammerData) may include information related to the GNSS band, L1, L2, or L5.

Figure 23:
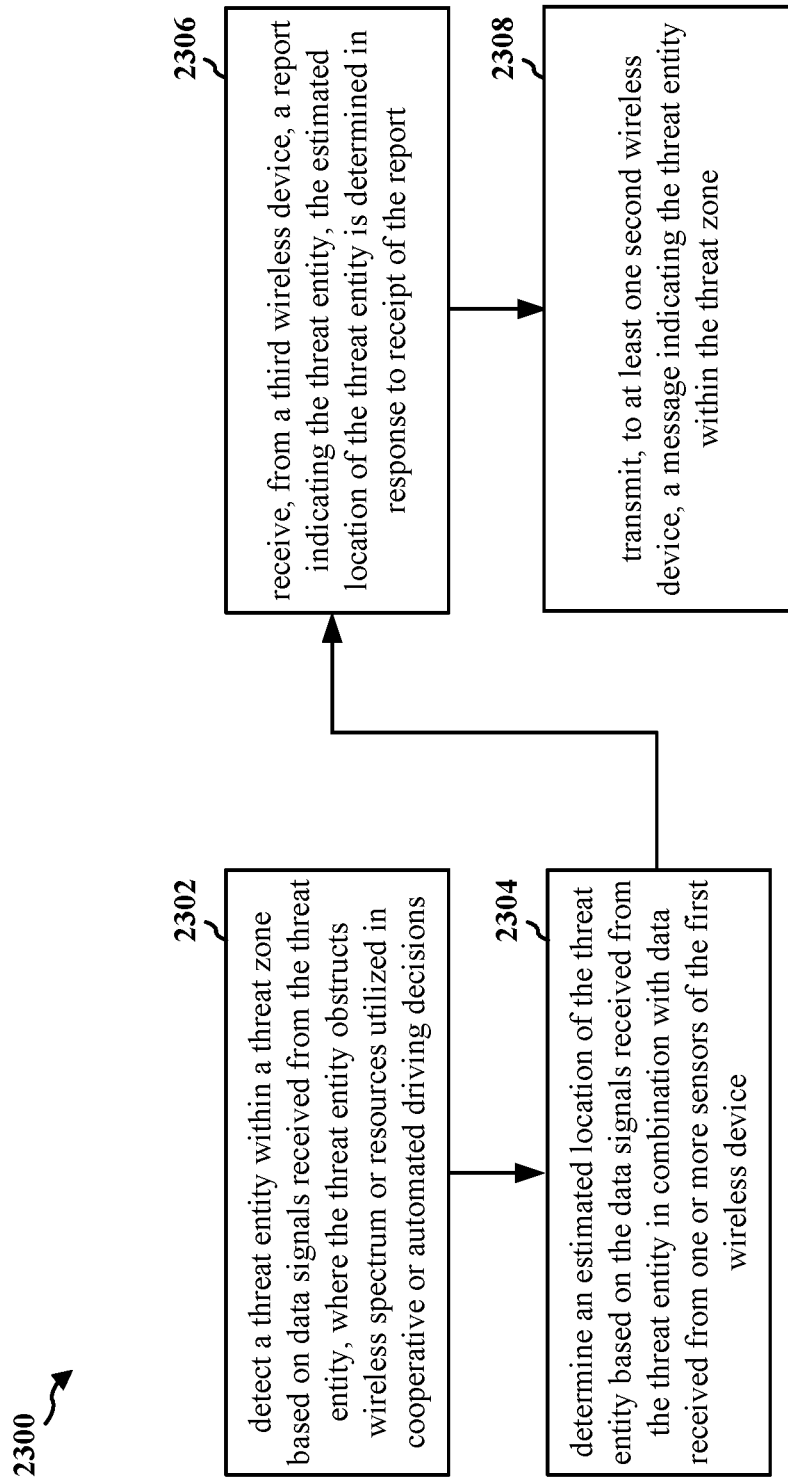
FIG. 23 is a flowchart of a method of wireless communication.

FIG. 23 is a flowchart 2300 of a method of wireless communication. The method may be performed by a UE or a component of a UE (e.g., the UE 104; the apparatus 2402; the cellular baseband processor 2404, which may include the memory 360 and which may be the entire UE 350 or a component of the UE 350, such as the TX processor 368, the RX processor 356, and/or the controller/processor 359). One or more of the illustrated operations may be optional, omitted, transposed, or contemporaneous. The method may allow a first wireless device to share information related to a detected threat entity with other wireless devices beyond a threat zone of the threat entity such that the other wireless device may take preventive measures proactively.

At 2302, the first wireless device may detect a threat entity within a threat zone. For example, 2302 may be performed by detection component 2440 of apparatus 2402. The first wireless device may detect the threat entity within the threat zone based on data signals received from the threat entity. The threat entity may obstruct wireless spectrum or resources utilized in cooperative or automated driving decisions. In some aspects, the data signals received from the threat entity may comprise data that is inconsistent with projected data for wireless devices. For example, the data signals may include data that is not realistic or anticipated for wireless devices. The data signals may indicate a value of speed that is much higher than expected, position information that is nonsensical or not within the vicinity of the first wireless device, or may include high amounts of data that overloads the first wireless device. The data signals may include other types of inconsistent or incorrect data such that the disclosure is not intended to be limited to the examples provided herein. In some aspects, the data signals may comprise data of a misbehaving wireless device. The data of the misbehaving wireless device comprises erroneous or implausible data related to at least one characteristic of the misbehaving wireless device. In some aspects, a type of the threat entity may be determined, by the first wireless device, based on data signals received from the threat entity. The type of the threat entity may comprise a DoS attacker, a jammer, a misbehaving vehicle, an OOB interferer, a WAN jammer, or a GNSS jammer.

At 2304, the first wireless device may determine an estimated location of the threat entity based on the data signals received from the threat entity in combination with other data obtained by the first wireless device. For example, 2304 may be performed by determination component 2442 of apparatus 2402. In some aspects, the data signals received from the threat entity may be combined with data received from one or more sensors of the first wireless device. For example, the first wireless device may combine RSSI measurements of the threat entity with readings from sensors of the first wireless device (e.g., camera, radar, LIDAR) and/or V2I messages (e.g., MAP) to determine the location of the threat entity. The message may comprise the estimated location of the threat entity and a confidence value associated with the estimated location of the threat entity.

At 2306, the first wireless device may receive, from a third wireless device, a report indicating the threat entity. For example, 2306 may be performed by report component 2444 of apparatus 2402. The first wireless device may determine the estimated location of the threat entity in response to receipt of the report. In some aspects, the first wireless device may be triggered to determine the estimated location of the threat entity in response to receipt of the report. In some aspects, the first wireless device may utilize information provided in the report from the third wireless device along with the data signals that the first wireless device has received from the threat entity to determine the estimated location of the threat entity. In some aspects, the report from the third wireless device may comprise an estimated location of the threat entity determined by the third wireless device, signal strength measurements of the threat entity measured by the third wireless device, or other characteristics of the threat entity. In some aspects, the report from the third wireless device may comprise characteristics of the third wireless device, such as but not limited to, location, speed, heading, and timestamp. The first wireless device may receive a report related to the detected threat entity from more than one third wireless device, and combine such information to determine the estimated location of the threat entity.

At 2308, the first wireless device may transmit a message indicating the threat entity within the threat zone. For example, 2308 may be performed by message component 2446 of apparatus 2402. The first wireless device may transmit the message indicating the threat entity within the threat zone to at least one second wireless device. The detected threat entity may be considered as a new class of detected object, such that the message indicating the threat entity may be encoded as an SDSM or CPM due to the threat entity being a spectrum or security issue as opposed to a physical obstacle. The message may be broadcasted to the at least one second wireless device outside of the threat zone, as well as any other wireless device within the vicinity of the first wireless device. The message may be broadcast to the at least one second wireless device via sidelink communication (e.g., PC5). In some aspects, the message may be transmitted to a network entity (e.g., base station) over a Uu interface. In such instances, the network entity (e.g., base station) may relay the message to other wireless devices outside of the threat zone, such that the other wireless devices may take preventative measures proactively. The message may be transmitted based on at least one of a number of reports of the threat entity received from at least one third wireless device, a severity of the threat entity, a distance separating the threat entity and the first wireless device, or a time for the at least one second wireless device to approach the threat zone, or a combination thereof. The message (e.g., SDSM) may trigger a mitigation action in the at least one second wireless device to avoid or mitigate contact with the threat entity. The message allows the at least one second wireless device to virtually sense the threat entity, even though the at least one second wireless device may not be within the threat zone of the threat entity to physically sense the threat entity.

The message may comprise information related to characteristics of the threat entity. In some aspects, the message may comprise a confidence value associated with the type of the threat entity. The message may comprise an average of the RSSI measured over a bandwidth of at least the first wireless device. Jamming is usually wideband and the average of the RSSI measured over the entire bandwidth of the first wireless device may indicate the threat entity as being a jamming device. In some aspects, the message may comprise an average of the RSSI measured for each subchannel that exceed an RSSI threshold. The average of the RSSI for each subchannel may be measured over a time window. The average of the RSSI measured for each subchannel may indicate the threat entity as an OOB entity or narrowband jammer. The message may comprise a duty cycle of the data signals received from the threat entity. The information of the duty cycle of the data signal from the threat entity may allow wireless devices to disregard data received during the duty cycle. In some aspects, the message may comprise an L2 address of the threat entity. In some instances, for example, a DoS attack or a misbehaving wireless device (e.g., misbehaving vehicle), the RSSI report may not be relevant. As such, the message may include the L2 address of the threat entity to allow the at least one second wireless device to pre-filter received DoS packets at the modem layer. The message may further indicate at least one IE corresponding to the threat entity. The at least one IE may comprise detected characteristics of threat entity. In some aspects, the detected characteristics of the threat entity may comprise at least one of a position, a speed, or a heading, or a combination thereof. For example, the position, the speed, and/or the heading of the threat entity may be included for a DoS attack. In some aspects, the detected characteristics of the threat entity may comprise a radius around the position of the threat entity. For example, for a jammer or interferer, information related to the radius around the position may be provided. In some aspects, the first wireless device may combine information from its other sensors (e.g., camera, radar, LIDAR) and/or messages (e.g., SDSM or MAP) received from other wireless devices detecting the same threat entity to determine characteristics of the threat entity. In some aspects, the detected characteristics of the threat entity may comprise information related to a measured RSSI of the threat entity. In some aspects, the detected characteristics of the threat entity may comprise information related to one or more layers associated with the threat entity, a cert digest, a cell identifier, or a PLMN. The message may identify the threat entity as an object transmitting the data signals of the threat entity. In some aspects, the object may comprise one of a VRU, a detected vehicle, or a wireless obstacle.

In instances that the detected threat type is a C-V2X jammer the IE (e.g., DetectedJammerData) may include information related to the average of the RSSI across the entire bandwidth of the first wireless device and the RSSI averaging window size. In some aspects, the IE (e.g., DetectedObjectCommonData) may include information related to the radius of the threat zone of the threat entity, as well as combined information for other sensors (e.g., camera, radar, LIDAR) of the first wireless device. In instances that the detected threat type is an OOB interferer, the IE (e.g., DetectedInterfererData) may include the measured RSSI for each subchannel or band, the RSSI report threshold, the RSSI averaging window size, or the duty cycle of the threat entity. In instances that the detected threat type is a misbehaving vehicle, the IE (e.g., MisbehavingVehicleData) may include the L2 address or cert digest. In instances that the detected threat type is a WAN jammer, the IE (e.g., DetectedJammerData) may include information related to (EARFCN, cell identifiers, or PLMN. In instances that the detected threat type is a GNSS jammer, the IE (e.g., DetectedJammerData) may include information related to the GNSS band, L1, L2, or L5.

Figure 24:
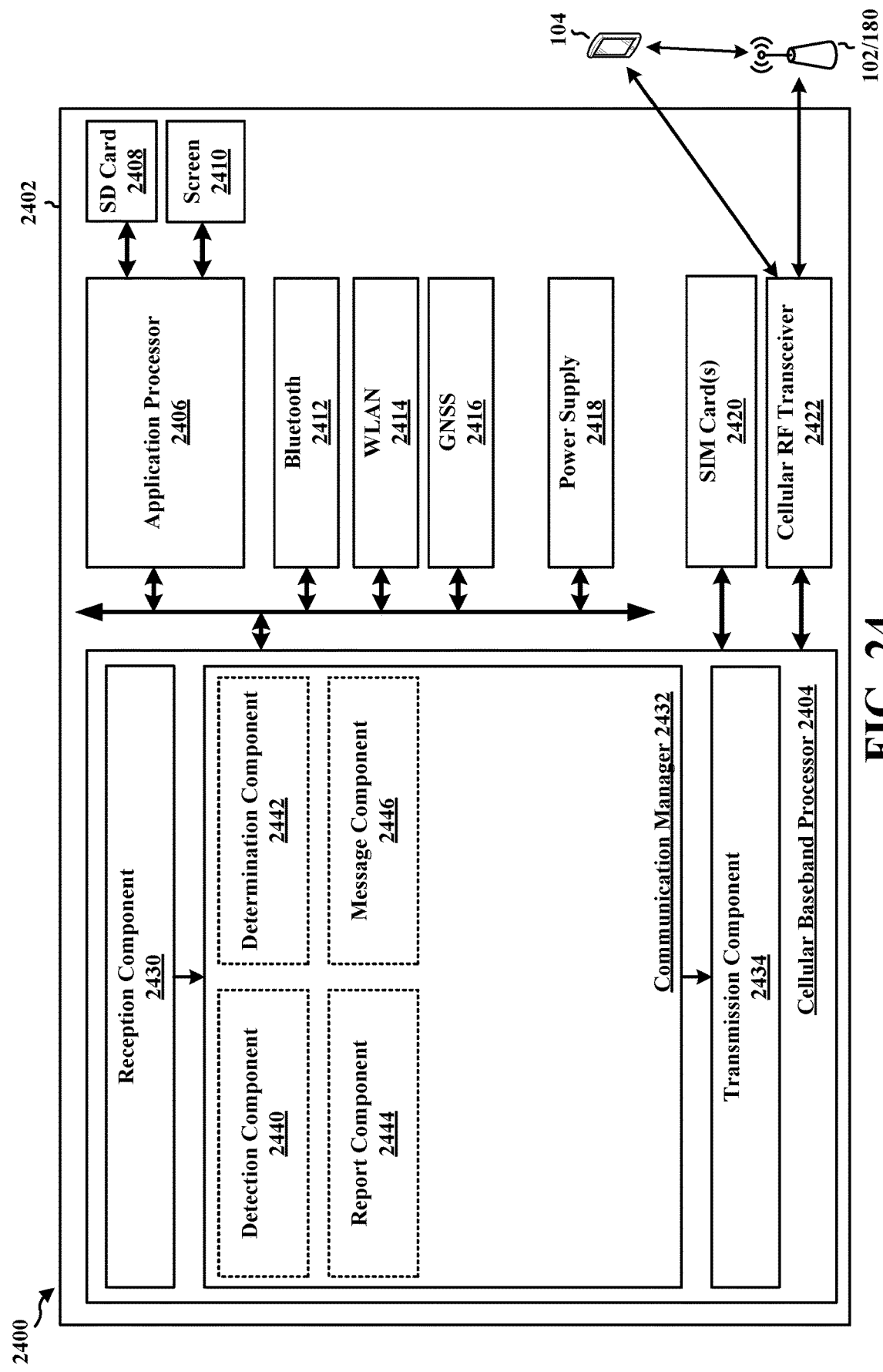
FIG. 24 is a diagram illustrating an example of a hardware implementation for an example apparatus.

FIG. 24 is a diagram 2400 illustrating an example of a hardware implementation for an apparatus 2402. The apparatus 2402 is a UE and includes a cellular baseband processor 2404 (also referred to as a modem) coupled to a cellular RF transceiver 2422 and one or more subscriber identity modules (SIM) cards 2420, an application processor 2406 coupled to a secure digital (SD) card 2408 and a screen 2410, a Bluetooth module 2412, a wireless local area network (WLAN) module 2414, a GNSS module 2416, and a power supply 2418. The GNSS module 2416 may comprise a variety of satellite positioning systems. For example, the GNSS module may correspond to Global Positioning System (GPS), Global Navigation Satellite System (GLONASS), Galileo, BeiDou Navigation Satellite System (BDS), Wide Area Augmentation System (WAAS), European Geostationary Navigation Overlay Service (EGNOS), GPS Aided GEO Augmented Navigation (GAGAN), Multifunctional Transport Satellites (MTSAT) Satellite Augmentation System (MSAS), Quasi-Zenith Satellite System (QZSS), or Navigation with Indian Constellation (NavIC). The cellular baseband processor 2404 communicates through the cellular RF transceiver 2422 with the UE 104 and/or BS 102/180. The cellular baseband processor 2404 may include a computer-readable medium/memory. The computer-readable medium/memory may be non-transitory. The cellular baseband processor 2404 is responsible for general processing, including the execution of software stored on the computer-readable medium/memory. The software, when executed by the cellular baseband processor 2404, causes the cellular baseband processor 2404 to perform the various functions described supra. The computer-readable medium/memory may also be used for storing data that is manipulated by the cellular baseband processor 2404 when executing software. The cellular baseband processor 2404 further includes a reception component 2430, a communication manager 2432, and a transmission component 2434. The communication manager 2432 includes the one or more illustrated components. The components within the communication manager 2432 may be stored in the computer-readable medium/memory and/or configured as hardware within the cellular baseband processor 2404. The cellular baseband processor 2404 may be a component of the UE 350 and may include the memory 360 and/or at least one of the TX processor 368, the RX processor 356, and the controller/processor 359. In one configuration, the apparatus 2402 may be a modem chip and include just the baseband processor 2404, and in another configuration, the apparatus 2402 may be the entire UE (e.g., see 350 of FIG. 3) and include the aforediscussed additional modules of the apparatus 2402.

The communication manager 2432 includes a detection component 2440 that is configured to detect a threat entity within a threat zone, e.g., as described in connection with 2202 of FIG. 22 or 2302 of FIG. 23. The communication manager 2432 further includes a determination component 2442 that is configured to determine an estimated location of the threat entity based on the data signals received from the threat entity in combination with other data obtained by the first wireless device, e.g., as described in connection with 2304 of FIG. 23. The communication manager 2432 further includes a report component 2444 that is configured to receive, from a third wireless device, a report indicating the threat entity, e.g., as described in connection with 2306 of FIG. 23. The communication manager 2432 further includes a message component 2446 that is configured to transmit a message indicating the threat entity within the threat zone, e.g., as described in connection with 2204 of FIG. 22 or 2308 of FIG. 23.

The apparatus may include additional components that perform each of the blocks of the algorithm in the aforementioned flowcharts of FIG. 22 or 23. As such, each block in the aforementioned flowcharts of FIG. 22 or 23 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 2402, and in particular the cellular baseband processor 2404, includes means for detecting a threat entity within a threat zone based on data signals received from the threat entity. The threat entity obstructs wireless spectrum or resources utilized in cooperative or automated driving decisions. The apparatus includes means for transmitting, to at least one second wireless device, a message indicating the threat entity within the threat zone. The apparatus further includes means for determining an estimated location of the threat entity based on the data signals received from the threat entity in combination with data received from one or more sensors of the first wireless device. The apparatus further includes means for receiving, from a third wireless device, a report indicating the threat entity. The estimated location of the threat entity is determined in response to receipt of the report. The aforementioned means may be one or more of the aforementioned components of the apparatus 2402 configured to perform the functions recited by the aforementioned means. As described supra, the apparatus 2402 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 25:
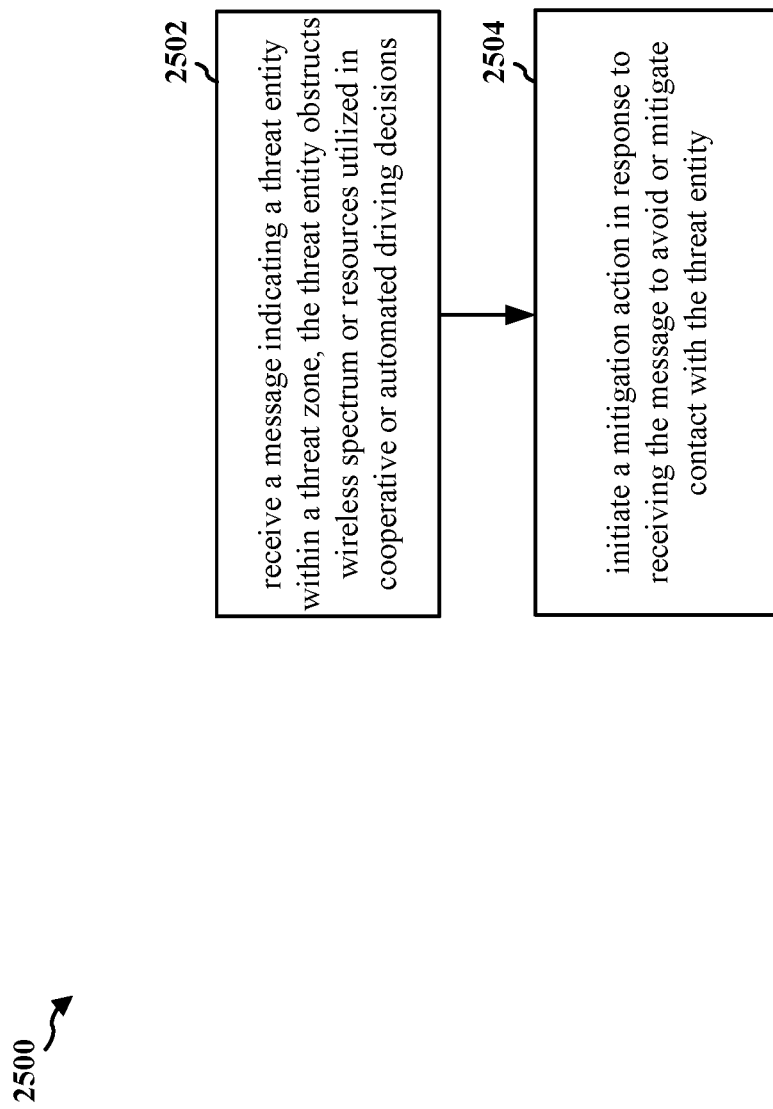
FIG. 25 is a flowchart of a method of wireless communication.

FIG. 25 is a flowchart 2500 of a method of wireless communication. The method may be performed by a UE or a component of a UE (e.g., the UE 104; the apparatus 2702; the cellular baseband processor 2704, which may include the memory 360 and which may be the entire UE 350 or a component of the UE 350, such as the TX processor 368, the RX processor 356, and/or the controller/processor 359). One or more of the illustrated operations may be optional, omitted, transposed, or contemporaneous. The method may allow a second wireless device to initiate a mitigation action based on virtually sensing a threat entity detected by a first wireless device.

At 2502, the second wireless device may receive a message indicating a threat entity within a threat zone. For example, 2502 may be performed by message component 2740 of apparatus 2702. The threat entity may obstruct wireless spectrum or resources utilized in cooperative or automated driving decisions. The second wireless device may receive the message from a first wireless device or from a network entity. For example, the first wireless device may be within the threat zone of the threat entity and physically detects the threat entity. The message received from the first wireless device may comprise an SDSM or CPM. The second wireless device receiving the message from the first wireless device indicating the threat entity allows the second wireless device to virtually sense the threat entity that the second wireless device is not able to detect due to the second wireless device being beyond the threat zone of the threat entity. In some aspects, for example in semi-persistent scheduling (SPS), the second wireless device may measure RSRP and/or RSSI of subchannels carrying data during a sensing window in order to make reservations. The second wireless device may exclude subchannels from a list of candidate subchannels if the measured RSRP/RSSI exceed a threshold. In addition, the second wireless device using the message indicating a threat entity from the first wireless device may exclude jammed or interfered subchannels based on the RSSI measurements reported in the message indicating the threat entity from the first wireless device. This virtual sensing may improve the reception probability of messages transmitted by the second wireless device, especially if the second wireless device is likely to hang on to SPS reservations for an extended period of time. In some aspects, the second wireless device may receive the message indicating the threat entity from a network entity (e.g., base station). In such instances, a wireless device (e.g., first wireless device) had physically detected the threat entity while being within the threat zone of the threat entity. The wireless device transmitted the message reporting the detected threat entity to the network entity to allow the network entity to relay the message to wireless devices outside the threat zone and beyond the range of transmission from the wireless device that detected the threat entity. The message may comprise a duty cycle of the data signals of the threat entity. The information of the duty cycle of the data signal of the threat entity may allow the second wireless device to account for the duty cycle of the threat entity when making its transmission reservations/configurations. In some aspects, the message may include peak RSSI detection among antenna elements of the first wireless device that detected the threat entity. The first wireless device configured with directional reception may enhance the determination of the location of the threat entity and may assist to constrain the threat zone included in the message.

At 2504, the second wireless device may initiate a mitigation action in response to receiving the message (e.g., SDSM). For example, 2504 may be performed by mitigation component 2744 of apparatus 2702. The second wireless device may initiate the mitigation action in response to receiving the message to avoid or mitigate contact with the threat entity. In some aspects, the mitigation action may comprise selecting an alternate path to avoid the threat entity, utilizing a more robust MCS, or virtual sensing of the threat entity. The threat entity may substantially degrade the wireless spectrum or resources utilized in cooperative or automated driving decisions. Cooperative or automated driving decisions may require a high reliability for safety purposes. In some aspects, the second wireless device may determine to alter its scheduled route or path of travel to one that is least affected by the detected threat entity or any threat entity. The second wireless device may be able to avoid or mitigate contact with the threat entity in instances where the second wireless device receives the message, indicating the threat entity, from the network entity (e.g., base station). The second wireless device being distanced from the first wireless device may not be within range to receive the message directly from the first wireless device via PC5, such that the second wireless device receives the message relayed from network entity (e.g., base station) via a Uu link. The second wireless device being distanced from the first wireless device may provide the second wireless device with sufficient time to prepare the mitigation action, such as taking an alternate path to avoid the threat entity, utilizing a more robust MCS, or virtual sensing of the threat entity. In some aspects, the network entity may comprise a base station or an MEC system which may be configured to provide a detailed RF fingerprint of known threats (e.g., stationary) such as access points at street intersections and transmit to a cloud endpoint via Uu which may be transmitted to the second wireless device. The MEC may obtain an improved localization of the threat entity than the first wireless device due, in part, to the MEC having higher computational resources and/or sensory inputs. In addition, the base station or MEC may transit the message reporting the threat entity to the second wireless device via PC5 and/or Uu interfaces.

Figure 26:
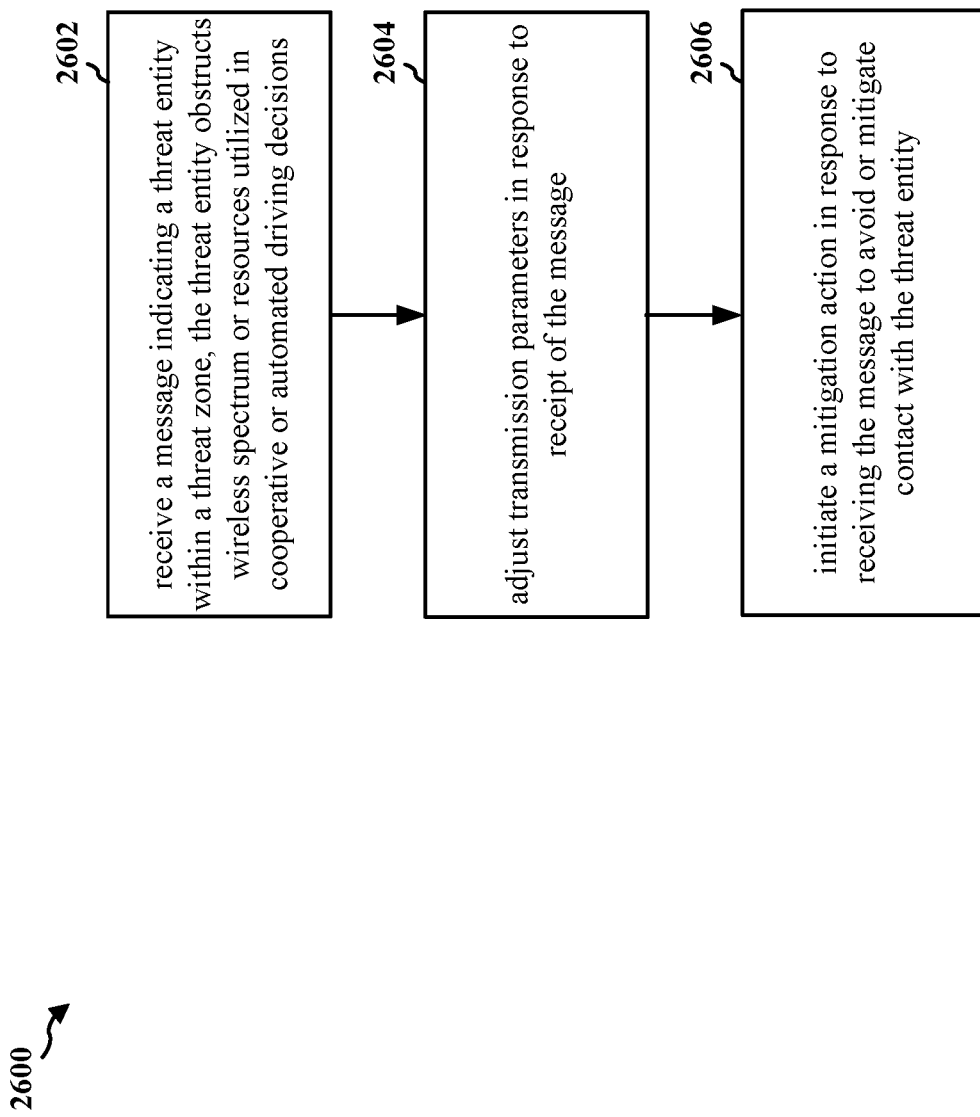
FIG. 26 is a flowchart of a method of wireless communication.

FIG. 26 is a flowchart 2600 of a method of wireless communication. The method may be performed by a UE or a component of a UE (e.g., the UE 104; the apparatus 2702; the cellular baseband processor 2704, which may include the memory 360 and which may be the entire UE 350 or a component of the UE 350, such as the TX processor 368, the RX processor 356, and/or the controller/processor 359). One or more of the illustrated operations may be optional, omitted, transposed, or contemporaneous. The method may allow a second wireless device to initiate a mitigation action based on virtually sensing a threat entity detected by a first wireless device.

At 2602, the second wireless device may receive a message indicating a threat entity within a threat zone. For example, 2602 may be performed by message component 2740 of apparatus 2702. The threat entity may obstruct wireless spectrum or resources utilized in cooperative or automated driving decisions. The second wireless device may receive the message from a first wireless device or from a network entity. For example, the first wireless device may be within the threat zone of the threat entity and physically detects the threat entity. The message received from the first wireless device may comprise an SDSM or CPM. The second wireless device receiving the message from the first wireless device indicating the threat entity allows the second wireless device to virtually sense the threat entity that the second wireless device is not able to detect due to the second wireless device being beyond the threat zone of the threat entity. In some aspects, for example in semi-persistent scheduling (SPS), the second wireless device may measure RSRP and/or RSSI of subchannels carrying data during a sensing window in order to make reservations. The second wireless device may exclude subchannels from a list of candidate subchannels if the measured RSRP/RSSI exceed a threshold. In addition, the second wireless device using the message indicating a threat entity from the first wireless device may exclude jammed or interfered subchannels based on the RSSI measurements reported in the message indicating the threat entity from the first wireless device. This virtual sensing may improve the reception probability of messages transmitted by the second wireless device, especially if the second wireless device is likely to hang on to SPS reservations for an extended period of time. In some aspects, the second wireless device may receive the message indicating the threat entity from a network entity (e.g., base station). In such instances, a wireless device (e.g., first wireless device) had physically detected the threat entity while being within the threat zone of the threat entity. The wireless device transmitted the message reporting the detected threat entity to the network entity to allow the network entity to relay the message to wireless devices outside the threat zone and beyond the range of transmission from the wireless device that detected the threat entity. The message may comprise a duty cycle of the data signals of the threat entity. The information of the duty cycle of the data signal of the threat entity may allow the second wireless device to account for the duty cycle of the threat entity when making its transmission reservations/configurations. In some aspects, the message may include peak RSSI detection among antenna elements of the first wireless device that detected the threat entity. The first wireless device configured with directional reception may enhance the determination of the location of the threat entity and may assist to constrain the threat zone included in the message.

At 2604, the second wireless device may adjust transmission parameters in response to the receiving of the message. For example, 2602 may be performed by adjust component 2742 of apparatus 2702. The second wireless device may adjust transmission parameters in response to the receiving of the message in order to transmit BSM. In some aspects, the adjusted transmission parameters may comprise at least one of an increase in transmission power or using a more robust MCS, or a combination thereof. Using a more robust MCS may comprise switching to a lower MCS. In some aspects, adjusting the transmission parameters may mitigate the effect of the threat entity, but may increase packet collision probability with other wireless devices due to an extended range and/or increased over-the-air transmission time. In such instances, the MCS index and the transmission power may be adjusted based on wireless device density and threat signal strength.

At 2606, the second wireless device may initiate a mitigation action in response to receiving the message (e.g., SDSM). For example, 2606 may be performed by mitigation component 2744 of apparatus 2702. The second wireless device may initiate the mitigation action in response to receiving the message to avoid or mitigate contact with the threat entity. In some aspects, the mitigation action may comprise selecting an alternate path to avoid the threat entity, utilizing a more robust MCS, or virtual sensing the threat entity. The threat entity may substantially degrade the wireless spectrum or resources utilized in cooperative or automated driving decisions. Cooperative or automated driving decisions may require a high reliability for safety purposes. In some aspects, the second wireless device may determine to alter its scheduled route or path of travel to one that is least affected by the detected threat entity or any threat entity. The second wireless device may be able to avoid or mitigate contact with the threat entity in instances where the second wireless device receives the message, indicating the threat entity, from the network entity (e.g., base station). The second wireless device being distanced from the first wireless device may not be within range to receive the message directly from the first wireless device via PC5, such that the second wireless device receives the message relayed from network entity (e.g., base station) via a Uu link. The second wireless device being distanced from the first wireless device may provide the second wireless device with sufficient time to prepare the mitigation action, such as taking an alternate path to avoid the threat entity, utilizing a more robust MCS, or virtual sensing of the threat entity. In some aspects, the network entity may comprise an RSU or an MEC system which may be configured to provide a detailed RF fingerprint of known threats (e.g., stationary) such as access points at street intersections and transmit to a cloud endpoint via Uu which may be transmitted to the second wireless device. The RSU or MEC may obtain an improved localization of the threat entity than the first wireless device due, in part, to the RSU or MEC having higher computational resources and/or sensory inputs. In addition, the RSU or MEC may transit the message reporting the threat entity to the second wireless device via PC5 and/or Uu interfaces.

Figure 27:
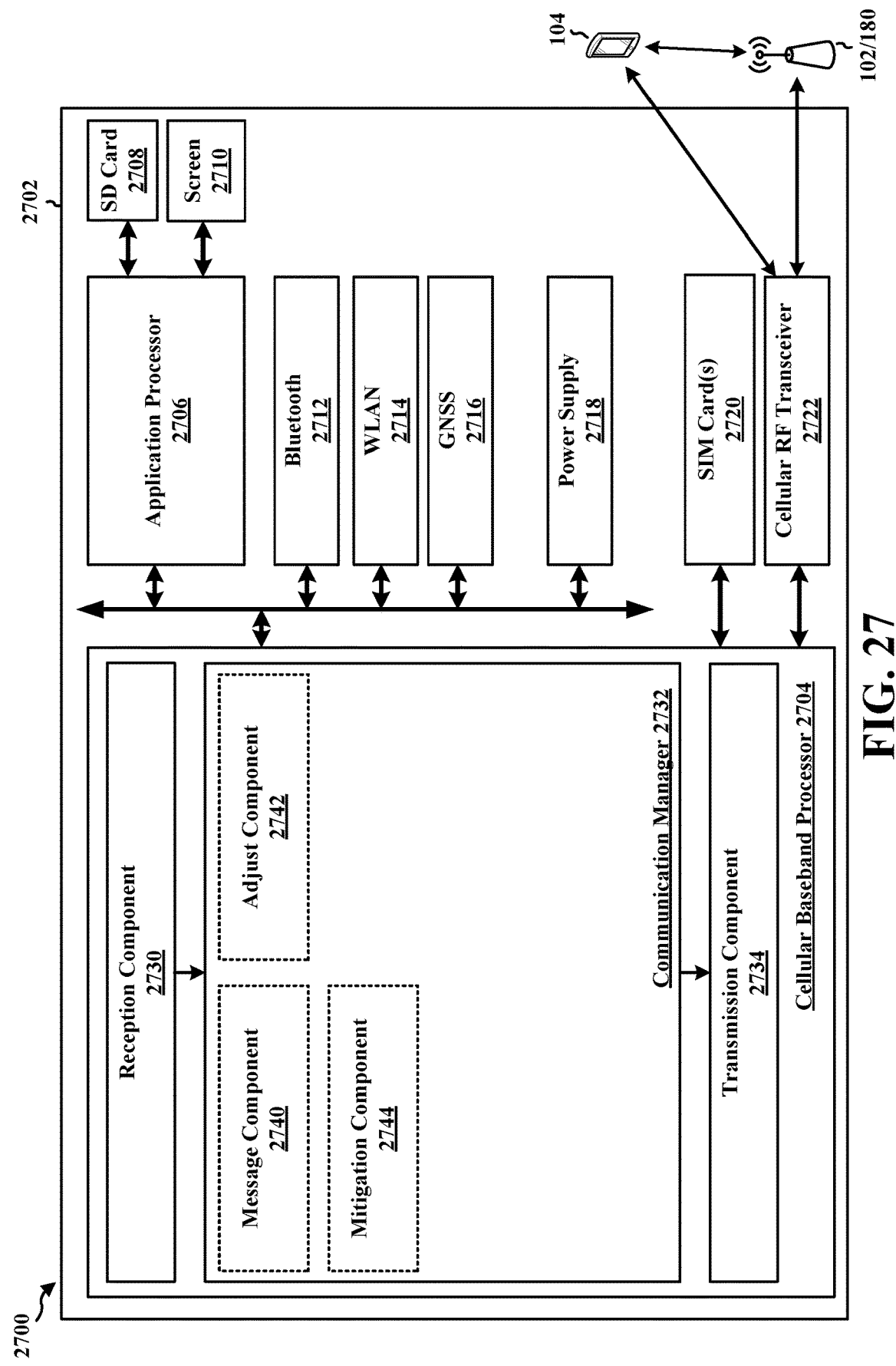
FIG. 27 is a diagram illustrating an example of a hardware implementation for an example apparatus.

FIG. 27 is a diagram 2700 illustrating an example of a hardware implementation for an apparatus 2702. The apparatus 2702 is a UE and includes a cellular baseband processor 2704 (also referred to as a modem) coupled to a cellular RF transceiver 2722 and one or more subscriber identity modules (SIM) cards 2720, an application processor 2706 coupled to a secure digital (SD) card 2708 and a screen 2710, a Bluetooth module 2712, a wireless local area network (WLAN) module 2714, a GNSS module 2716, and a power supply 2718. The GNSS module 2716 may comprise a variety of satellite positioning systems. For example, the GNSS module may correspond to Global Positioning System (GPS), Global Navigation Satellite System (GLONASS), Galileo, BeiDou Navigation Satellite System (BDS), Wide Area Augmentation System (WAAS), European Geostationary Navigation Overlay Service (EGNOS), GPS Aided GEO Augmented Navigation (GAGAN), Multifunctional Transport Satellites (MTSAT) Satellite Augmentation System (MSAS), Quasi-Zenith Satellite System (QZSS), or Navigation with Indian Constellation (NavIC). The cellular baseband processor 2704 communicates through the cellular RF transceiver 2722 with the UE 104 and/or BS 102/180. The cellular baseband processor 2704 may include a computer-readable medium/memory. The computer-readable medium/memory may be non-transitory. The cellular baseband processor 2704 is responsible for general processing, including the execution of software stored on the computer-readable medium/memory. The software, when executed by the cellular baseband processor 2704, causes the cellular baseband processor 2704 to perform the various functions described supra. The computer-readable medium/memory may also be used for storing data that is manipulated by the cellular baseband processor 2704 when executing software. The cellular baseband processor 2704 further includes a reception component 2730, a communication manager 2732, and a transmission component 2734. The communication manager 2732 includes the one or more illustrated components. The components within the communication manager 2732 may be stored in the computer-readable medium/memory and/or configured as hardware within the cellular baseband processor 2704. The cellular baseband processor 2704 may be a component of the UE 350 and may include the memory 360 and/or at least one of the TX processor 368, the RX processor 356, and the controller/processor 359. In one configuration, the apparatus 2702 may be a modem chip and include just the baseband processor 2704, and in another configuration, the apparatus 2702 may be the entire UE (e.g., see 350 of FIG. 3) and include the aforediscussed additional modules of the apparatus 2702.

The communication manager 2732 includes a message component 2740 that is configured to receive a message indicating a threat entity within a threat zone, e.g., as described in connection with 2502 of FIG. 25 or 2602 of FIG. 26. The communication manager 2732 further includes an adjust component 2742 that is configured to adjust transmission parameters in response to the receiving of the message, e.g., as described in connection with 2604 of FIG. 26. The communication manager 2732 further includes a mitigation component 2744 that is configured to initiate a mitigation action in response to receiving the message, e.g., as described in connection with 2504 of FIG. 25 or 2606 of FIG. 26.

The apparatus may include additional components that perform each of the blocks of the algorithm in the aforementioned flowcharts of FIG. 25 or 26. As such, each block in the aforementioned flowcharts of FIG. 25 or 26 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 2702, and in particular the cellular baseband processor 2704, includes means for receiving a message indicating a threat entity within a threat zone. The threat entity obstructs wireless spectrum or resources utilized in cooperative or automated driving decisions. The apparatus includes means for initiating a mitigation action in response to receiving the message to avoid or mitigate contact with the threat entity. The apparatus further includes means for adjusting transmission parameters in response to receipt of the message. The aforementioned means may be one or more of the aforementioned components of the apparatus 2702 configured to perform the functions recited by the aforementioned means. As described supra, the apparatus 2702 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 28:
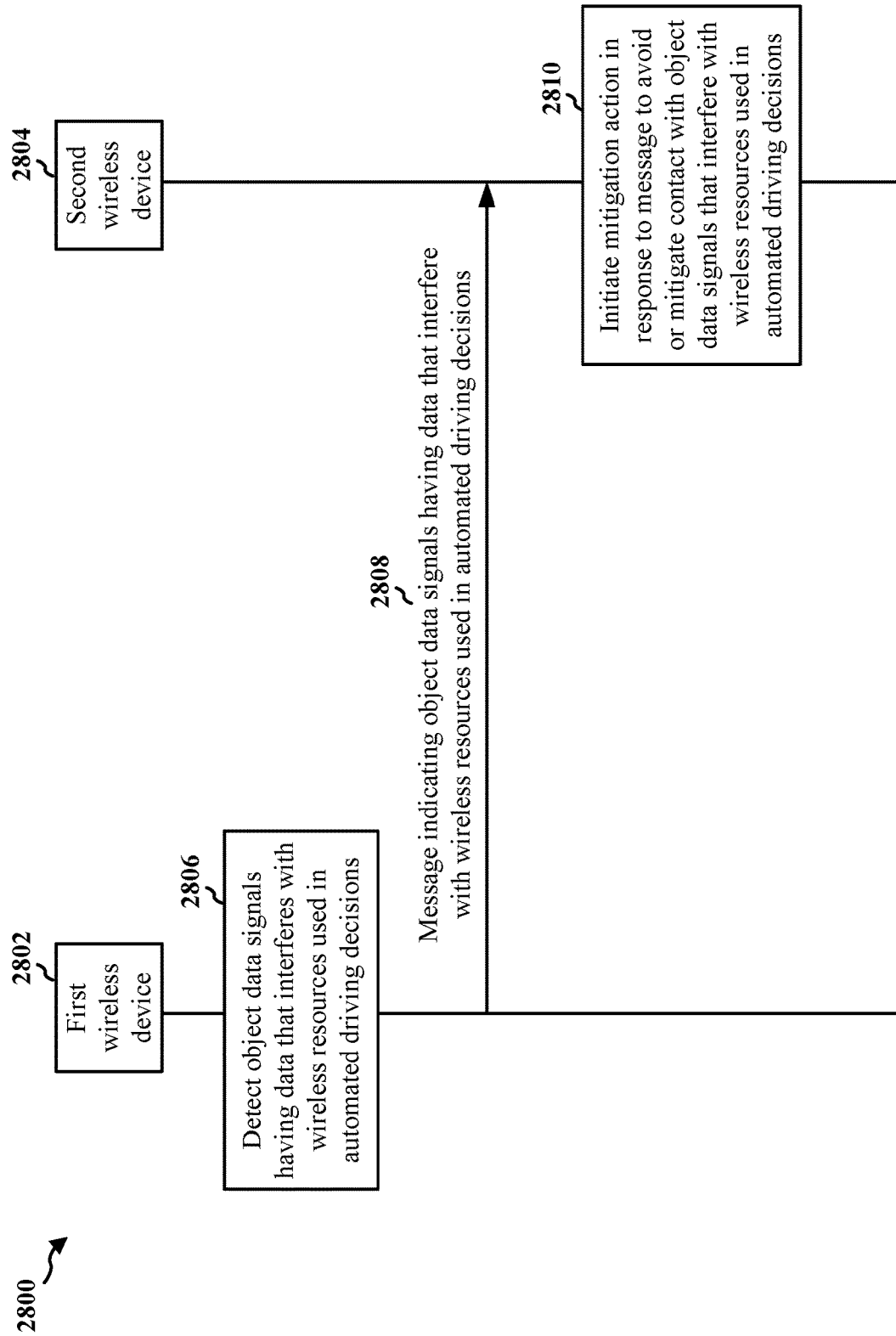
FIG. 28 is a call flow diagram of signaling between a first wireless device and a second wireless device.

FIG. 28 illustrates an example communication flow 2800 between a first wireless device 2802 and a second wireless device 2804. The communication may be based on V2X, V2V, or D2D based communication directly from a transmitting device to a receiving device. The communication transmitting from device 2802, 2804 may be broadcast and received by multiple receiving devices within range of a particular transmitting device, as described in connection with FIG. 4. The first wireless device 2802 may correspond to a first UE, and the second wireless device 2804 may correspond to a second UE. For example, in the context of FIG. 1, the first wireless device 2802 may correspond to at least UE 104, and the second wireless device 2804 may correspond to at least 104'. In another example, in the context of FIG. 3, the first wireless device 2802 may correspond to the device 350, and the second wireless device 2804 may correspond to the device 310.

As illustrated at 2806, the first wireless device 2802 may detect one or more object data signals having data that interferes with wireless resources utilized in automated driving decisions. In some aspects, the one or more object data signals may correspond to a misbehaving wireless device. The data of the misbehaving wireless device may comprise erroneous or implausible data related to at least one characteristic of the misbehaving wireless device. In some aspects, the misbehaving wireless device may comprise a misbehaving vehicle. The erroneous or implausible data related to the at least one characteristic of the misbehaving wireless device may include at least one of a location, a speed, or a heading, or a combination thereof. For example, the one or more object data signals may include data that is not realistic or anticipated for wireless devices. The one or more object data signals may indicate a value of speed that is well beyond the actual speed, position information that is nonsensical or not within the vicinity of the first wireless device, or may include high amounts of data that overloads the first wireless device. The one or more object data signals may include other types of inconsistent or incorrect data such that the disclosure is not intended to be limited to the examples provided herein. The one or more object data signals may correspond to an obstacle that interferes with or obstructs wireless spectrum or resources utilized in the cooperative or automated driving decisions. In some aspects, the one or more object data signals of the obstacle or threat entity that interferes with or obstructs the wireless spectrum or resources may be transmitted having an RSSI greater than an RSSI threshold. In some aspects, the one or more object data signals may correspond to a DoS attacker, a jammer, a misbehaving vehicle, an OOB interferer, a WAN jammer, or a GNSS jammer. The one or more object data signals that interfere with wireless resources utilized in automated driving decisions may pose threats to safety use cases. For example, cooperative or automated driving decisions may require a high reliability for safety purposes. The obstacle or threat entity may substantially degrade the wireless spectrum or resources utilized in cooperative or automated driving decisions. Accurate knowledge of road conditions and/or road users may assist automated vehicles (e.g., first or second wireless device) to arrive at safe and efficient driving decisions, which may include decisions made individually or made as part of an inter-vehicle negotiated, cooperative maneuvers.

As illustrated at 2808, the first wireless device 2802 may transmit a message indicating the one or more object data signals having data that interferes with wireless resources utilized in automated driving decisions. The first wireless device 2802 may transmit the message indicating the one or more object data signals having data that interferes with wireless resources utilized in automated driving decisions to at least a second wireless device 2804. The second wireless device 2804 may receive the message from the first wireless device 2802. The message may be encoded as an SDSM or CPM due to the obstacle or threat entity being a spectrum or security issue as opposed to a physical obstacle. The message may be broadcasted to the at least one second wireless device outside of the threat zone, as well as any other wireless device within the vicinity of the first wireless device. The message may be broadcast to the at least one second wireless device via sidelink communication (e.g., PC5). In some aspects, the message may be transmitted to a network entity (e.g., RSU) over a PC5 interface. In such instances, the network entity (e.g., RSU) may relay the message to other wireless devices outside of the transmission range of the first wireless device and unable to receive the message via sidelink communication, such that the other wireless devices may take preventative measures proactively. In some aspects, the message further indicates at least one IE corresponding to the one or more object data signals detected. The at least one IE may comprise detected characteristics of at least one of a detected misbehaving wireless device, a DoS attacker, a detected jammer, or a detected OOB interferer, a WAN jammer, a GNSS jammer, or a combination thereof. The at least one IE may comprise classes of detected objects. Each class of detected objects may comprise the detected characteristics for a respective one of the detected misbehaving wireless device, the DoS attacker, the detected jammer, and the detected interferer. In instances that the detected object type is a misbehaving vehicle, the detected object IE (e.g., MisbehavingVehicleData) may include the L2 address or certificate digest. In instances that the detected object type is an OOB interferer, the detected obstacle IE (e.g., InterfererData) may include the measured RSSI for each subchannel or band, the RSSI report threshold, the RSSI averaging window size, or the duty cycle of the threat. In instances that the detected object type is a C-V2X jammer the detected obstacle IE (e.g., JammerData) may include information related to the average of the RSSI across the entire bandwidth of the first wireless device and the RSSI averaging window size. In instances that the detected object type is a GNSS jammer, the detected obstacle IE (e.g., JammerData) may include information related to the GNSS band, L1, L2, or L5. In instances that the detected object type is a WAN jammer, the detected obstacle IE (e.g., JammerData) may include information related to EARFCN, cell identifiers, or PLMN.

In some aspects, the message may identify an object that may be transmitting the one or more object data signals having the data that interferes with wireless resources utilized in automated driving decisions. For example, the object or obstacle that interferes with wireless resources utilized in automated driving decisions may be identified based on existing detected objects. In some aspects, the object may comprise one of a VRU, a detected vehicle, or a wireless obstacle. For example, a VRU may comprise attributes corresponding to a jammer, an interferer, or a misbehaving vehicle. In some aspects, a detected vehicle may comprise attributes corresponding to a jammer, an interferer, or a misbehaving vehicle. In some aspects, an obstacle may comprise attributes corresponding to a jammer, an interferer, or a misbehaving vehicle. In some aspects, second wireless device comprises at least one of a wireless vehicle, an RSU, or a VRU.

As illustrated at 2810, the second wireless device 2804 may initiate a mitigation action in response to receiving the message (e.g., SDSM). The second wireless device 2804 may initiate the mitigation action in response to receiving the message to avoid or mitigate contact with the one or more object data signals that interferes with wireless resources utilized in automated driving decisions. In some aspects, the message may trigger the mitigation action in the at least the second wireless device to avoid or mitigate contact with the one or more object data signals that obstruct cooperative or automated driving decisions. The obstacle may obstruct wireless spectrum or resources utilized in cooperative or automated driving decisions. In some aspects, the mitigation action may comprise selecting an alternate path to avoid the threat entity, utilizing a more robust MCS, or virtual sensing of the threat entity. The obstacle may substantially degrade the wireless spectrum or resources utilized in cooperative or automated driving decisions. Cooperative or automated driving decisions may require a high reliability for safety purposes. In some aspects, the second wireless device may determine to alter its scheduled route or path of travel to one that is least affected by the detected obstacle or any obstacle.

Figure 29:
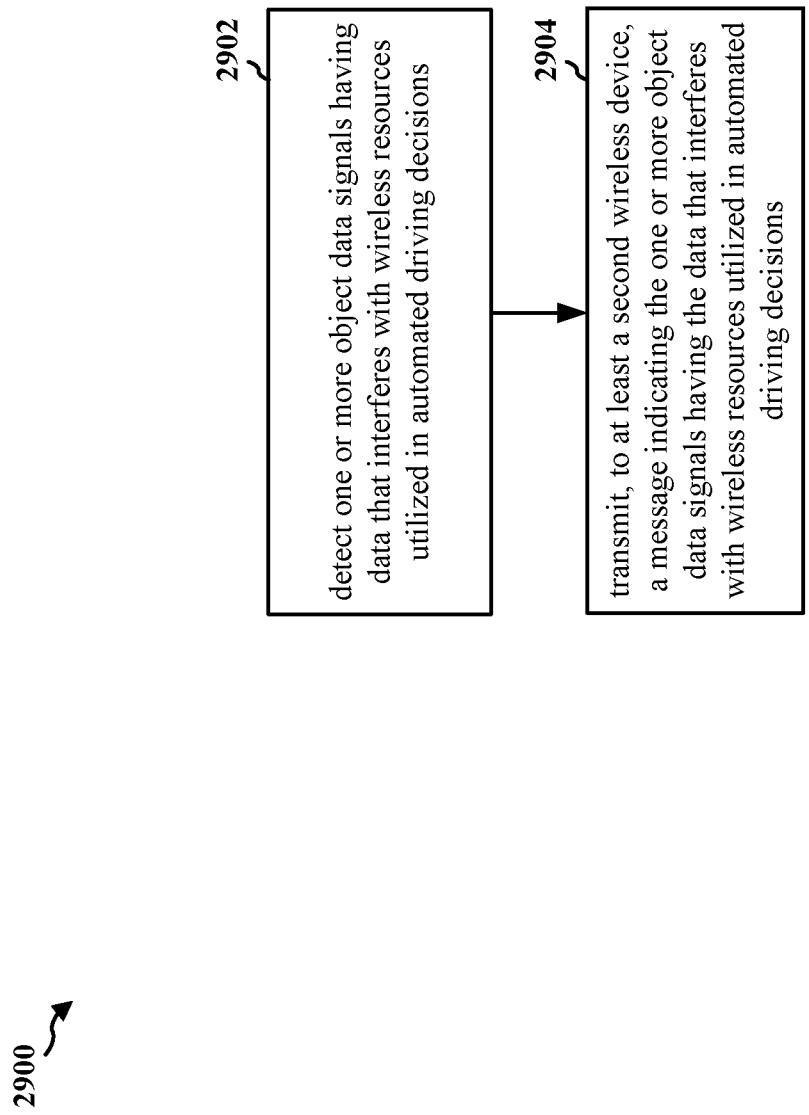
FIG. 29 is a flowchart of a method of wireless communication.

FIG. 29 is a flowchart 2900 of a method of wireless communication. The method may be performed by a UE or a component of a UE (e.g., the UE 104; the apparatus 3002; the cellular baseband processor 3004, which may include the memory 360 and which may be the entire UE 350 or a component of the UE 350, such as the TX processor 368, the RX processor 356, and/or the controller/processor 359). One or more of the illustrated operations may be optional, omitted, transposed, or contemporaneous. The method may allow a first wireless device to share information related to a detected threat entity with other wireless devices.

At 2902, the first wireless device may detect one or more object data signals having data that interferes with wireless resources utilized in automated driving decisions. For example, 2902 may be performed by detection component 3040 of apparatus 3002. In some aspects, the one or more object data signals may correspond to a misbehaving wireless device. The data of the misbehaving wireless device may comprise erroneous or implausible data related to at least one characteristic of the misbehaving wireless device. In some aspects, the misbehaving wireless device may comprise a misbehaving vehicle. The erroneous or implausible data related to the at least one characteristic of the misbehaving wireless device may include at least one of a location, a speed, or a heading, or a combination thereof. For example, the one or more object data signals may include data that is not realistic or anticipated for wireless devices. The one or more object data signals may indicate a value of speed that is well beyond the actual speed, position information that is nonsensical or not within the vicinity of the first wireless device, or may include high amounts of data that overloads the first wireless device. The one or more object data signals may include other types of inconsistent or incorrect data such that the disclosure is not intended to be limited to the examples provided herein. The one or more object data signals may correspond to an obstacle that interferes with or obstructs wireless spectrum or resources utilized in the cooperative or automated driving decisions. In some aspects, the one or more object data signals of the obstacle or threat entity that interferes with or obstructs the wireless spectrum or resources may be transmitted having an RSSI greater than an RSSI threshold. In some aspects, the one or more object data signals may correspond to a DoS attacker, a jammer, a misbehaving vehicle, an OOB interferer, a WAN jammer, or a GNSS jammer. The one or more object data signals that interfere with wireless resources utilized in automated driving decisions may pose threats to safety use cases. For example, cooperative or automated driving decisions may require a high reliability for safety purposes. The obstacle or threat entity may substantially degrade the wireless spectrum or resources utilized in cooperative or automated driving decisions. Accurate knowledge of road conditions and/or road users may assist automated vehicles (e.g., first or second wireless device) to arrive at safe and efficient driving decisions, which may include decisions made individually or made as part of an inter-vehicle negotiated, cooperative maneuvers.

At 2904, the first wireless device may transmit a message indicating the one or more object data signals having data that interferes with wireless resources utilized in automated driving decisions. For example, 2904 may be performed by message component 3042 of apparatus 3002. The first wireless device may transmit the message indicating the one or more object data signals having data that interferes with wireless resources utilized in automated driving decisions to at least a second wireless device. The message may be encoded as an SDSM or CPM due to the obstacle or threat entity being a spectrum or security issue as opposed to a physical obstacle. The message may be broadcasted to the at least one second wireless device outside of the threat zone, as well as any other wireless device within the vicinity of the first wireless device. The message may be broadcast to the at least one second wireless device via sidelink communication (e.g., PC5). In some aspects, the message may be transmitted to a network entity (e.g., RSU) over a PC5 interface. In such instances, the network entity (e.g., RSU) may relay the message to other wireless devices outside of the transmission range of the first wireless device and unable to receive the message via sidelink communication, such that the other wireless devices may take preventative measures proactively. In some aspects, the message further indicates at least one IE corresponding to the one or more object data signals detected. The at least one IE may comprise detected characteristics of at least one of a detected misbehaving wireless device, a DoS attacker, a detected jammer, a detected OOB interferer, a WAN jammer, a GNSS jammer, or a combination thereof. The at least one IE may comprise classes of detected objects. Each class of detected objects may comprise the detected characteristics for a respective one of the detected misbehaving wireless device, the DoS attacker, the detected jammer, and the detected interferer. In instances that the detected object type is a misbehaving vehicle, the detected object IE (e.g., MisbehavingVehicleData) may include the L2 address or cert digest. In instances that the detected object type is an OOB interferer, the detected obstacle IE (e.g., InterfererData) may include the measured RSSI for each subchannel or band, the RSSI report threshold, the RSSI averaging window size, or the duty cycle of the threat. In instances that the detected object type is a C-V2X jammer the detected obstacle IE (e.g., JammerData) may include information related to the average of the RSSI across the entire bandwidth of the first wireless device and the RSSI averaging window size. In instances that the detected object type is a GNSS jammer, the detected obstacle IE (e.g., JammerData) may include information related to the GNSS band, L1, L2, or L5. In instances that the detected object type is a WAN jammer, the detected obstacle IE (e.g., JammerData) may include information related to EARFCN, cell identifiers, or PLMN.

In some aspects, the message (e.g., SDSM) may trigger a mitigation action in the second wireless device to avoid or mitigate contact with the one or more object data signals that obstruct cooperative or automated driving decisions. The transmission of the message to the second wireless device may provide the second wireless device with early detection of the obstacle or threat entity, such that the second wireless device may be triggered to initiate avoidance or mitigation actions based on the message. In some aspects, the message may identify an object that may be transmitting the one or more object data signals having the data that interferes with wireless resources utilized in automated driving decisions. For example, the object or obstacle that interferes with wireless resources utilized in automated driving decisions may be identified based on existing detected objects. In some aspects, the object may comprise one of a VRU, a detected vehicle, or a wireless obstacle. For example, a VRU may comprise attributes corresponding to a jammer, an interferer, or a misbehaving vehicle. In some aspects, a detected vehicle may comprise attributes corresponding to a jammer, an interferer, or a misbehaving vehicle. In some aspects, an obstacle may comprise attributes corresponding to a jammer, an interferer, or a misbehaving vehicle. In some aspects, second wireless device comprises at least one of a wireless vehicle, an RSU, or a VRU.

Figure 30:
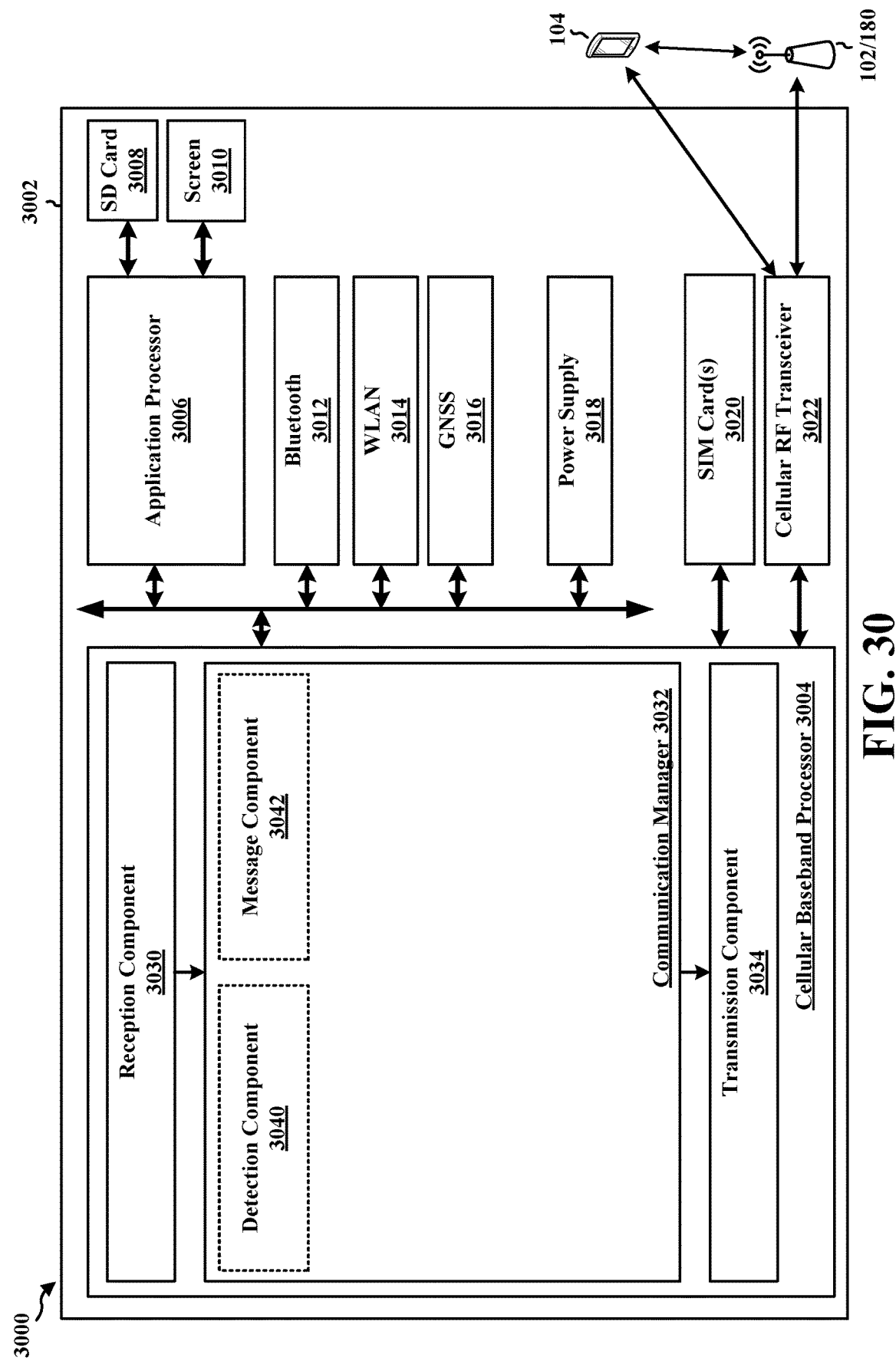
FIG. 30 is a diagram illustrating an example of a hardware implementation for an example apparatus.

FIG. 30 is a diagram 3000 illustrating an example of a hardware implementation for an apparatus 3002. The apparatus 3002 is a UE and includes a cellular baseband processor 3004 (also referred to as a modem) coupled to a cellular RF transceiver 3022 and one or more subscriber identity modules (SIM) cards 3020, an application processor 3006 coupled to a secure digital (SD) card 3008 and a screen 3010, a Bluetooth module 3012, a wireless local area network (WLAN) module 3014, a GNSS module 3016, and a power supply 3018. The GNSS module 3016 may comprise a variety of satellite positioning systems. For example, the GNSS module may correspond to Global Positioning System (GPS), Global Navigation Satellite System (GLONASS), Galileo, BeiDou Navigation Satellite System (BDS), Wide Area Augmentation System (WAAS), European Geostationary Navigation Overlay Service (EGNOS), GPS Aided GEO Augmented Navigation (GAGAN), Multifunctional Transport Satellites (MTSAT) Satellite Augmentation System (MSAS), Quasi-Zenith Satellite System (QZSS), or Navigation with Indian Constellation (NavIC). The cellular baseband processor 3004 communicates through the cellular RF transceiver 3022 with the UE 104 and/or BS 102/180. The cellular baseband processor 3004 may include a computer-readable medium/memory. The computer-readable medium/memory may be non-transitory. The cellular baseband processor 3004 is responsible for general processing, including the execution of software stored on the computer-readable medium/memory. The software, when executed by the cellular baseband processor 3004, causes the cellular baseband processor 3004 to perform the various functions described supra. The computer-readable medium/memory may also be used for storing data that is manipulated by the cellular baseband processor 3004 when executing software. The cellular baseband processor 3004 further includes a reception component 3030, a communication manager 3032, and a transmission component 3034. The communication manager 3032 includes the one or more illustrated components. The components within the communication manager 3032 may be stored in the computer-readable medium/memory and/or configured as hardware within the cellular baseband processor 3004. The cellular baseband processor 3004 may be a component of the UE 350 and may include the memory 360 and/or at least one of the TX processor 368, the RX processor 356, and the controller/processor 359. In one configuration, the apparatus 3002 may be a modem chip and include just the baseband processor 3004, and in another configuration, the apparatus 3002 may be the entire UE (e.g., see 350 of FIG. 3) and include the aforediscussed additional modules of the apparatus 3002.

The communication manager 3032 includes a detection component 3040 that is configured to detect one or more object data signals having data that interferes with wireless resources utilized in automated driving decisions, e.g., as described in connection with 2902 of FIG. 29. The communication manager 3032 further includes a message component 3042 that is configured to transmit a message indicating the one or more object data signals having data that interferes with wireless resources utilized in automated driving decisions, e.g., as described in connection with 2904 of FIG. 29.

The apparatus may include additional components that perform each of the blocks of the algorithm in the aforementioned flowchart of FIG. 29. As such, each block in the aforementioned flowchart of FIG. 29 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 3002, and in particular the cellular baseband processor 3004, includes means for detecting one or more object data signals having data that interferes with wireless resources utilized in automated driving decisions. The apparatus includes means for transmitting, to at least a second wireless device, a message indicating the one or more object data signals having the data that interferes with wireless resources utilized in automated driving decisions. The aforementioned means may be one or more of the aforementioned components of the apparatus 3002 configured to perform the functions recited by the aforementioned means. As described supra, the apparatus 3002 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 31:
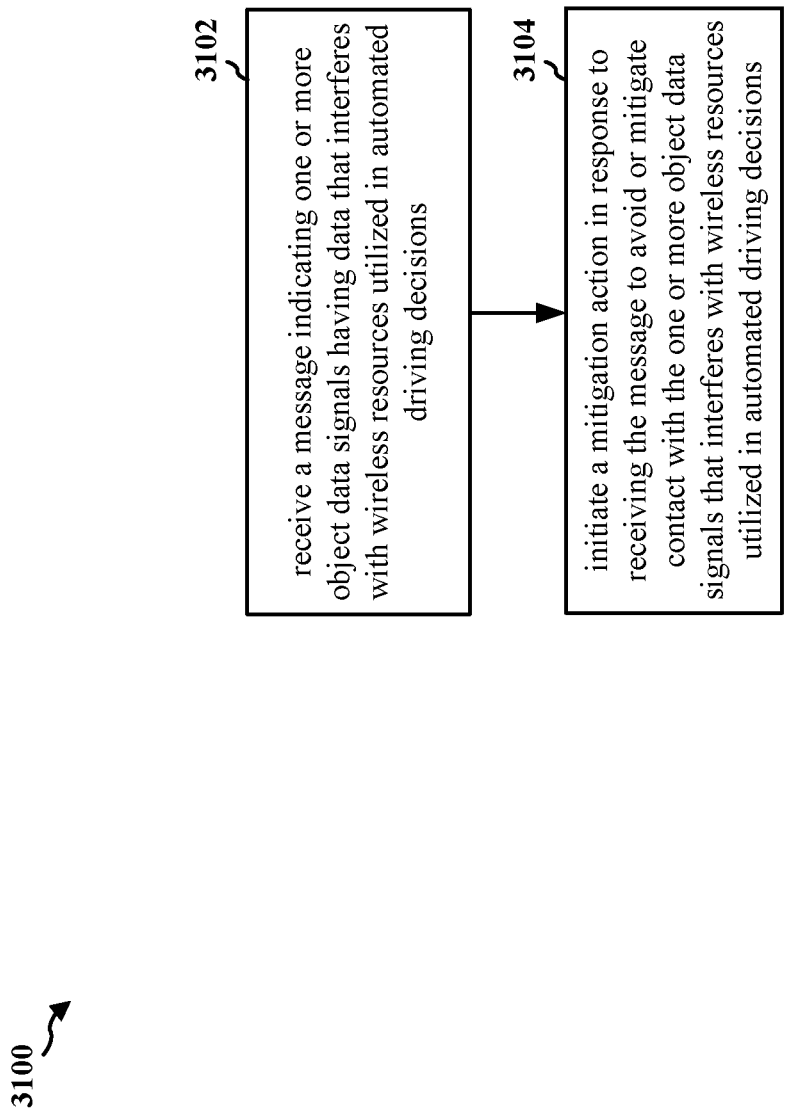
FIG. 31 is a flowchart of a method of wireless communication.

FIG. 31 is a flowchart 3100 of a method of wireless communication. The method may be performed by a UE or a component of a UE (e.g., the UE 104; the apparatus 3202; the cellular baseband processor 3204, which may include the memory 360 and which may be the entire UE 350 or a component of the UE 350, such as the TX processor 368, the RX processor 356, and/or the controller/processor 359). One or more of the illustrated operations may be optional, omitted, transposed, or contemporaneous. The method may allow a second wireless device to initiate a mitigation action in response to receiving a notification of a threat obstacle detected by a first wireless device while beyond a threat zone of the threat obstacle.

At 3102, the second wireless device may receive a message indicating one or more object data signals having data that interferes with wireless resources utilized in automated driving decisions. For example, 3102 may be performed by message component 3240 of apparatus 3202. The second wireless device may receive the message indicating the one or more object data signals having data that interferes with wireless resources utilized in automated driving decisions from a first wireless device. In some aspects, the one or more object data signals may correspond to a misbehaving wireless device. The data of the misbehaving wireless device may comprise erroneous or implausible data related to at least one characteristic of the misbehaving wireless device. In some aspects, the misbehaving wireless device may comprise a misbehaving vehicle. The erroneous or implausible data related to the at least one characteristic of the misbehaving wireless device may include at least one of a location, a speed, or a heading, or a combination thereof. For example, the one or more object data signals may include data that is not realistic or anticipated for wireless devices. The one or more object data signals may indicate a value of speed that is well beyond the actual speed, position information that is nonsensical or not within the vicinity of the first wireless device, or may include high amounts of data that overloads the first wireless device. The one or more object data signals may include other types of inconsistent or incorrect data such that the disclosure is not intended to be limited to the examples provided herein. The one or more object data signals may correspond to an obstacle that interferes with or obstructs wireless spectrum or resources utilized in the cooperative or automated driving decisions. In some aspects, the one or more object data signals of the obstacle or threat entity that interferes with or obstructs the wireless spectrum or resources may be transmitted having an RSSI greater than an RSSI threshold. In some aspects, the one or more object data signals may correspond to a DoS attacker, a jammer, a misbehaving vehicle, an OOB interferer, a WAN jammer, or a GNSS jammer. The one or more object data signals that interfere with wireless resources utilized in automated driving decisions may pose threats to safety use cases. For example, cooperative or automated driving decisions may require a high reliability for safety purposes. The obstacle or threat entity may substantially degrade the wireless spectrum or resources utilized in cooperative or automated driving decisions. Accurate knowledge of road conditions and/or road users may assist automated vehicles (e.g., first or second wireless device) to arrive at safe and efficient driving decisions, which may include decisions made individually or made as part of an inter-vehicle negotiated, cooperative maneuvers.

In some aspects, the message further indicates at least one IE corresponding to the one or more object data signals detected. The at least one IE may comprise detected characteristics of at least one of a detected misbehaving wireless device, a DoS attacker, a detected jammer, a detected OOB interferer, a WAN jammer, a GNSS jammer, or a combination thereof. The at least one IE may comprise classes of detected objects. Each class of detected objects may comprise the detected characteristics for a respective one of the detected misbehaving wireless device, the DoS attacker, the detected jammer, and the detected interferer. In instances that the detected object type is a misbehaving vehicle, the detected object IE (e.g., MisbehavingVehicleData) may include the L2 address or cert digest. In instances that the detected object type is an OOB interferer, the detected obstacle IE (e.g., InterfererData) may include the measured RSSI for each subchannel or band, the RSSI report threshold, the RSSI averaging window size, or the duty cycle of the threat. In instances that the detected object type is a C-V2X jammer the detected obstacle IE (e.g., JammerData) may include information related to the average of the RSSI across the entire bandwidth of the first wireless device and the RSSI averaging window size. In instances that the detected object type is a GNSS jammer, the detected obstacle IE (e.g., JammerData) may include information related to the GNSS band, L1, L2, or L5. In instances that the detected object type is a WAN jammer, the detected obstacle IE (e.g., JammerData) may include information related to EARFCN, cell identifiers, or PLMN.

In some aspects, the message may identify an object that may be transmitting the one or more object data signals having the data that interferes with wireless resources utilized in automated driving decisions. For example, the object or obstacle that interferes with wireless resources utilized in automated driving decisions may be identified based on existing detected objects. In some aspects, the object may comprise one of a VRU, a detected vehicle, or a wireless obstacle. For example, a VRU may comprise attributes corresponding to a jammer, an interferer, or a misbehaving vehicle. In some aspects, a detected vehicle may comprise attributes corresponding to a jammer, an interferer, or a misbehaving vehicle. In some aspects, an obstacle may comprise attributes corresponding to a jammer, an interferer, or a misbehaving vehicle. In some aspects, second wireless device comprises at least one of a wireless vehicle, an RSU, or a VRU.

At 3104, the second wireless device may initiate a mitigation action in response to receiving the message (e.g., SDSM). For example, 3104 may be performed by mitigation component 3242 of apparatus 3202. The second wireless device may initiate the mitigation action in response to receiving the message to avoid or mitigate contact with the one or more object data signals that interferes with wireless resources utilized in automated driving decisions. In some aspects, the message may trigger the mitigation action in the at least the second wireless device to avoid or mitigate contact with the one or more object data signals that obstruct cooperative or automated driving decisions. The obstacle may obstruct wireless spectrum or resources utilized in cooperative or automated driving decisions. In some aspects, the mitigation action may comprise selecting an alternate path to avoid the threat entity, utilizing a more robust MCS, or virtual sensing of the threat entity. The obstacle may substantially degrade the wireless spectrum or resources utilized in cooperative or automated driving decisions. Cooperative or automated driving decisions may require a high reliability for safety purposes. In some aspects, the second wireless device may determine to alter its scheduled route or path of travel to one that is least affected by the detected obstacle or any obstacle.

Figure 32:
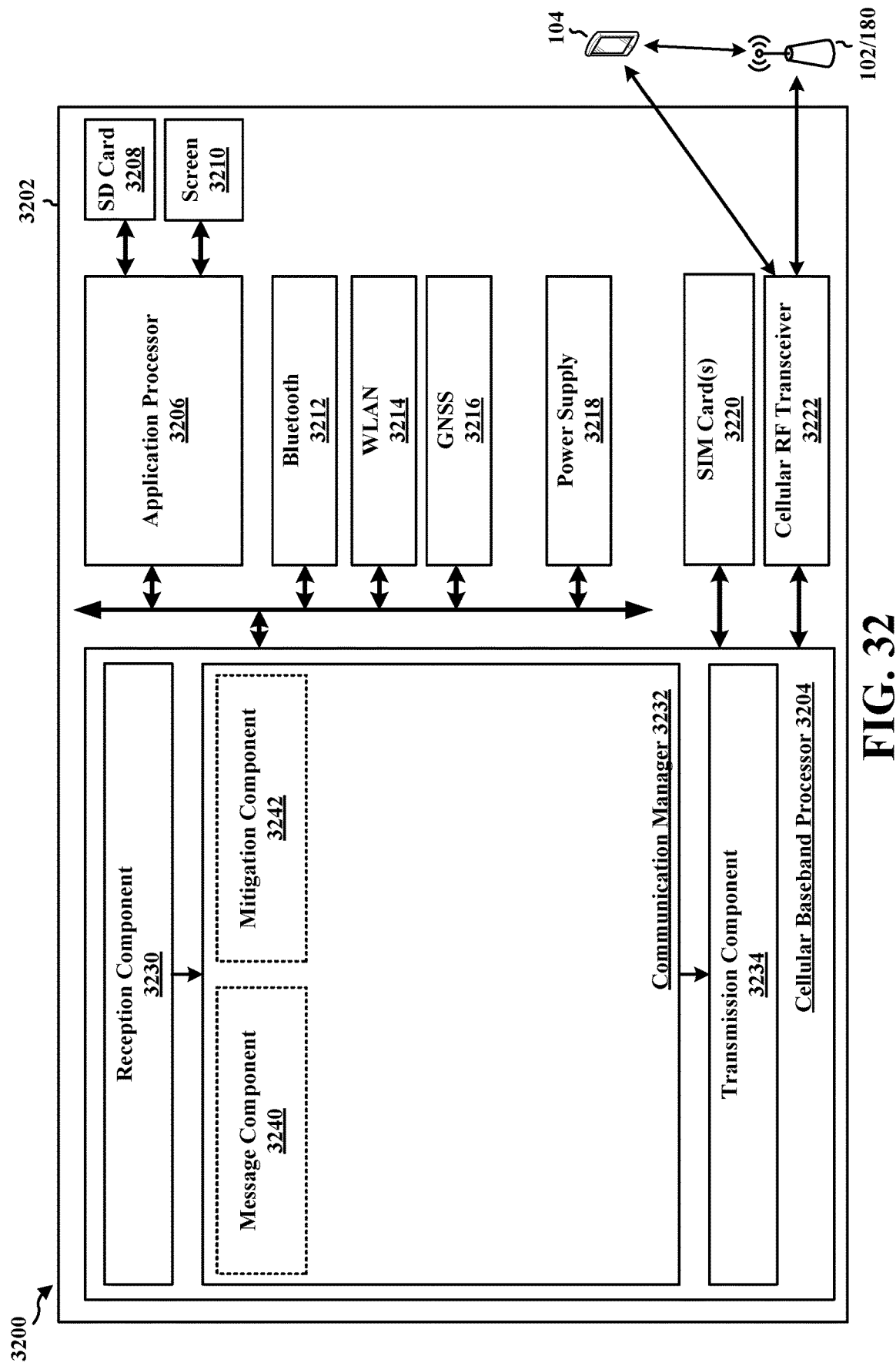
FIG. 32 is a diagram illustrating an example of a hardware implementation for an example apparatus.

FIG. 32 is a diagram 3200 illustrating an example of a hardware implementation for an apparatus 3202. The apparatus 3202 is a UE and includes a cellular baseband processor 3204 (also referred to as a modem) coupled to a cellular RF transceiver 3222 and one or more subscriber identity modules (SIM) cards 3220, an application processor 3206 coupled to a secure digital (SD) card 3208 and a screen 3210, a Bluetooth module 3212, a wireless local area network (WLAN) module 3214, a GNSS module 3216, and a power supply 3218. The GNSS module 3216 may comprise a variety of satellite positioning systems. For example, the GNSS module may correspond to Global Positioning System (GPS), Global Navigation Satellite System (GLONASS), Galileo, BeiDou Navigation Satellite System (BDS), Wide Area Augmentation System (WAAS), European Geostationary Navigation Overlay Service (EGNOS), GPS Aided GEO Augmented Navigation (GAGAN), Multifunctional Transport Satellites (MTSAT) Satellite Augmentation System (MSAS), Quasi-Zenith Satellite System (QZSS), or Navigation with Indian Constellation (NavIC). The cellular baseband processor 3204 communicates through the cellular RF transceiver 3222 with the UE 104 and/or BS 102/180. The cellular baseband processor 3204 may include a computer-readable medium/memory. The computer-readable medium/memory may be non-transitory. The cellular baseband processor 3204 is responsible for general processing, including the execution of software stored on the computer-readable medium/memory. The software, when executed by the cellular baseband processor 3204, causes the cellular baseband processor 3204 to perform the various functions described supra. The computer-readable medium/memory may also be used for storing data that is manipulated by the cellular baseband processor 3204 when executing software. The cellular baseband processor 3204 further includes a reception component 3230, a communication manager 3232, and a transmission component 3234. The communication manager 3232 includes the one or more illustrated components. The components within the communication manager 3232 may be stored in the computer-readable medium/memory and/or configured as hardware within the cellular baseband processor 3204. The cellular baseband processor 3204 may be a component of the UE 350 and may include the memory 360 and/or at least one of the TX processor 368, the RX processor 356, and the controller/processor 359. In one configuration, the apparatus 3202 may be a modem chip and include just the baseband processor 3204, and in another configuration, the apparatus 3202 may be the entire UE (e.g., see 350 of FIG. 3) and include the aforediscussed additional modules of the apparatus 3202.

The communication manager 3232 includes a message component 3240 that is configured to receive a message indicating one or more object data signals having data that interferes with wireless resources utilized in automated driving decisions, e.g., as described in connection with 3102 of FIG. 31. The communication manager 3232 further includes a mitigation component 3242 that is configured to initiate a mitigation action in response to receiving the message, e.g., as described in connection with 3104 of FIG. 31.

The apparatus may include additional components that perform each of the blocks of the algorithm in the aforementioned flowchart of FIG. 31. As such, each block in the aforementioned flowchart of FIG. 31 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 3202, and in particular the cellular baseband processor 3204, includes means for receiving, from a first wireless device, a message indicating one or more object data signals having data that interferes with wireless resources utilized in automated driving decisions. The apparatus includes means for initiating a mitigation action in response to receiving the message (e.g., SDSM) to avoid or mitigate contact with the one or more object data signals that interferes with wireless resources utilized in automated driving decisions. The aforementioned means may be one or more of the aforementioned components of the apparatus 3202 configured to perform the functions recited by the aforementioned means. As described supra, the apparatus 3202 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The following examples are illustrative only and may be combined with aspects of other embodiments or teachings described herein, without limitation.

Aspect 1 is a method of wireless communication at a first wireless device comprising detecting a threat entity transmitting data that interferes with transmission of BSMs; and transmitting, to a second wireless device, a message indicating information related to a type of the threat entity.

In Aspect 2, the method of Aspect 1 further includes that the information in the message comprises a subset of subchannels having an RSSI greater than an RSSI threshold based on an average of the RSSI for the subset of subchannels or for each subchannel in the subset of subchannels being greater than the RSSI threshold for at least an RSSI window time length.

In Aspect 3, the method of Aspect 1 or 2 further includes that the information in the message further indicates at least one of an average RSSI on the subset of subchannels, the average RSSI for each subchannel in the subset of subchannels, the RSSI threshold, the RSSI window time length, a location of the threat entity influencing the RSSI in at least one of the subset of subchannels, or a location confidence radius in association with the threat entity influencing the RSSI in at least one of the subset of subchannels, or a combination thereof.

In Aspect 4, the method of any of Aspects 1-3 further includes that the transmitted message is an SDSM, an I2V message, or a CPM.

In Aspect 5, the method of any of Aspects 1-4 further includes that the threat entity comprises a jammer, an OOB interferer, a WAN jammer, or a GNSS jammer.

Aspect 6 is a device including one or more transceivers, one or more processors, and one or more memories in electronic communication with the one or more transceivers and the one or more processors and storing instructions executable by the one or more processors to cause the device to implement a method as in any of Aspects 1-5.

Aspect 7 is a system or apparatus including means for implementing a method or realizing an apparatus as in any of Aspects 1-5.

Aspect 8 is a non-transitory computer readable storage medium storing instructions executable by one or more processors to cause the one or more processors to implement a method as in any of Aspect 1-5.

Aspect 9 is a method of wireless communication at a second wireless device comprising receiving, from a first wireless device, a message indicating a threat entity within a threat zone, wherein the threat entity transmits data that interferes with transmission of BSMs; determining a candidate resource of a set of candidate resources on which to transmit a BSM based at least in part on the message indicating information related to the threat entity from the first wireless device; and transmitting, to at least a third wireless device, the BSM on a determined candidate resource.

In Aspect 10, the method of Aspect 9 further includes that the information in the message comprises a subset of subchannels having an RSSI greater than an RSSI threshold based on an average of the RSSI for the subset of subchannels or for each subchannel in the subset of subchannels being greater than the RSSI threshold for at least an RSSI window time length.

In Aspect 11, the method of Aspect 9 or 10 further includes that the information in the message further indicates at least one of the average RSSI on the subset of subchannels, the average RSSI for each subchannel in the subset of subchannels, the RSSI threshold, the RSSI window time length, a location of the threat entity influencing the RSSI in at least one of the subset of subchannels, or a location confidence radius in association with the threat entity influencing the RSSI in at least one of the subset of subchannels, or a combination thereof.

In Aspect 12, the method of any of Aspects 9-11 further includes that the received message is an SDSM, an I2V message, or a CPM.

In Aspect 13, the method of any of Aspects 9-12 further includes that the threat entity comprises a jammer, an OOB interferer, a WAN jammer, or a GNSS jammer.

In Aspect 14, the method of any of Aspects 9-13 further includes that the candidate resource comprises a CSR, and the set of candidate resources comprises a set of CSRs.

In Aspect 15, the method of any of Aspects 9-14 further includes that the determining the candidate resource of the set of candidate resources further includes excluding one or more candidate resources in the set of candidate resources based on a projected RSRP for each candidate resource in the set of candidate resources exceeding an RSRP threshold to determine a first subset of candidate resources; ranking the first subset of candidate resources based on a weighted RSSI ranking to obtain a second subset of candidate resources with a lowest weighted RSSI, wherein the second subset of candidate resources is a portion of the first subset of candidate resources; and selecting a candidate resource from the second subset of candidate resources.

In Aspect 16, the method of any of Aspects 9-15 further includes that the weighted RSSI comprises physically sensed candidate resources and one or more virtually sensed candidate resources.

In Aspect 17, the method of any of Aspects 9-16 further includes that the physically sensed candidate resources comprise candidate resources measured by the second wireless device within the sensing window.

In Aspect 18, the method of any of Aspects 9-17 further includes that the one or more virtually sensed candidate resources comprise candidate resources measured by the first wireless device and indicated within the message received by the second wireless device from the first wireless device.

In Aspect 19, the method of any of Aspects 9-18 further includes that the one or more virtually sensed candidate resources are based on at least one of a location of the threat entity influencing an RSSI of candidate resources, a location confidence radius in association with the threat entity, a timestamp associated with the message received from the first wireless device, a velocity of the second wireless device, an acceleration of the second wireless device, a direction of travel of the second wireless device in relation to the location of the threat entity, information related to roadway geometry, or transmission requirements associated with the BSM, or a combination thereof.

In Aspect 20, the method of any of Aspects 9-19 further includes that the determining the candidate resource of the set of candidate resources further includes excluding one or more virtually sensed candidate resources in the set of candidate resources having an RSSI that exceeds a pre-filter threshold to obtain a filtered subset of candidate resources that do not exceed the pre-filter threshold; excluding candidate resources within the filtered subset of candidate resources that do not exceed the pre-filter threshold that exceed an RSRP threshold to obtain a second subset of candidate resources that do not exceed the RSRP threshold; and selecting the candidate resource from the second subset of candidate resources.

In Aspect 21, the method of any of Aspects 9-20 further includes that the one or more virtually sensed candidate resources are measured by the first wireless device and indicated within the message received by the second wireless device from the first wireless device.

In Aspect 22, the method of any of Aspects 9-21 further includes that the second subset of candidate resources comprises a preconfigured proportion of total candidate resources in a selection pool that do not exceed the pre-filter threshold.

In Aspect 23, the method of any of Aspects 9-22 further includes that the pre-filter threshold is adjusted if the second subset of candidate resources comprises an amount of candidate resources less than the preconfigured proportion of the total candidate resources in the selection pool.

In Aspect 24, the method of any of Aspects 9-23 further includes that the pre-filter threshold is further adjusted until the second subset of candidate resources comprises the preconfigured proportion of the total candidate resources in the selection pool.

In Aspect 25, the method of any of Aspects 9-24 further includes that the virtually sensed candidate resources are based on at least one of a location of the threat entity influencing an RSSI of candidate resources, a location confidence radius in association with the threat entity, a timestamp associated with the message received from the first wireless device, a velocity of the second wireless device, an acceleration of the second wireless device, a direction of travel of the second wireless device in relation to the location of the threat entity, information related to roadway geometry, or transmission requirements associated with the BSM, or a combination thereof.

In Aspect 26, the method of any of Aspects 9-25 further includes that the determination of the candidate resource of the set of candidate resources is further based on whether additional messages are received from other wireless devices indicating the threat entity within the threat zone.

Aspect 27 is a device including one or more transceivers, one or more processors, and one or more memories in electronic communication with the one or more processors and storing instructions executable by the one or more processors to cause the device to implement a method as in any of Aspects 9-26.

Aspect 28 is a system or apparatus including means for implementing a method or realizing an apparatus as in any of Aspects 9-26.

Aspect 29 is a non-transitory computer readable storage medium storing instructions executable by one or more processors to cause the one or more processors to implement a method as in any of Aspect 9-26.

Aspect 30 is a method of wireless communication at a first wireless device comprising detecting a threat entity within a threat zone based on data signals received from the threat entity, wherein the threat entity obstructs wireless spectrum or resources utilized in cooperative or automated driving decisions; and transmitting, to at least one second wireless device, a message indicating the threat entity within the threat zone.

In Aspect 31, the method of Aspect 30 further includes that the data signals received from the threat entity comprise data that is inconsistent with projected data for wireless devices.

In Aspect 32, the method of Aspect 30 or 31 further includes that the data signals comprise data of a misbehaving wireless device, wherein the data of the misbehaving wireless device comprises implausible data related to at least one characteristic of the misbehaving wireless device.

In Aspect 33, the method of any of Aspects 30-32 further includes that a type of the threat entity is determined based on the data signals received from the threat entity, and wherein the type of the threat entity comprises a DoS attacker, a jammer, a misbehaving vehicle, an OOB interferer, or a GNSS jammer.

In Aspect 34, the method of any of Aspects 30-33 further includes that the message comprises a confidence value associated with the type of the threat entity.

In Aspect 35, the method of any of Aspects 30-34 further includes that the message comprises an average RSSI measured over a bandwidth of at least the first wireless device.

In Aspect 36, the method of any of Aspects 30-35 further includes that the message comprises an average RSSI measured for each subchannel that exceed an RSSI threshold, wherein the average RSSI for each subchannel is measured over a time window.

In Aspect 37, the method of any of Aspects 30-36 further includes that the message comprises an L2 address of the threat entity.

In Aspect 38, the method of any of Aspects 30-37 further includes determining an estimated location of the threat entity based on the data signals received from the threat entity in combination with data received from one or more sensors of the first wireless device.

In Aspect 39, the method of any of Aspects 30-38 further includes receiving, from a third wireless device, a report indicating the threat entity, wherein the estimated location of the threat entity is determined in response to receipt of the report.

In Aspect 40, the method of any of Aspects 30-39 further includes that the message comprises the estimated location of the threat entity and a confidence value associated with the estimated location of the threat entity.

In Aspect 41, the method of any of Aspects 30-40 further includes that the message further indicates at least one IE corresponding to the threat entity, wherein the at least one IE comprises detected characteristics of threat entity.

In Aspect 42, the method of any of Aspects 30-41 further includes that the detected characteristics of the threat entity comprise at least one of a position, a speed, or a heading, or a combination thereof.

In Aspect 43, the method of any of Aspects 30-42 further includes that the detected characteristics of the threat entity comprise a radius around the position of the threat entity.

In Aspect 44, the method of any of Aspects 30-43 further includes that the detected characteristics of the threat entity comprise information related to a measured RSSI of the threat entity.

In Aspect 45, the method of any of Aspects 30-44 further includes that the detected characteristics of the threat entity comprise information related to one or more layers associated with the threat entity, a certificate digest, a cell identifier, or a PLMN.

In Aspect 46, the method of any of Aspects 30-45 further includes that the message identifies the threat entity as an object transmitting the data signals of the threat entity.

In Aspect 47, the method of any of Aspects 30-46 further includes that the object may comprise one of a VRU, a detected vehicle, or a wireless obstacle.

In Aspect 48, the method of any of Aspects 30-47 further includes that the message is transmitted based on at least one of a number of reports of the threat entity received from at least one third wireless device, a severity of the threat entity, a distance separating the threat entity and the first wireless device, or a time for the at least one second wireless device to approach the threat zone, or a combination thereof.

In Aspect 49, the method of any of Aspects 30-48 further includes that the message triggers a mitigation action in the at least one second wireless device to avoid or mitigate contact with the threat entity.

In Aspect 50, the method of any of Aspects 30-49 further includes that the message comprises a duty cycle of the data signals received from the threat entity.

Aspect 51 is a device including one or more transceivers, one or more processors, and one or more memories in electronic communication with the one or more processors and storing instructions executable by the one or more processors to cause the device to implement a method as in any of Aspects 30-50.

Aspect 52 is a system or apparatus including means for implementing a method or realizing an apparatus as in any of Aspects 30-50.

Aspect 53 is a non-transitory computer readable storage medium storing instructions executable by one or more processors to cause the one or more processors to implement a method as in any of Aspect 30-50.

Aspect 54 is a method of wireless communication at a second wireless device comprising receiving a message indicating a threat entity within a threat zone, wherein the threat entity obstructs wireless spectrum or resources utilized in cooperative or automated driving decisions; and initiating a mitigation action in response to receiving the message to avoid or mitigate contact with the threat entity.

In Aspect 55, the method of Aspect 54 further includes adjusting transmission parameters in response to receipt of the message.

In Aspect 56, the method of Aspect 54 or 55 further includes that adjusted transmission parameters comprise at least one of an increase in transmission power or using a more robust MCS, or a combination thereof.

In Aspect 57, the method of any of Aspects 54-56 further includes that the mitigation action comprises selection of an alternate path to avoid the threat entity.

In Aspect 58, the method of any of Aspects 54-57 further includes that the message is received from a first wireless device or from a network entity.

Aspect 59 is a device including one or more transceivers, one or more processors, and one or more memories in electronic communication with the one or more processors and storing instructions executable by the one or more processors to cause the device to implement a method as in any of Aspects 54-58.

Aspect 60 is a system or apparatus including means for implementing a method or realizing an apparatus as in any of Aspects 54-58.

Aspect 61 is a non-transitory computer readable storage medium storing instructions executable by one or more processors to cause the one or more processors to implement a method as in any of Aspect 54-58.

Aspect 62 is a method of wireless communication at a first wireless device comprising detecting one or more object data signals having data that interferes with wireless resources utilized in automated driving decisions; and transmitting, to at least a second wireless device, a message indicating the one or more object data signals having the data that interferes with wireless resources utilized in automated driving decisions.

In Aspect 63, the method of Aspect 62 further includes that the one or more object data signals correspond to a misbehaving wireless device, wherein the data of the misbehaving wireless device comprises implausible data related to at least one characteristic of the misbehaving wireless device.

In Aspect 64, the method of Aspect 62 or 63 further includes that the implausible data related to the at least one characteristic of the misbehaving wireless device includes at least one of a location, a speed, or a heading, or a combination thereof.

In Aspect 65, the method of any of Aspects 62-64 further includes that the misbehaving wireless device comprises a misbehaving vehicle.

In Aspect 66, the method of any of Aspects 62-65 further includes that the one or more object data signals correspond to an obstacle that interferes with or obstructs wireless spectrum or resources utilized in the cooperative or automated driving decisions.

In Aspect 67, the method of any of Aspects 62-66 further includes that the one or more object data signals of the obstacle that interferes with or obstructs the wireless spectrum or resources are transmitted having an RSSI greater than an RSSI threshold.

In Aspect 68, the method of any of Aspects 62-67 further includes that the one or more object data signals comprise a DoS attacker, a jammer, or an OOB interferer.

In Aspect 69, the method of any of Aspects 62-68 further includes that the message further indicates at least one IE corresponding to the one or more object data signals detected, wherein the at least one IE comprises detected characteristics of at least one of a detected misbehaving wireless device, a DoS attacker, a detected jammer, or a detected OOB interferer, or a combination thereof.

In Aspect 70, the method of any of Aspects 62-69 further includes that the at least one IE comprises classes of detected objects, wherein each class of detected objects comprises the detected characteristics for a respective one of the detected misbehaving wireless device, the DoS attacker, the detected jammer, and the detected interferer.

In Aspect 71, the method of any of Aspects 62-70 further includes that the message triggers a mitigation action in the at least the second wireless device to avoid or mitigate contact with the one or more object data signals that obstruct cooperative or automated driving decisions.

In Aspect 72, the method of any of Aspects 62-71 further includes that the message identifies an object that is transmitting the one or more object data signals having the data that interferes with wireless resources utilized in automated driving decisions.

In Aspect 73, the method of any of Aspects 62-72 further includes that the object comprises one of a VRU, a detected vehicle, or a wireless obstacle.

In Aspect 74, the method of any of Aspects 62-73 further includes that the second wireless device comprises at least one of a wireless vehicle, an RSU, or a VRU.

Aspect 75 is a device including one or more transceivers, one or more processors, and one or more memories in electronic communication with the one or more processors and storing instructions executable by the one or more processors to cause the device to implement a method as in any of Aspects 62-74.

Aspect 76 is a system or apparatus including means for implementing a method or realizing an apparatus as in any of Aspects 62-74.

Aspect 77 is a non-transitory computer readable storage medium storing instructions executable by one or more processors to cause the one or more processors to implement a method as in any of Aspect 62-74.

Aspect 78 is a method of wireless communication at a second wireless device comprising receiving a message indicating one or more object data signals having data that interferes with wireless resources utilized in automated driving decisions; and initiating a mitigation action in response to receiving the message to avoid or mitigate contact with the one or more object data signals that interferes with wireless resources utilized in automated driving decisions.

In Aspect 79, the method of Aspect 78 further includes that the one or more object data signals correspond to a misbehaving wireless device, wherein the data of the misbehaving wireless device comprises implausible data related to at least one characteristic of the misbehaving wireless device.

In Aspect 80, the method of Aspect 78 or 79 further includes that the implausible data related to the at least one characteristic of the misbehaving wireless device includes at least one of a location, a speed, or a heading, or a combination thereof.

In Aspect 81, the method of any of Aspects 78-80 further includes that the misbehaving wireless device comprises a misbehaving vehicle.

In Aspect 82, the method of any of Aspects 78-81 further includes that the one or more object data signals correspond to an obstacle that interferes with or obstructs wireless spectrum or resources utilized in cooperative or automated driving decisions.

In Aspect 83, the method of any of Aspects 78-82 further includes that the one or more object data signals of the obstacle that interferes with or obstructs the wireless spectrum or resources are transmitted having an RSSI greater than an RSSI threshold.

In Aspect 84, the method of any of Aspects 78-83 further includes that the one or more object data signals comprise a DoS attacker, a jammer, or an OOB interferer.

In Aspect 85, the method of any of Aspects 78-84 further includes that the message further indicates at least one IE corresponding to the one or more object data signals detected, wherein the at least one IE comprises detected characteristics of at least one of a detected misbehaving wireless device, a DoS attacker, a detected jammer, or a detected OOB interferer, or a combination thereof.

In Aspect 86, the method of any of Aspects 78-85 further includes that the at least one IE comprises classes of detected objects, wherein each class of detected objects comprises the detected characteristics for a respective one of the detected misbehaving wireless device, the DoS attacker, the detected jammer, and the detected interferer.

In Aspect 87, the method of any of Aspects 78-86 further includes that the message triggers a mitigation action in the at least the second wireless device to avoid or mitigate contact with the one or more object data signals that obstruct cooperative or automated driving decisions.

In Aspect 88, the method of any of Aspects 78-87 further includes that the message identifies an object that is transmitting the one or more object data signals having the data that interferes with wireless resources utilized in automated driving decisions.

In Aspect 89, the method of any of Aspects 78-88 further includes that the object comprises one of a VRU, a detected vehicle, or a wireless obstacle.

In Aspect 90, the method of any of Aspects 78-89 further includes that the second wireless device comprises at least one of a wireless vehicle, an RSU, or a VRU.

In Aspect 91, the method of any of Aspects 78-90 further includes that the message is received from a first wireless device or from an RSU.

Aspect 92 is a device including one or more transceivers, one or more processors, and one or more memories in electronic communication with the one or more processors and storing instructions executable by the one or more processors to cause the device to implement a method as in any of Aspects 78-91.

Aspect 93 is a system or apparatus including means for implementing a method or realizing an apparatus as in any of Aspects 78-91.

Aspect 94 is a non-transitory computer readable storage medium storing instructions executable by one or more processors to cause the one or more processors to implement a method as in any of Aspect 78-91.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. An apparatus for wireless communication at a first wireless device, the apparatus comprising:
   at least one memory;
   at least one transceiver; and
   at least one processor, communicatively connected to the at least one memory and the at least one transceiver, the at least one processor configured to:
   detect one or more object data signals from an external entity having data that interferes with wireless resources utilized in automated driving decisions;

determine the one or more object data signals are associated with a denial of service (DOS) attacker, a jammer, an out of band (OOB) interferer, or a combination thereof; and transmit, to at least a second wireless device, a message indicating the one or more object data signals are associated with the DoS attacker, the jammer, the OOB interferer, or the combination thereof that interferes with the wireless resources utilized in the automated driving decisions.

2. The apparatus of claim 1, wherein the external entity correspond to an obstacle that interferes with or obstructs wireless spectrum or resources utilized in cooperative or automated driving decisions.

3. The apparatus of claim 2, wherein the one or more object data signals of the obstacle that interferes with or obstructs the wireless spectrum or resources are transmitted having a reference signal strength indicator (RSSI) greater than an RSSI threshold.

4. The apparatus of claim 1, wherein the message includes at least one information element (IE) that indicates the one or more object data signals are associated with the DoS attacker, the jammer, the OOB interferer, or the combination thereof.

5. The apparatus of claim 4, wherein the at least one IE comprises classes of detected objects, wherein each class of the detected objects comprises characteristics for a respective one of the DOS attacker, the jammer, and the OOB interferer.

6. The apparatus of claim 1, wherein the message triggers a mitigation action in the at least the second wireless device to avoid or mitigate contact with the one or more object data signals that obstruct cooperative or automated driving decisions.

7. The apparatus of claim 1, wherein the message identifies an object that is transmitting the one or more object data signals having the data that interferes with the wireless resources utilized in the automated driving decisions.

8. The apparatus of claim 7, wherein the object comprises one of a vulnerable road user (VRU), a detected vehicle, or a wireless obstacle.

9. The apparatus of claim 1, wherein the second wireless device comprises at least one of a wireless vehicle, a roadside unit (RSU), or a vulnerable road user (VRU).

10. A method of wireless communication of a first wireless device, comprising:
    detecting one or more object data signals from an external entity having data that interferes with wireless resources utilized in automated driving decisions;
    determining the one or more object data signals are associated with a denial of service (DOS) attacker, a jammer, an out of band (OOB) interferer, or a combination thereof; and
    transmitting, to at least a second wireless device, a message indicating the one or more object data signals are associated with the DoS attacker, the jammer, the OOB interferer, or the combination there of that interferes with the wireless resources utilized in the automated driving decisions.

11. The method of claim 10, wherein the external entity correspond to an obstacle that interferes with or obstructs wireless spectrum or resources utilized in cooperative or automated driving decisions.

12. The method of claim 11, wherein the one or more object data signals of the obstacle that interferes with or obstructs the wireless spectrum or resources are transmitted having a reference signal strength indicator (RSSI) greater than an RSSI threshold.

13. The method of claim 10, wherein the message includes at least one information element (IE) that indicates the one or more object data signals are associated with the DoS attacker, the jammer, the OOB interferer, or the combination thereof.

14. The method of claim 10, wherein the message triggers a mitigation action in the at least the second wireless device to avoid or mitigate contact with the one or more object data signals that obstruct cooperative or automated driving decisions.

15. The method of claim 10, wherein the message identifies an object that is transmitting the one or more object data signals having the data that interferes with the wireless resources utilized in the automated driving decisions.

16. An apparatus for wireless communication at a second wireless device, the apparatus comprising:
    memory;
    at least one transceiver; and
    at least one processor, communicatively connected to the memory and the at least one transceiver, the at least one processor configured to:
    receive, from a first wireless device, a message indicating one or more object data signals that are transmitted from an external entity different from the first wireless device having data that interferes with wireless resources utilized in automated driving decisions, wherein the message also indicates that the one or more object data signals are associated with a denial of service (DOS) attacker, a jammer, an out of band (OOB) interferer, or a combination thereof; and
    initiate a mitigation action in response to receiving the message to avoid or mitigate contact with the one or more object data signals that interferes with the wireless resources utilized in the automated driving decisions.

17. The apparatus of claim 16, wherein the external entity correspond to an obstacle that interferes with or obstructs wireless spectrum or resources utilized in cooperative or automated driving decisions.

18. The apparatus of claim 17, wherein the one or more object data signals of the obstacle that interferes with or obstructs the wireless spectrum or resources are transmitted having a reference signal strength indicator (RSSI) greater than an RSSI threshold.

19. The apparatus of claim 16, wherein the message includes at least one information element (IE) that indicates the one or more object data signals are associated with the DoS attacker, the jammer, the OOB interferer, or the combination thereof.

20. The apparatus of claim 19, wherein the at least one IE comprises classes of detected objects, wherein each class of the detected objects comprises characteristics for a respective one of the DOS attacker, the jammer, and the OOB interferer.

21. The apparatus of claim 16, wherein the mitigation action includes at least one of selecting an alternate path to avoid the one or more object data signals or using a more robust MCS.

22. The apparatus of claim 16, wherein the message identifies an object that is transmitting the one or more object data signals having the data that interferes with the wireless resources utilized in the automated driving decisions.

23. The apparatus of claim 22, wherein the object comprises one of a vulnerable road user (VRU), a detected vehicle, or a wireless obstacle.

24. The apparatus of claim 22, wherein the second wireless device comprises at least one of a wireless vehicle, a roadside unit (RSU), or a vulnerable road user (VRU).

25. The apparatus of claim 22, wherein the first wireless device is a first vehicle or a roadside unit (RSU).

26. A method of wireless communication of a second wireless device, comprising:
  receiving, from a first wireless device, a message indicating one or more object data signals that are transmitted from an external entity different from the first wireless device having data that interferes with wireless resources utilized in automated driving decisions, wherein the message also indicates that the one or more object data signals are associated with a denial of service (Dos) attacker, a jammer, an out of band (OOB) interferer, or a combination thereof; and
  initiating a mitigation action in response to receiving the message to avoid or mitigate contact with the one or more object data signals that interferes with the wireless resources utilized in the automated driving decisions.

27. The method of claim 26, wherein the external entity correspond to an obstacle that interferes with or obstructs wireless spectrum or resources utilized in cooperative or automated driving decisions.

28. The method of claim 27, wherein the one or more object data signals of the obstacle that interferes with or obstructs the wireless spectrum or resources are transmitted having a reference signal strength indicator (RSSI) greater than an RSSI threshold.

29. The method of claim 26, wherein the message includes at least one information element (IE) that indicates the one or more object data signals are associated with the DoS attacker, the jammer, the OOB interferer, or the combination thereof further.

30. The method of claim 26, wherein the mitigation action includes at least one of selecting an alternate path to avoid the one or more object data signals or using a more robust MCS.

* * * * *